US012726218B2

(12) United States Patent
Zhang

(10) Patent No.: US 12,726,218 B2
(45) Date of Patent: Sep. 1, 2026

(54) WIRELESS COMMUNICATIONS SYSTEM, METHOD, AND DEVICE, AND CHIP

(71) Applicant: Honor Device Co., Ltd., Shenzhen (CN)

(72) Inventor: Ziyan Zhang, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 660 days.

(21) Appl. No.: 18/019,127

(22) PCT Filed: Dec. 6, 2021

(86) PCT No.: PCT/CN2021/135830

§ 371 (c)(1), (2) Date: Feb. 1, 2023

(87) PCT Pub. No.: WO2022/135129

PCT Pub. Date: Jun. 30, 2022

(65) Prior Publication Data

US 2023/0299798 A1 Sep. 21, 2023

(30) Foreign Application Priority Data

Dec. 21, 2020 (CN) ......................... 202011524419.9

(51) Int. Cl.
*H04B 1/401* (2015.01)
*H04B 1/00* (2006.01)

(52) U.S. Cl.
CPC ........... *H04B 1/0064* (2013.01); *H04B 1/401* (2013.01)

(58) Field of Classification Search
CPC ...... H04B 1/0064; H04B 1/401; H04B 1/005; H04B 1/0067; H04W 88/06
See application file for complete search history.

(56) References Cited

U.S. PATENT DOCUMENTS 7,181,175 B2 2/2007 Nimmo-Smith et al.
9,602,146 B2 * 3/2017 Granger-Jones ........ H04L 5/001
(Continued)

FOREIGN PATENT DOCUMENTS

CN 1543750 A 11/2004
CN 102404022 A 4/2012
(Continued)

OTHER PUBLICATIONS

Zhao, Jianyao, "Millimeter wave frequency band in 5G mobile communication application prospects," Shanghai Huawei Technology Co., Ltd., China Computer & Communication, Issue 13th (2018).

(Continued)

*Primary Examiner* — William G Trost, IV
(74) *Attorney, Agent, or Firm* — Leydig, Voit & Mayer, Ltd.

(57) ABSTRACT

Disclosed are a wireless communications system, method, device, and a chip. A frequency band selection circuit may separately route a first radio frequency signal and a second radio frequency signal to a first front-end circuit, a second front-end circuit, or a third front-end circuit, and the first front-end circuit, the second front-end circuit, or the third front-end circuit may perform filtering and/or combination on the first radio frequency signal and the second radio frequency signal, where a first radio frequency front-end channel configured to send the first radio frequency signal and a second radio frequency front-end channel configured to send the second radio frequency signal may share a filtering circuit, so that devices such as a filter and a duplexer at a radio frequency front end can be reduced, thereby reducing space occupied by a radio frequency front-end module.

18 Claims, 28 Drawing Sheets

(56) References Cited

U.S. PATENT DOCUMENTS

| | | | |
|---|---|---|---|
| 9,692,528 B2 | 6/2017 | Wang et al. | |
| 10,256,850 B2 | 4/2019 | Wloczysiak | |
| 10,420,161 B1 * | 9/2019 | Sava | H04W 72/542 |
| 10,447,458 B2 | 10/2019 | Chang et al. | |
| 10,454,508 B2 | 10/2019 | Bai | |
| 10,499,352 B2 * | 12/2019 | Tanaka | H03F 3/245 |
| 10,505,700 B1 | 12/2019 | Lan et al. | |
| 10,601,451 B1 | 3/2020 | Bremer et al. | |
| 10,608,677 B2 | 3/2020 | Shinozaki et al. | |
| 10,651,875 B2 | 5/2020 | Bai | |
| 10,778,290 B2 | 9/2020 | Leung | |
| 11,349,510 B2 | 5/2022 | Nakajima | |
| 11,469,798 B2 * | 10/2022 | Pehlke | H04B 7/0604 |
| 11,569,850 B2 * | 1/2023 | Hsieh | H04B 1/1615 |
| 2010/0158088 A1 | 6/2010 | Kim et al. | |
| 2010/0321233 A1 | 12/2010 | Ben-Zur et al. | |
| 2013/0109433 A1 | 5/2013 | Wang et al. | |
| 2013/0260699 A1 | 10/2013 | Fernando et al. | |
| 2013/0265912 A1 | 10/2013 | Ikonen et al. | |
| 2014/0024322 A1 | 1/2014 | Khlat | |
| 2014/0227982 A1 | 8/2014 | Granger-Jones et al. | |
| 2015/0288433 A1 | 10/2015 | Onggosanusi et al. | |
| 2017/0338839 A1 * | 11/2017 | Little | H04B 1/56 |
| 2021/0058124 A1 | 2/2021 | Pehlke | |
| 2021/0075448 A1 * | 3/2021 | Mori | H03F 3/245 |
| 2023/0179235 A1 * | 6/2023 | Kitajima | H04B 1/0057<br>375/219 |

FOREIGN PATENT DOCUMENTS

| | | | |
|---|---|---|---|
| CN | 104753553 A | 7/2015 | |
| CN | 105187088 A | 12/2015 | |
| CN | 106301396 A | 1/2017 | |
| CN | 106656243 A | 5/2017 | |
| CN | 106712795 A | 5/2017 | |
| CN | 108199728 A | 6/2018 | |
| CN | 207530820 U | 6/2018 | |
| CN | 108462506 A | 8/2018 | |
| CN | 108880602 A | 11/2018 | |
| CN | 108900201 A | 11/2018 | |
| CN | 105940760 B | 3/2019 | |
| CN | 109905132 A | 6/2019 | |
| CN | 110224726 A | 9/2019 | |
| CN | 110971262 A | 4/2020 | |
| CN | 111193526 A | 5/2020 | |
| CN | 111277296 A | 6/2020 | |
| CN | 111478709 A | 7/2020 | |
| CN | 111884671 A | 11/2020 | |
| CN | 112260710 A | 1/2021 | |
| CN | 109951192 B | 4/2021 | |
| HK | 1216469 B | 11/2016 | |
| HK | 1232351 B | 1/2018 | |
| JP | 200233676 A | 1/2002 | |
| JP | 201234049 A | 2/2012 | |
| JP | 5388307 B2 | 1/2014 | |
| JP | 2019154025 A | 9/2019 | |
| WO | 2015024282 A1 | 2/2015 | |
| WO | 2017190634 A1 | 11/2017 | |
| WO | 2020013936 A1 | 1/2020 | |
| WO | 2020054388 A1 | 3/2020 | |
| WO | WO-2021145464 A1 * | 7/2021 | H04B 17/309 |

OTHER PUBLICATIONS

Morosi et al., "Frame Design for 5G Multicarrier Modulations," 2015 International Wireless Communication and Mobile Computing Conference (IWCMC), CNIT—DINFO, University of Florence, 6 pages (2015).

* cited by examiner

WIRELESS COMMUNICATIONS SYSTEM, METHOD, AND DEVICE, AND CHIP

CROSS-REFERENCE TO RELATED APPLICATIONS

This application is a national stage of International Application No. PCT/CN2021/135830, filed on Dec. 6, 2021, which claims priority to Chinese Patent Application No. 202011524419.9, filed on Dec. 21, 2020. The disclosures of both of the aforementioned applications are hereby incorporated by reference in their entireties.

TECHNICAL FIELD

This application relates to radio frequency electronic technologies, and in particular, to a wireless communications system, method, and device, and a chip.

BACKGROUND

Non-standalone (NSA) means coexistence of a 4G base station and a 5G base station on a radio access network side. A core network uses a networking architecture of a 4G core network or a 5G core network. NSA requires the 4G network and the 5G network to work together. Dual connectivity (DC) is a technical base for network collaboration. DC can improve utilization of wireless resources and reduce switching delay. A terminal device needs to support 4G and 5G dual-standard simultaneous transmission and reception.

For a terminal device that supports 4G and 5G dual-standard simultaneous transmission and reception, it is necessary to ensure that radio frequency devices on a 4G channel and a 5G channel can work at the same time, and that there is no conflict between channel switches in various antenna switching scenarios or primary and secondary card working scenarios.

However, due to limitation of a size of the terminal device, how to make use of limited layout space of a radio frequency device to reasonably dispose a radio frequency front-end module to ensure that the 4G and 5G channels can work at the same time has become an urgent technical problem to be solved.

SUMMARY

This application provides a wireless communications system, method, and device, and a chip, to reduce space occupied by a radio frequency front-end module, thereby reasonably disposing the radio frequency front-end module.

According to a first aspect, an embodiment of this application provides a wireless communications system. The system may include: a first power amplifier, a second power amplifier, a frequency band selection circuit, a first front-end circuit, and an antenna module. The first power amplifier and the second power amplifier are separately coupled with the frequency band selection circuit, and the first front-end circuit is separately coupled with the frequency band selection circuit and the antenna selection circuit. The first power amplifier is configured to perform power amplification on a first radio frequency signal and output an amplified first radio frequency signal to the frequency band selection circuit, and the second power amplifier is configured to perform power amplification on a second radio frequency signal, and output an amplified second radio frequency signal to the frequency band selection circuit. The frequency band selection circuit is configured to: route the amplified first radio frequency signal to the first front-end circuit when the first radio frequency signal meets a first frequency band, and route the amplified second radio frequency signal to the first front-end circuit when the second radio frequency signal meets a second frequency band, where the first front-end circuit supports both the first frequency band and the second frequency band. The first front-end circuit is configured to perform filtering and/or combination on at least one of the amplified first radio frequency signal or the amplified second radio frequency signal, to obtain a first transmission signal. The antenna module is configured to transmit the first transmission signal.

A frequency band selection circuit is disposed. The frequency band selection circuit may separately route a first radio frequency signal and a second radio frequency signal to a first front-end circuit, and the first front-end circuit may perform processing on the first radio frequency signal and the second radio frequency signal. A channel configured to send the first radio frequency signal may be understood as a first radio frequency front-end channel, and a channel configured to send the second radio frequency signal may be understood as a second radio frequency front-end channel. In the system, the first radio frequency front-end channel and the second radio frequency front end may share front-end circuits such as a filtering circuit, so that the front-end circuits such as a filter and a duplexer at a radio frequency front end can be reduced, thereby reducing space occupied by a radio frequency front-end module. It can be further ensured that the first radio frequency signal and the second radio frequency signal do not conflict with each other.

According to a second aspect, an embodiment of this application provides a wireless communication method. The method may include: performing, by a first power amplifier, power amplification on a first radio frequency signal; performing, by a second power amplifier, power amplification on a second radio frequency signal; routing, by the frequency band selection circuit, the amplified first radio frequency signal to the first front-end circuit when the first radio frequency signal meets a first frequency band, and routing the amplified second radio frequency signal to the first front-end circuit when the second radio frequency signal meets a second frequency band, where the first front-end circuit supports both the first frequency band and the second frequency band; performing, by the first front-end circuit, filtering and/or combination on at least one of the amplified first radio frequency signal or the amplified second radio frequency signal, to obtain a first transmission signal; and transmitting, by the antenna module, the first transmission signal.

According to a third aspect, an embodiment of this application provides a terminal device, including: a processor, a plurality of antennas, and the wireless communications system according to the first aspect. The wireless communications system is separately coupled with the processor and the plurality of antennas, and the wireless communications system receives the first radio frequency signal and the second radio frequency signal from the processor.

According to a fourth aspect, an embodiment of this application provides a processor. The processor is configured to control a wireless communications system to execute the method according to the second aspect.

According to a fifth aspect, an embodiment of this application provides a chip, including: a processor and a memory, where the memory is configured to store a computer instruction, and the processor is configured to invoke and run the computer instruction stored in the memory, thereby controlling a wireless communications system to execute the method according to the second aspect.

DESCRIPTION OF EMBODIMENTS

Figure 1:
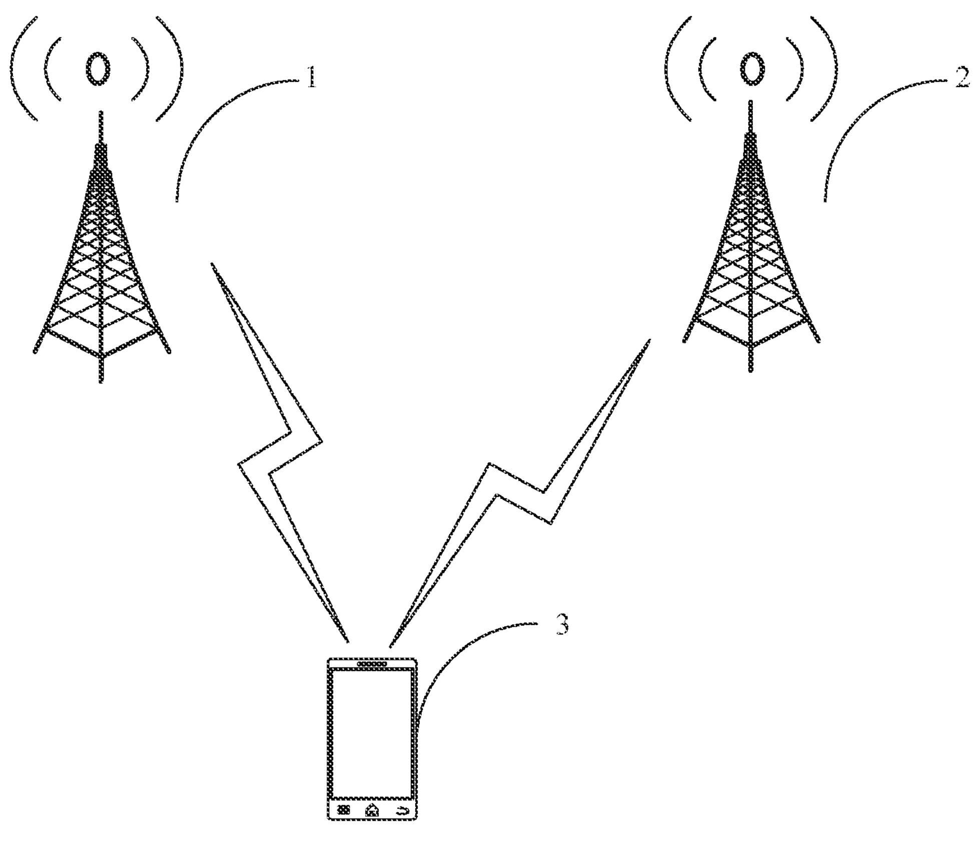
FIG. 1 is a schematic diagram of a communications system according to an embodiment of this application.

In the embodiments of this application, terms such as "first" and "second" are merely used for distinguishing descriptions, and cannot be understood as an indication or implication of relative importance, or an indication or implication of a sequence. Moreover, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

It is to be understood that, in this application, "at least one" means one or more, and "a plurality of" means two or more. The term "and/or" describes an association between associated objects and represents that three associations may exist. For example, "A and/or B" may indicate that only A exists, only B exists, and both A and B exist, where A and B may be singular or plural. The character "I" in this specification generally indicates an "or" relationship between the associated objects. "At least one of the following items" or a similar expression means any combination of these items, including a single item or any combination of a plurality of items. For example, at least one of a, b, or c may represent a, b, c, "a and b", "a and c", "b and c", or "a, b, and c", where a, b, and c may be singular or plural.

For a terminal device that supports 4G and 5G dual-standard simultaneous transmission and reception, the terminal device may be separately provided with a 4G radio frequency front-end channel and a 5G radio frequency front-end channel to ensure that radio frequency devices on a 4G channel and a 5G channel can work at the same time. The 4G radio frequency front-end channel includes a plurality of radio frequency front-end devices, for example, a multiplexer or a filter. The 5G radio frequency front-end channel includes a plurality of radio frequency front-end devices, for example, a multiplexer or a filter. The 4G radio frequency front-end channel and the 5G radio frequency front-end channel are independent of each other, to support transmission of 4G radio frequency signals of different frequency bands and 5G radio frequency signals of different frequency bands. Different from a radio frequency front-end device provided with a 4G radio frequency front-end channel and a radio frequency front-end device provided with a 5G radio frequency front-end channel, a radio frequency front-end module in the embodiments of this application is provided with a frequency band selection circuit. The frequency band selection circuit may route, to a same filter and/or multiplexer, a first radio frequency signal and a second radio frequency signal that are of a same frequency band, so that a first radio frequency front-end channel and a second radio frequency front-end channel can share the filter and/or multiplexer to reduce devices such as a filter and a duplexer at a radio frequency front end, thereby reducing space occupied by the radio frequency front-end module. The multiplexer may include a duplexer, a triplexer, a quadruplexer, or the like. For a specific structure of the radio frequency front-end module in the embodiments of this application, refer to description of the following embodiments.

The first radio frequency signal and the second radio frequency signal in the embodiments of this application may be radio frequency signals of different standards. For example, the first radio frequency signal is a 4G radio frequency signal, and the second radio frequency signal is a 5G radio frequency signal. Alternatively, the first radio frequency signal and the second radio frequency signal may be radio frequency signals of a same standard but different frequency bands; or the first radio frequency signal and the second radio frequency signal may be radio frequency signals by which the terminal device communicates with an access network device via different SIM cards.

A frequency band of the 5G radio frequency signal in the embodiments of this application may be Sub6G, namely, a frequency band below 7.2 GHz. A frequency band of the 4G radio frequency signal in the embodiments of this application may be Sub3G, namely, a frequency band below 3 GHz. Therefore, the frequency band of the 5G radio frequency signal and the frequency band of the 4G radio frequency signal have an overlapped frequency band, namely, the frequency band below 3 GHz. The frequency band below 3 GHz may include a low frequency band (LB), a middle frequency band (MB), and a high frequency band (HB). The LB is a frequency band below 1000 MHz; the MB is a frequency band from 1.7 GHz to 2.3 GHz; and the HB is a frequency band from 2.3 GHz to 2.7 GHz. The LB and the MB may constitute an LMB; and the MB and the HB may constitute an MHB.

For ease of description, a frequency band from 2.7 GHz to 7.2 GHz is referred to as a 5G high frequency band in the embodiments of this application.

A 5G frequency range is divided into different frequency bands. These different frequency bands correspond to different frequency band numbers, for example, N41 and N7. A 4G frequency range is divided into different frequency bands. These different frequency bands correspond to different frequency band numbers, for example, B41 and B7. N41 and B41 correspond to a same frequency range.

The LB may include N28A, B28A, N28B, B28B, N20, B20, N8, B8, and the like. The MB may include N1, B1, N3, B3, and the like. The HB may include N41, B41, N40, B40, N7, B7, and the like.

In an example, the radio frequency front-end module in the embodiments of this application may be applied to a terminal device 3 in a communications system shown in FIG. 1. The communications system may be a communications system using dual connectivity deployed in an NSA mode, for example, LTE-NR dual connectivity. The LTE-NR dual connectivity may include EN-DC (E-UTRA-NR Dual Connectivity), NGEN-DC (NG-RAN E-UTRA-NR Dual Connectivity), or NE-DC (NR-E-UTRA Dual Connectivity).

EN-DC means that a 4G core network (Evolved Packet Core, EPC) is deployed in an access network, where a 4G base station is used as a master base station (Master eNB, MeNB), and a 5G base station is used as a secondary base station (Secondary eNB, SeNB). NGEN-DC means that a 5G core network (5G Core, 5GC) is deployed in an access network, where a 4G base station is used as an MeNB, and a 5G base station is used as an SeNB. NE-DC means that a 5GC is deployed in an access network, where a 5G base station is used as an MeNB, and a 4G base station is used as an SeNB.

It should be noted that, with the development of communication technologies, the above dual connectivity deployed in the NSA mode may alternatively be dual connectivity in another form, for example, dual connectivity of NR and a next-generation communication technology (for example, 6G), and dual connectivity of 4G and a next-generation communication technology (for example, 6G). The embodiments of this application are not limited to LTE-NR dual connectivity. In other words, the radio frequency front-end module in the embodiments of this application may be applied to a terminal device that simultaneously communicates with access network devices of different standards.

Certainly, it may be understood that the radio frequency front-end module in the embodiments of this application may alternatively be applied to a terminal device that simultaneously communicates with different access network devices of a same standard.

As shown in FIG. 1, the communications system may include a terminal device 3, an access network device 1, and an access network device 2. The terminal device 3 in FIG. 1 is a terminal device having a dual connectivity capability, and is mainly configured to connect, through an air interface, to at least one access network device deployed by an operator, so as to receive a network service. It may be easily understood that the terminal device having the dual connectivity capability usually needs to be provided with two radio frequency transceiver channels that support communication with two access network devices of a same standard or different standards. The access network device is mainly configured to implement a wireless protocol stack function, a resource scheduling and radio resource management function, a radio access control function, a mobility management function, and the like.

For example, 5G NR non-standalone is usually used in a first stage of deploying a 5th generation (5G) system, for example, an EN-DC communications system based on an option3x or option3 architecture. For example, in the EN-DC communications system, the access network device 1 may be an evolved Node B (eNB) in a long term evolution (LTE) system; the access network device 2 may be a gNode B (gNB) in an NR system; and the terminal device may simultaneously communicate with the eNB and the gNB.

The above access network device may be an access network device having a wireless transceiver function or a chip disposed in an access network device. The access network device includes, but is not limited to, an evolved Node B (eNB), a radio network controller (RNC), a Node B (NB), a base station controller (BSC), a base transceiver station (BTS), a home base station (for example, a home evolved NodeB, or a home Node B, HNB), a baseband unit (BBU), an access point (AP) in a wireless fidelity (WIFI) system, a wireless relay node, a wireless backhaul node, a transmission point (TP), transmission and reception point (TRP), or the like. The access network device may alternatively be a gNB or a transmission point (TRP or TP) in a 5G system, for example, an NR system, or be one antenna panel or one group of antenna panels (including a plurality of antenna panels) of a base station in the 5G system. In addition, the access network device may alternatively be a network node that constitutes a gNB or a transmission point, for example, a baseband unit (BBU) or a distributed unit (DU).

The above terminal device may also be referred to as a user equipment (UE), an access terminal, a user unit, a user station, a mobile station, a mobile console, a remote station, a remote terminal, a mobile device, a user terminal, a terminal, a wireless communications device, a user proxy, or a user apparatus. The terminal in the embodiments of this application may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a smart watch, a smart band, smart glasses, another sports accessory or wearable device, or the like. An application scenario is not limited in the embodiments of this application.

It should be noted that, FIG. 1 is merely an example architecture diagram. In addition to the functional units shown in FIG. 1, the communications system may further include another functional unit. This is not limited in the embodiments of this application.

In another example, the radio frequency front-end module in the embodiments of this application may alternatively be applied to a terminal device that communicates with different cells in a same access network device, that is, to a terminal device that communicates with an access network device using a carrier aggregation (CA) technology. For example, CA may be LTE CA, 5G CA, or CA of another standard, and is not limited in the embodiments of this application.

For still another example, the radio frequency front-end module in the embodiments of this application may alternatively be applied to a multi-SIM terminal device, for example, a dual SIM dual standby (DSDS) terminal device, or a dual SIM dual active (DSDA) terminal device. The following uses a DSDS terminal device as an example. The DSDS terminal device may be provided with two subscriber identification module (SIM) cards; and both the two SIM cards are in a standby state. A user may use the two SIM cards to perform operations such as making a call, answering a call, receiving or sending a text message, and accessing various applications (such as a video playing application, an instant messaging application, and a game application). Alternatively, either of the SIM cards may be replaced with an embedded SIM (Embedded-SIM, eSIM) card. For example, the user may use one SIM card to communicate with an eNB of an LTE system, and use the other SIM card to communicate with a gNB of an NR system. It should be noted that, for a DSDS terminal device, the user uses one SIM card to access a game application. In a process of accessing the game application, the terminal device receives a voice service request of the other SIM card. In this case, the game application of the terminal device disconnects from a server. Different from the DSDS terminal device, for a DSDA terminal device, in the above scenario, a game application of the terminal device does not disconnect from a server. The user can use two SIM cards to play a game while performing a voice service.

Figure 2:
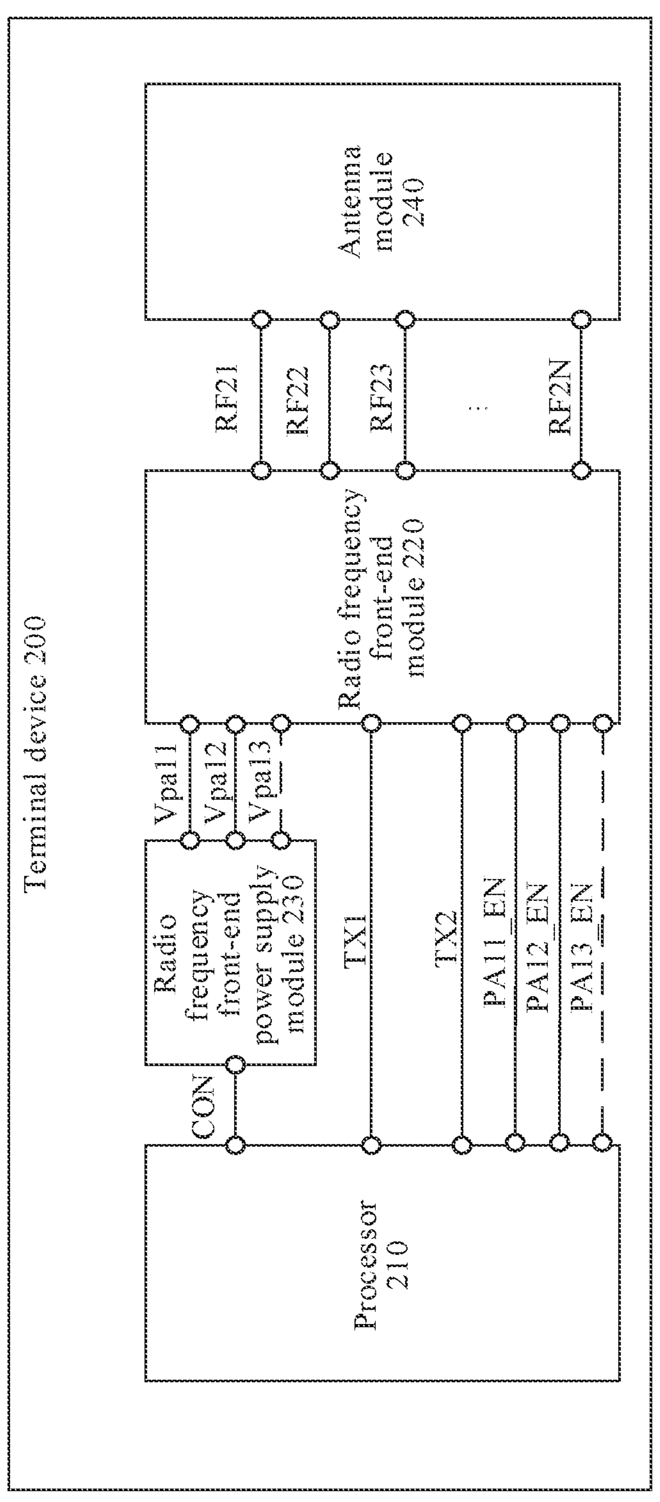
FIG. 2 is a schematic diagram of a terminal device according to an embodiment of this application.

The following specifically describes the components of the above terminal device with reference to FIG. 2.

For example, FIG. 2 is a schematic structural diagram of a terminal device 200 according to an embodiment of this application. As shown in FIG. 2, the terminal device 200 may include a processor 210, a radio frequency front-end module (RFFEM) 220, a radio frequency front-end power supply module 230, and an antenna module 240.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband, a radio frequency transceiver, and/or a neural-network processing unit (NPU). The controller may generate an operation control signal based on an instruction operation code and a time sequence signal, to complete control of instruction fetch and instruction execution.

The processor 210 may be provided with a memory configured to store an instruction and data. In some embodiments, the memory in the processor 210 is a cache memory. The memory may store an instruction or data that is just used or cyclically used by the processor 210. If the processor 210 needs to use the instruction or data again, the processor may directly invoke the instruction or data from the memory. This avoids repeated access and reduces a waiting time of the processor 210, thereby improving efficiency of a system.

The baseband is configured to synthesize a baseband signal to be transmitted, and/or decode a received baseband signal. Specifically, the baseband encodes, during transmission, voice or another data signal into a baseband signal (baseband code) to be transmitted, and decodes a received baseband signal (baseband code) into voice or another data signal during reception. The baseband may include components such as an encoder, a decoder, and a baseband processor. The encoder is configured to synthesize a baseband signal to be transmitted. The decoder is configured to decode a received baseband signal. The baseband processor may be a microprocessor unit (MCU). The baseband processor may be configured to control the encoder and the decoder. For example, the baseband processor may be configured to implement scheduling between encoding and decoding, communication between the encoder and the decoder, and driving of a peripheral device (which may be sending an enabling signal to a component other than the baseband, so as to enable the component other than the baseband).

The modem processor may include a modulator and a demodulator. The modulator is configured to modulate, into a baseband modulation signal, a baseband signal to be sent. The demodulator is configured to demodulate a received baseband modulation signal into a baseband signal. Subsequently, the demodulator transmits the baseband signal obtained after demodulation to the baseband for processing. After the baseband signal is processed by the baseband, an obtained signal is transmitted to an application processor. The application processor outputs a sound signal via an audio device (that is not limited to a speaker, a telephone receiver, and the like), or displays an image or a video via a display screen 194. In some embodiments, the modem processor may be an independent device. In some other embodiments, the modem processor may be independent of the processor 210, and be disposed in a same device as the radio frequency front-end module 220 or another functional module.

The radio frequency transceiver is configured to perform up-conversion on a baseband modulation signal output by the modem processor, to obtain a radio frequency (RF)

signal; and output the RF signal to the radio frequency front-end module 220, so that the RF signal can be transmitted by one or more antennas in the antenna module 240. The radio frequency transceiver is further configured to perform, to obtain a baseband modulation signal, down-conversion on an RF signal received via the antenna module 240 and the radio frequency front-end module 220, so that the baseband modulation signal can be processed by the modem processor and the baseband. In some embodiments, the radio frequency transceiver may be an independent device. In some other embodiments, the radio frequency transceiver may be independent of the processor 210, and be disposed in a same device as the radio frequency front-end module 220 or another functional module.

The processor 210 may perform frequency modulation on a signal according to a mobile communication technology or a wireless communication technology. The mobile communication technology may include global system for mobile communications (GSM), general packet radio service (GPRS), code division multiple access (CDMA), wideband code division multiple access (WCDMA), time-division code division multiple access (TD-SCDMA), long term evolution (LTE), an emerging wireless communication technology (also referred to as a 5th generation mobile communication technology, English: 5th generation mobile networks, 5th generation wireless systems, 5th-Generation, or 5th-Generation New Radio, 5G, 5G technology, or 5G NR), and the like. The wireless communication technology may include a wireless local area network (WLAN) (for example, a wireless fidelity (Wi-Fi) network), bluetooth (BT), a global navigation satellite system (GNSS), frequency modulation (FM), a near field communication (NFC) technology, an infrared (IR) technology, and the like.

In the processor 210, different processing units may be independent devices or may be integrated in one or more integrated circuits.

The radio frequency front-end module 220 is configured to receive and transmit an RF signal via the antenna module 240. For example, the radio frequency front-end module 220 may perform processing on the RF signal, such as amplification, filtering, and/or transmission.

The antenna module 240 is configured to transmit and receive a radio frequency signal in the form of electromagnetic waves. The antenna module 240 may include a plurality of antennas or a plurality of groups of antennas (the plurality of groups of antennas include more than two antennas). Each antenna or the plurality of groups of antennas may be configured to cover a single communication frequency band or a plurality of communication frequency bands. The plurality of antennas may be one or more of multi-frequency antennas, array antennas, or on-chip antennas.

The processor 210 is coupled with the antenna module 240, to implement various functions associated with transmission and reception of a radio frequency signal. For example, when the terminal device 200 transmits a signal, the baseband synthesizes data (a digital signal) to be transmitted into a baseband signal to be transmitted. The baseband signal is modulated by the modem processor into a baseband modulation signal. The baseband modulation signal is converted by the radio frequency transceiver into a transmission signal (radio frequency signal). The transmission signal is processed by the radio frequency front-end module 220. A signal obtained after the processing is transmitted to the antenna module 240, and then transmitted out by the antenna module 240. A path through which the transmission signal is transmitted from the processor 210 to the antenna module 240 is a transmission link (or referred to as a transmission path). When the terminal device 200 needs to receive a signal, the antenna module 240 sends a reception signal (radio frequency signal) to the radio frequency front-end module 220. After processing the radio frequency signal, the radio frequency front-end module sends a processed radio frequency signal to the radio frequency transceiver. The radio frequency transceiver processes the radio frequency signal into a baseband modulation signal, and transmits the baseband modulation signal to the modem processor. The modem processor converts the baseband modulation signal into a baseband signal, and transmits the baseband signal to the baseband. After converting the baseband signal into data, the baseband sends the data to a corresponding application processor. A path through which the radio frequency signal is sent from the antenna module 240 to the processor 210 is a reception link (or referred to as a reception path).

The radio frequency front-end power supply module 230 is configured to receive an input of a battery and/or charging management module, and supply power to the radio frequency front-end module 220, for example, supply power to a power amplifier in the radio frequency front-end module 220. In some embodiments, the radio frequency front-end power supply module 230 may also be disposed in the processor 210.

The processor 210 may further provide a control signal CON to the radio frequency front-end power supply module 230, and provide a first radio frequency signal TX1 and a second radio frequency signal TX2 to the radio frequency front-end module 220.

The radio frequency front-end power supply module 230 may further include a first power supply end Vpa11 and a second power supply end Vpa12. The first power supply end Vpa11 of the radio frequency front-end power supply module 230 is coupled with a first power supply end Vpa11 of the radio frequency front-end module 220. The second power supply end Vpa12 of the radio frequency front-end power supply module 230 is coupled with a second power supply end Vpa12 of the radio frequency front-end module 220. Optionally, in some embodiments, the radio frequency front-end power supply module 230 may further include a third power supply end Vpa13. The third power supply end Vpa13 of the radio frequency front-end power supply module 230 is coupled with a third power supply end Vpa13 of the radio frequency front-end module 220. A quantity of power supply ends included by the radio frequency front-end power supply module 230 is related to a quantity of power amplifiers included by the radio frequency front-end module 220, and may be reasonably specified as required. For example, two power amplifiers included by the radio frequency front-end module 220 have different power supply voltages. The radio frequency front-end power supply module 230 may include two power supply ends, thereby supplying power to the two power amplifiers, respectively.

The radio frequency front-end module 220 may further include a first radio frequency signal end RF21, a second radio frequency signal end RF22, . . . , and an $N^{th}$ radio frequency signal end RF2N. N is any positive integer. The first radio frequency signal end RF21 of the radio frequency front-end module 220 is coupled with a first radio frequency signal end RF21 of the antenna module 240. The second radio frequency signal end RF22 of the radio frequency front-end module 220 is coupled with a second radio frequency signal end RF22 of the antenna module 240. The $N^{th}$ radio frequency signal end RF2N of the radio frequency front-end module 220 is coupled with an $N^{th}$ radio frequency signal end RF2N of the antenna module 240. A value of N may be related to a quantity of antennas included by the antenna module 240. For example, N=4, 6, or another positive integer.

The processor 210 provides a power supply control signal to the radio frequency front-end power supply module 230. The power supply control signal acts on the radio frequency front-end power supply module 230, so that the radio frequency front-end power supply module 230 can supply power to the radio frequency front-end module 220. The processor 210 outputs a first radio frequency signal TX1 to the radio frequency front-end module 220. The processor 210 outputs the second radio frequency signal TX2 to the radio frequency front-end module 220. The radio frequency front-end module 220 is configured to perform processing on the first radio frequency signal and the second radio frequency signal, such as amplification, filtering, and/or transmission, and output any one or two of the first radio frequency signal end RF21, the second radio frequency signal end RF22, . . . , or the $N^{th}$ radio frequency signal end RF2N to the antenna module 240. The antenna module 240 is configured to transmit the first radio frequency signal and the second radio frequency signal in the form of electromagnetic waves.

In an example, the first radio frequency signal and the second radio frequency signal in this embodiment of this application may be radio frequency signals by which the terminal device 200 simultaneously communicates with access network devices of different standards. For example, the first radio frequency signal may be a radio frequency signal by which the terminal device 200 communicates with a 4G base station; and the second radio frequency signal may be a radio frequency signal by which the terminal device 200 communicates with a 5G base station.

In another example, the first radio frequency signal and the second radio frequency signal in this embodiment of this application may alternatively be radio frequency signals of different carriers in a same access network device.

In still another example, the first radio frequency signal and the second radio frequency signal in this embodiment of this application may alternatively be radio frequency signals by which the terminal device 200 communicates with an access network device via different SIM cards.

The radio frequency front-end module 220 in this embodiment of this application adopts a simplified radio frequency link, and supports transmission of the first radio frequency signal and the second radio frequency signal in any of the above examples, so as to reasonably utilize limited layout space of the radio frequency device of the terminal device 200 and guarantee use performance of the terminal device 200 in different application scenarios. For a specific structure and a radio frequency signal processing manner of the radio frequency front-end module 220, refer to description of the following embodiments.

It may be understood that the structure illustrated in this embodiment does not constitute a specific limitation to the terminal device 200. In some other embodiments of this application, the terminal device 200 may include more or fewer components than those shown in the figure, or some components may be combined or split, or there may be a different component arrangement. The components shown in the figure may be implemented with hardware, software, or a combination thereof.

Figure 3:
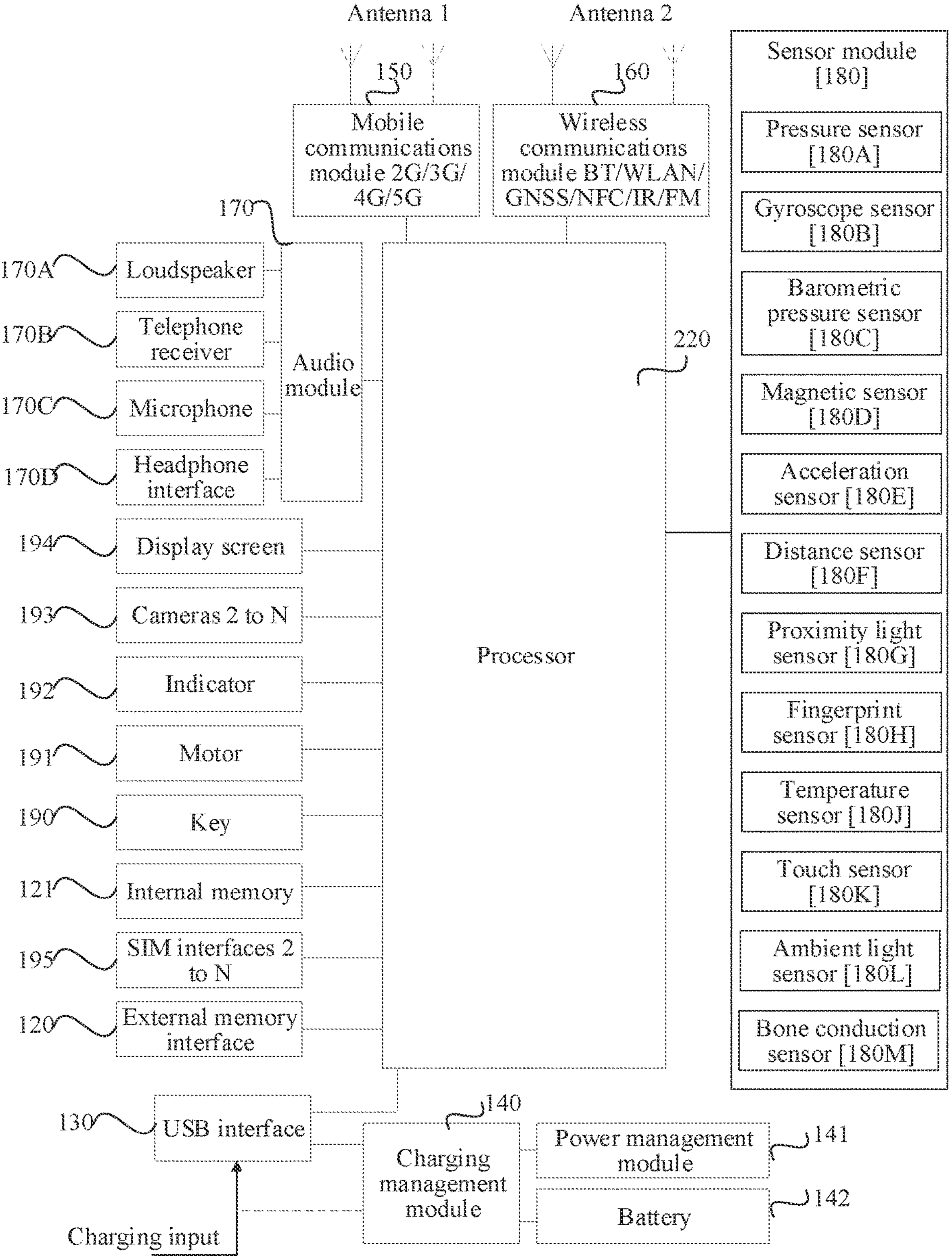
FIG. 3 is a schematic diagram of another terminal device according to an embodiment of this application.

For example, the following uses an example in which the terminal device 200 is a mobile phone to illustrate a specific structure of the terminal device 200. FIG. 3 shows a schematic structural diagram of a terminal device 200 (for example, a mobile phone). This embodiment is illustrated by using an example in which the antenna module 240 of the terminal device 200 includes an antenna 1 and an antenna 2.

The terminal device 200 may include a processor 110, an external memory interface 120, an internal memory 121, a universal serial bus (USB) interface 130, a charging management module 140, a power management module 141, a battery 142, the antenna 1, the antenna 2, a mobile communications module 150, a wireless communications module 160, an audio module 170, a loudspeaker 170A, a telephone receiver 170B, a microphone 170C, a headphone jack 170D, a sensor 180, a button 190, a motor 191, an indicator 192, a camera 193, a display screen 194, a subscriber identity module (SIM) card interface 195, and the like. It may be understood that the structure illustrated in this embodiment does not constitute a specific limitation to the terminal device 200. In some other embodiments of this application, the terminal device 200 may include more or fewer components than those shown in the figure, or some components may be combined or split, or there may be a different component arrangement. The components shown in the figure may be implemented with hardware, software, or a combination thereof.

For description of the processor 110, refer to the description of the processor 210 in the embodiment shown in FIG. 2. Details are not described herein again.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. The USB interface 130 is an interface conforming to the USB standard specification, and may specifically be a mini USB interface, a micro USB interface, a USB Type-C interface, or the like. The USB interface 130 may be configured to connect a charger for charging the terminal device 200, configured to transmit data between the terminal device 200 and a peripheral device, or configured to connect a headphone to play audio through the headphone.

It can be understood that an interface connection relationship, between modules, illustrated in this embodiment of this application is merely an example description, and does not constitute a limitation on a structure of the terminal device 200. In some other embodiments of this application, the terminal device 200 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the terminal device 200. When the charging management module 140 is charging the battery 142, power may be further supplied to the terminal device 200 by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display screen 194, the camera 193, the wireless communications module 160, and the like. The power management module 141 may be further configured to monitor parameters such as a battery capacity, a quantity of battery cycles, and a battery health status (leakage and impedance). In some other embodiments, the power management module 141 may be alternatively disposed in the processor 110. In some other embodiments, the power management module 141 and the charging management module 140 may be alternatively disposed in a same component.

The foregoing radio frequency front-end power supply module 230 may be a functional sub-module that is in the power management module 141 and is configured to supply power to the radio frequency front-end module.

A wireless communication function of the terminal device 200 may be implemented by using the antenna 1, the antenna 2, the mobile communications module 150, the wireless communications module 160, a modem processor, a baseband processor, and the like. The antenna 1 and the antenna 2 are configured to transmit and receive electromagnetic wave signals. Each antenna in the terminal device 200 may be configured to cover a single communication frequency band or a plurality of communication frequency bands. Alternatively, different antennas may be multiplexed to improve antenna utilization. For example, the antenna 1 may be multiplexed as a diversity antenna of a wireless local area network.

The mobile communications module 150 can provide solutions for wireless communications such as 2G, 3G, 4G, and 5G which are applied to the terminal device 200. The mobile communications module 150 may include at least one filter, a switch, a power amplifier, a low noise amplifier, and the like. The mobile communications module 150 may be the radio frequency front-end module 220 shown in FIG. 2. The mobile communications module 150 may receive an electromagnetic wave through the antenna 1, and preform processing such as filtering and amplification on the received electromagnetic wave. The mobile communications module 150 may further amplify an RF signal, and convert an amplified signal into an electromagnetic wave for radiation by using the antenna 1. In some embodiments, at least some functional modules of the mobile communications module 150 may be disposed in the processor 110. In some embodiments, at least some of the functional modules of the mobile communications module 150 may be disposed in a same device as at least some of the modules of the processor 110.

The wireless communications module 160 can provide solutions for wireless communications such as WLAN, Bluetooth, GNSS, FM, NFC, and IR which are applied to the terminal device 200. The wireless communications module 160 may be one or more devices integrating at least one communications processor module. The wireless communications module 160 receives an electromagnetic wave by using the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert a frequency-modulated and amplified signal into an electromagnetic wave for radiation by using the antenna 2.

In some embodiments, the antenna 1 of the terminal device 200 is coupled to the mobile communications module 150, and the antenna 2 is coupled to the wireless communications module 160, so that the terminal device 200 can communicate with a network and another device through a mobile communication technology or wireless communication technology.

The terminal device 200 can implement a display function by using a GPU, the display screen 194, an application processor, and the like. The GPU is a microprocessor for image processing, and is connected to the display screen 194 and the application processor. The GPU is configured to perform mathematical and geometric calculation, and is used for graphics rendering. The processor 110 may include one or more GPUs that execute an instruction to generate or change display information.

The display screen 194 is configured to display an image, a video, or the like. The display screen 194 includes a display panel. The display panel may use a liquid crystal display (LCD), an organic light-emitting diode (OLED), an active-matrix organic light emitting diode or an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal device 200 may include one or N display screens 194, where N is a positive integer greater than 1.

The terminal device 200 may implement a shooting function by using an ISP, one or more cameras 193, a video codec, the GPU, one or more display screens 194, the application processor, and the like.

The external memory interface 120 may be configured to connect an external storage card, for example, a micro SD card, thereby extending a storage capability of the terminal device 200. The external storage card communicates with the processor 110 through the external memory interface 120, to implement a data storage function. For example, data files such as music, a picture, and a video are stored into the external storage card.

The internal memory 121 may be configured to store one or more computer programs, and the one or more computer programs include instructions. The processor 110 may execute various functional applications, data processing, and the like by running the foregoing instructions stored in the internal memory 121. The internal memory 121 may include a program storage area and a data storage area. The program storage area may store an operating system. The program storage area may further store one or more applications (for example, “gallery” and “contacts”) and the like. The data storage area may store data (for example, photos and contacts) and the like created during use of the terminal device 200. In addition, the internal memory 121 may include a high-speed random access memory, and may also include a non-volatile memory, for example, at least one magnetic disk storage device, a flash memory device, or a universal flash storage (UFS).

The terminal device 200 may use the audio module 170, the loudspeaker 170A, the telephone receiver 170B, the microphone 170C, the headphone jack 170D, the application processor, and the like to implement an audio function, for example, music playback and sound recording. The audio module 170 is configured to convert digital audio information into an analog audio signal, and convert an analog audio input into a digital audio signal. The audio module 170 may further be configured to encode and decode audio signals. In some embodiments, the audio module 170 may be disposed in the processor 110, or some functional modules of the audio module 170 may be disposed in the processor 110. The speaker 170A, also referred to as “horn”, is configured to convert an electrical audio signal into a sound signal. The terminal device 200 may listen to music or answer a hands-free call through the speaker 170A. The telephone receiver 170B, also referred to as "handset", is configured to convert an electrical audio signal into a sound signal. A user using the terminal device 200 may answer a call or listen to a voice message by moving the telephone receiver 170B close to his/her ear. The microphone 170C, also referred to as "voice tube" or "mike", is configured to convert a sound signal into an electrical signal. When making a call or sending a voice message, the user can make a sound with the microphone 170C close to his/her mouth, so as to input a sound signal into the microphone 170C. The terminal device 200 may be provided with at least one microphone 170C. In some other embodiments, the terminal device 200 may be provided with two microphones 170C that may implement a noise reduction function in addition to collecting sound signals. In some other embodiments, the terminal device 200 may alternatively be provided with three, four, or more microphones 170C to collect a sound signal, reduce noise, identify a sound source, implement a directional recording function, and the like. The headphone jack 170D is configured to connect a wired headphone. The headphone jack 170D may be a USB interface 130, a 3.5 mm open mobile terminal platform (OMTP) standard interface, or a cellular telecommunications industry association of the USA (CTIA) standard interface.

The sensor 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The key 190 includes a start key, a volume key, and the like. The key 190 may be a mechanical key or a touch key. The terminal device 200 may receive a key input, and generate a key signal input related to a user setting and function control of the terminal device 200.

The SIM card interface 195 is configured to connect a SIM card. The SIM card may be inserted into the SIM card interface 195 or withdrawn from the SIM card interface 195, thereby getting in contact with or being separated from the terminal device 200. The terminal device 200 may support one or N SIM card interfaces, where N is a positive integer greater than 1. The SIM card interface 195 may support a nano SIM card, a micro SIM card, a SIM card, or the like. A plurality of cards can be inserted into a same SIM card interface 195 at the same time. The plurality of cards may be the same as or different from each other. The SIM card interface 195 may be further compatible with SIM cards of different types. The SIM card interface 195 may also be compatible with an external storage card. The terminal device 200 interacts with a network via a SIM card, thereby implementing functions such as making/answering a call and data communication. In some embodiments, the terminal device 200 uses an eSIM, namely, embedded SIM card. The eSIM card may be embedded in the terminal device 200, and cannot be separated from the terminal device 200.

The following describes the radio frequency front-end module in this embodiment of this application with reference to several specific embodiments.

Figure 4:
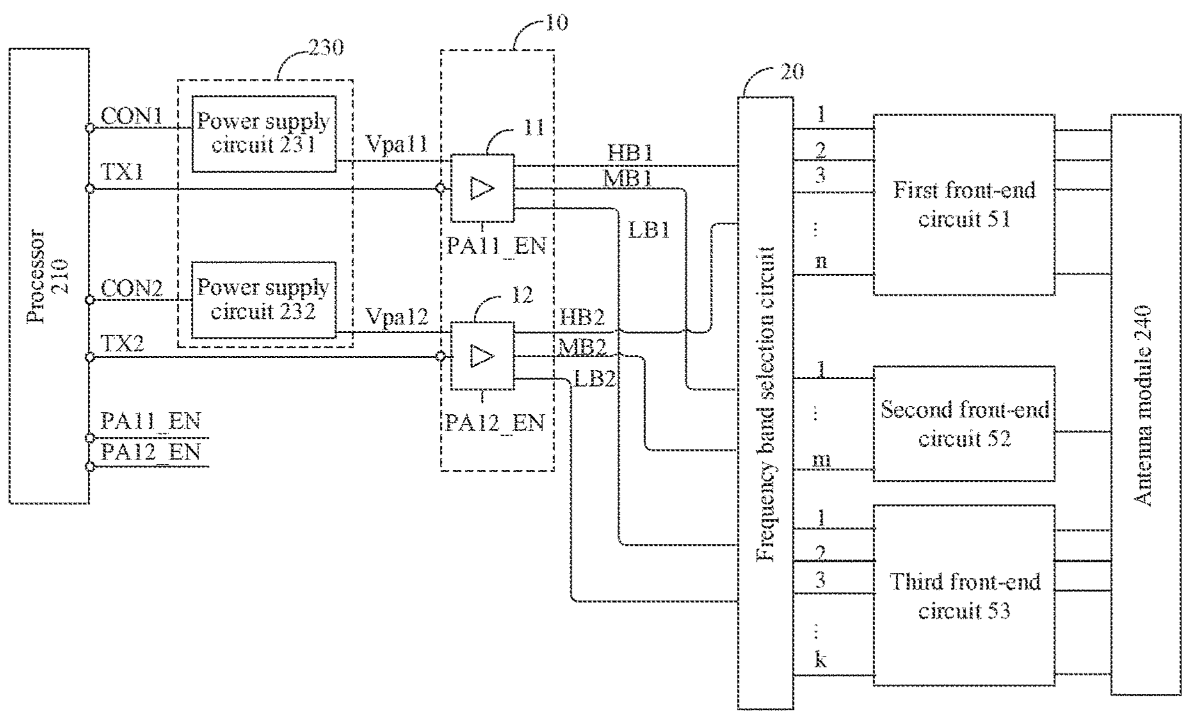
FIG. 4 is a schematic diagram of another terminal device according to an embodiment of this application.

FIG. 4 is a schematic structural diagram of another terminal device according to an embodiment of this application. As shown in FIG. 4, the terminal device may include a processor 210, a radio frequency front-end module 220, a radio frequency front-end power supply module 230, and an antenna module 240. The radio frequency front-end module 220 may include a power amplification circuit 10, a frequency band selection circuit 20, and a front-end circuit 50. The front-end circuit 50 may include a first front-end circuit 51.

The power amplification circuit 10 is configured to perform power amplification on a first radio frequency signal and a second radio frequency signal output by the processor 210, and then output an amplified radio frequency signal to the frequency band selection circuit 20. In some embodiments, the power amplification circuit 10 may include a first power amplifier 11 and a second power amplifier 12. The first power amplifier 11 is configured to perform power amplification on the first radio frequency signal, and output an amplified first radio frequency signal to the frequency band selection circuit 20. The second power amplifier 12 is configured to perform power amplification on the second radio frequency signal, and output an amplified second radio frequency signal to the frequency band selection circuit 20.

The frequency band selection circuit 20 is configured to: route the amplified first radio frequency signal to the first front-end circuit 51 when the first radio frequency signal meets a first frequency band, and route the amplified second radio frequency signal to the first front-end circuit 51 when the second radio frequency signal meets a second frequency band, where the first front-end circuit 51 supports both the first frequency band and the second frequency band. The first front-end circuit 51 is configured to perform filtering and/or combination on at least one of the amplified first radio frequency signal or the amplified second radio frequency signal, to obtain a first transmission signal. The antenna module 240 is configured to transmit the first transmission signal.

The first frequency band and the second frequency band belong to a first frequency range. The first frequency range includes a frequency range of an HB, a frequency range of an MB, or a frequency range of an LB. For example, the first frequency range is the frequency range of the HB; the first frequency band may include one or more of 5G high frequency bands such as N41, N7, or N40; and the second frequency band may include one or more of 4G high frequency bands such as B41, B7, or B40. For another example, the first frequency range is the frequency range of the HB; the first frequency band may include one or more of 5G high frequency bands such as N41, N7, or N40; and the second frequency band may include one or more of 5G high frequency bands such as N41, N7, or N40. For still another example, the first frequency range is the frequency range of the HB; the first frequency band may include one or more of 4G high frequency bands such as B41, B7, or B40; and the second frequency band may include one or more of 4G high frequency bands such as B41, B7, or B40.

In some embodiments, the frequency band selection circuit 20 may include signal ends of n first sub-frequency bands, the signal ends of the n first sub-frequency bands are separately coupled with the first front-end circuit 51, and n is a positive integer. The frequency band selection circuit 20 is configured to: when the first radio frequency signal meets the first frequency band and one first sub-frequency band of the n first sub-frequency bands, output the amplified first radio frequency signal to the first front-end circuit 51 through a signal end of the first sub-frequency band; and when the second radio frequency signal meets the second frequency band and one first sub-frequency band of the n first sub-frequency bands, output the amplified second radio frequency signal to the first front-end circuit 51 through the signal end of the first sub-frequency band, where the n first sub-frequency bands belong to the first frequency range. For example, in a case that the first frequency range is a frequency range of the HB, and n=3, the three first sub-frequency bands may include a frequency range of a first sub-frequency band corresponding to B41 and N41; a frequency range of a first sub-frequency band corresponding to B7 and N7; and a frequency range of a first sub-frequency band corresponding to B40 and N40. Correspondingly, a signal end of a first sub-frequency band of the frequency band selection circuit 20 is configured to output a first radio frequency signal and/or a second radio frequency signal whose frequency belongs to the first sub-frequency band.

For example, the first radio frequency signal is a radio frequency signal of N41, the second radio frequency signal is a radio frequency signal of B41, the first radio frequency signal meets a frequency range of a first sub-frequency band corresponding to B41 and N41, the frequency band selection circuit 20 outputs the amplified first radio frequency signal to the first front-end circuit 51 through a signal end of the first sub-frequency band corresponding to B41 and N41, the second radio frequency signal meets the frequency range of the first sub-frequency band corresponding to B41 and N41, and the frequency band selection circuit 20 outputs the amplified second radio frequency signal to the first front-end circuit 51 through the signal end of the first sub-frequency band corresponding to B41 and N41.

Optionally, the front-end circuit 50 may further include a second front-end circuit 52. The frequency band selection circuit 20 is further configured to: route the amplified first radio frequency signal to the second front-end circuit 52 when the first radio frequency signal meets a third frequency band, and route the amplified second radio frequency signal to the second front-end circuit 52 when the second radio frequency signal meets a fourth frequency band, where the second front-end circuit 52 supports both the third frequency band and the fourth frequency band. The second front-end circuit 52 is configured to perform filtering and/or combination on at least one of the amplified first radio frequency signal or the amplified second radio frequency signal, to obtain a second transmission signal. The antenna module 240 is further configured to transmit the second transmission signal.

The third frequency band and the fourth frequency band belong to a second frequency range. Each of the second frequency range and the first frequency range includes any two of the frequency range of the HB, the frequency range of the MB, or the frequency range of the LB. For example, the first frequency range is the frequency range of the HB; the second frequency range is the frequency range of the MB; the third frequency band may include one or more of 5G middle frequency bands such as N1 or N3; and the fourth frequency band may include one or more of 4G middle frequency bands such as B1 or B3. For another example, the first frequency range is the frequency range of the HB; the second frequency range is the frequency range of the MB; the third frequency band may include one or more of 5G middle frequency bands such as N1 or N3; and the fourth frequency band may include one or more of 5G middle frequency bands such as N1 or N3. For still another example, the first frequency range is the frequency range of the HB; the second frequency range is the frequency range of the MB; the third frequency band may include one or more of 4G middle frequency bands such as B1 or B3; and the fourth frequency band may include one or more of 4G middle frequency bands such as B1 or B3.

In some embodiments, the frequency band selection circuit 20 may further include signal ends of m second sub-frequency bands, the signal ends of the m first sub-frequency bands are separately coupled with the second front-end circuit 52, and m is a positive integer. The frequency band selection circuit 20 is configured to: when the first radio frequency signal meets the third frequency band and one second sub-frequency band of the m second sub-frequency bands, output the amplified first radio frequency signal to the second front-end circuit 52 through a signal end of the second sub-frequency band; and when the second radio frequency signal meets the fourth frequency band and one second sub-frequency band of the m second sub-frequency bands, output the amplified second radio frequency signal to the second front-end circuit 52 through the signal end of the second sub-frequency band, where the m second sub-frequency bands belong to the second frequency range. For example, in a case that the second frequency range is the frequency range of the MB, and m=2, the two first sub-frequency bands may include a frequency range of a second sub-frequency band corresponding to B1 and N1; and a frequency range of a second sub-frequency band corresponding to B3 and N3. Correspondingly, a signal end of a second sub-frequency band of the frequency band selection circuit 20 is configured to output a first radio frequency signal and/or a second radio frequency signal whose frequency belongs to the second sub-frequency band.

For example, the first radio frequency signal is a radio frequency signal of N1, the second radio frequency signal is a radio frequency signal of B1, the first radio frequency signal meets a frequency range of a second sub-frequency band corresponding to B1 and N1, the frequency band selection circuit 20 outputs the amplified first radio frequency signal to the second front-end circuit 52 through a signal end of the second sub-frequency band corresponding to B1 and N1, the second radio frequency signal meets the frequency range of the second sub-frequency band corresponding to B1 and N1, and the frequency band selection circuit 20 outputs the amplified second radio frequency signal to the second front-end circuit 52 through the signal end of the second sub-frequency band corresponding to B1 and N1.

Optionally, the front-end circuit 50 may further include a third front-end circuit 53. The frequency band selection circuit 20 is further configured to: route the amplified first radio frequency signal to the third front-end circuit 53 when the first radio frequency signal meets a fifth frequency band, and route the amplified second radio frequency signal to the third front-end circuit 53 when the second radio frequency signal meets a sixth frequency band, where the third front-end circuit 53 supports both the fifth frequency band and the sixth frequency band. The third front-end circuit 53 is configured to perform filtering and/or combination on at least one of the amplified first radio frequency signal or the amplified second radio frequency signal, to obtain a third transmission signal. The antenna module 240 is further configured to transmit the third transmission signal.

The fifth frequency band and the sixth frequency band belong to a third frequency range. Each of the third frequency range, the second frequency range, and the first frequency range is any of the frequency range of the HB, the frequency range of the MB, or the frequency range of the LB, respectively. Any two of the first frequency range, the second frequency range, and the third frequency range are different. For example, the first frequency range is the frequency range of the HB; the second frequency range is the frequency range of the MB; the third frequency range is the frequency range of the LB; the fifth frequency band may include one or more of 5G low frequency bands such as N28A, N28B, N20, or N8; and the sixth frequency band may include one or more of 4G low frequency bands such as B28A, B28B, B20, or B8. For another example, the first frequency range is the frequency range of the HB; the second frequency range is the frequency range of the MB; the third frequency range is the frequency range of the LB; the fifth frequency band may include one or more of 5G low frequency bands such as N28A, N28B, N20, or N8; and the sixth frequency band may include one or more of 5G low frequency bands such as N28A, N28B, N20, or N8. For still another example, the first frequency range is the frequency range of the HB; the second frequency range is the frequency range of the MB; the third frequency range is the frequency range of the LB; the fifth frequency band may include one or more of 4G low frequency bands such as B28A, B28B, B20, or B8; and the sixth frequency band may include one or more of 4G low frequency bands such as B28A, B28B, B20, or B8.

In some embodiments, the frequency band selection circuit 20 may further include signal ends of k third sub-frequency bands, the signal ends of the k third sub-frequency bands are separately coupled with the third front-end circuit 53, and k is a positive integer. The frequency band selection circuit 20 is configured to: when the first radio frequency signal meets the fifth frequency band and one third sub-frequency band of the k third sub-frequency bands, output the amplified first radio frequency signal to the third front-end circuit 53 through a signal end of the third sub-frequency band; and when the second radio frequency signal meets the sixth frequency band and one third sub-frequency band of the k third sub-frequency bands, output the amplified second radio frequency signal to the third front-end circuit 53 through the signal end of the third sub-frequency band, where the k third sub-frequency bands belong to the third frequency range. For example, in a case that the third frequency range is the frequency range of the LB, and k=4, the four third sub-frequency bands may include a frequency range of a third sub-frequency band corresponding to B28A and N28A; a frequency range of a third sub-frequency band corresponding to B20 and N20; a frequency range of a third sub-frequency band corresponding to B8 and N8; and a frequency range of a third sub-frequency band corresponding to B28B and N28B. Correspondingly, a signal end of a third sub-frequency band of the frequency band selection circuit 20 is configured to output a first radio frequency signal and/or a second radio frequency signal whose frequency belongs to the third sub-frequency band.

For example, the first radio frequency signal is a radio frequency signal of N8, the second radio frequency signal is a radio frequency signal of B8, the first radio frequency signal meets a frequency range of a third sub-frequency band corresponding to B8 and N8, the frequency band selection circuit 20 outputs the amplified first radio frequency signal to the third front-end circuit 53 through a signal end of the third sub-frequency band corresponding to B8 and N8, the second radio frequency signal meets the frequency range of the third sub-frequency band corresponding to B8 and N8, and the frequency band selection circuit 20 outputs the amplified second radio frequency signal to the third front-end circuit 53 through the signal end of the third sub-frequency band corresponding to B8 and N8.

In this embodiment, the frequency band selection circuit can implement switching between radio frequency signals output from the power amplification circuit to the antenna module, so as to route the radio frequency signals to an antenna of a corresponding frequency. Therefore, the radio frequency front-end module in this embodiment can implement switching and routing of the first radio frequency signal and the second radio frequency signal without relying on the processor.

In some embodiments, an output end of the first power amplifier 11 may include a first HB output end HB1, a first MB output end MB1, and a first LB output end LB1. The first power amplifier 11 is configured to perform power amplification on the first radio frequency signal, and output the amplified first radio frequency signal to the frequency band selection circuit 20 through the first HB output end HB1, the first MB output end MB1, or the first LB output end LB1. When the first radio frequency signal is an HB radio frequency signal, after performing power amplification on the first radio frequency signal, the first power amplifier 11 outputs the amplified first radio frequency signal to the frequency band selection circuit 20 through the first HB output end HB1. When the first radio frequency signal is an MB radio frequency signal, after performing power amplification on the first radio frequency signal, the first power amplifier 11 outputs the amplified first radio frequency signal to the frequency band selection circuit 20 through the first MB output end MB1. When the first radio frequency signal is an LB radio frequency signal, after performing power amplification on the first radio frequency signal, the first power amplifier 11 outputs the amplified first radio frequency signal to the frequency band selection circuit 20 through the first LB output end LB1. An output end of the second power amplifier 12 includes a second HB output end HB2, a second MB output end MB2, and a second LB output end LB2. The second power amplifier 12 is configured to perform power amplification on the second radio frequency signal, and output the amplified second radio frequency signal to the frequency band selection circuit 20 through the second HB output end HB2, the second MB output end MB2, or the second LB output end LB2. When the second radio frequency signal is an HB radio frequency signal, after performing power amplification on the second radio frequency signal, the second power amplifier 12 outputs the amplified second radio frequency signal to the frequency band selection circuit 20 through the second HB output end HB2. When the second radio frequency signal is an MB radio frequency signal, after performing power amplification on the second radio frequency signal, the second power amplifier 12 outputs the amplified second radio frequency signal to the frequency band selection circuit 20 through the second MB output end MB2. When the second radio frequency signal is an LB radio frequency signal, after performing power amplification on the second radio frequency signal, the second power amplifier 12 outputs the amplified second radio frequency signal to the frequency band selection circuit 20 through the second LB output end LB2.

Optionally, the antenna module 240 may include one or more first antennas and one or more second antennas. The one or more first antennas may support a high frequency band and/or a 5G high frequency band; and the one or more second antennas may support a middle frequency band, a middle-low frequency band, a middle-high frequency band, or a low frequency band. Specifically, these antennas may be reasonably disposed according to frequencies of the first radio frequency signal and the second radio frequency signal.

Optionally, a value of n is related to a quantity of frequency bands of an HB supported by the terminal device; a value of m is related to a quantity of frequency bands of an MB supported by the terminal device; and a value of k is related to a quantity of frequency bands of an LB supported by the terminal device. For example, in a case that the terminal device supports N41 and N7, n is equal to 2.

It should be noted that, a control signal of an active device in the radio frequency front-end module 220 in this embodiment of this application may be provided by the processor 210. For example, enabling signals of the first power amplifier 11 and the second power amplifier 12 in the radio frequency front-end module 220 may be provided by enabling ends PA11_EN, PA12_EN, and PA13_EN. Certainly, it may be understood that a control signal of another active device in the radio frequency front-end module 220 may also be provided by the processor 210. Such signals are not enumerated in this embodiment of this application.

In addition, the processor 210 may also provide a control signal to the radio frequency front-end power supply module 230, so that the radio frequency front-end power supply module 230 can provide a corresponding power supply voltage to the radio frequency front-end module 220.

In some embodiments, the radio frequency front-end power supply module 230 may include a power supply circuit 231 and a power supply circuit 232. The power supply circuit 231 is configured to provide a power supply voltage to the first power amplifier 11. The power supply circuit 232 is configured to provide a power supply voltage to the second power amplifier 12. For example, a power supply voltage end of the first power amplifier 11 is Vpa11 shown in FIG. 4; and a power supply voltage end of the second power amplifier 12 is Vpa12 shown in FIG. 4.

In this embodiment, a frequency band selection circuit is disposed. The frequency band selection circuit may separately route a first radio frequency signal and a second radio frequency signal to a first front-end circuit, a second front-end circuit, or a third front-end circuit, and the first front-end circuit, the second front-end circuit, or the third front-end circuit may perform filtering and/or combination on the first radio frequency signal and the second radio frequency signal, where a first radio frequency front-end channel configured to send the first radio frequency signal and a second radio frequency front-end channel configured to send the second radio frequency signal may share a filtering circuit, so that devices such as a filter and a duplexer at a radio frequency front end can be reduced, thereby reducing space occupied by a radio frequency front-end module.

In addition, the first radio frequency front-end channel and the second radio frequency front-end channel may share an antenna, thereby reducing a quantity of antennas. Different antennas may support transmission of radio frequency signals of different frequency bands, thereby reducing frequency ranges that the antenna needs to support.

It should be noted that, in this embodiment of this application, the first radio frequency front-end channel is a channel composed of devices through which the first radio frequency signal is transmitted from the processor to the antenna module; and the second radio frequency front-end channel is a channel composed of devices through which the second radio frequency signal is transmitted from the processor to the antenna module.

Figure 5:
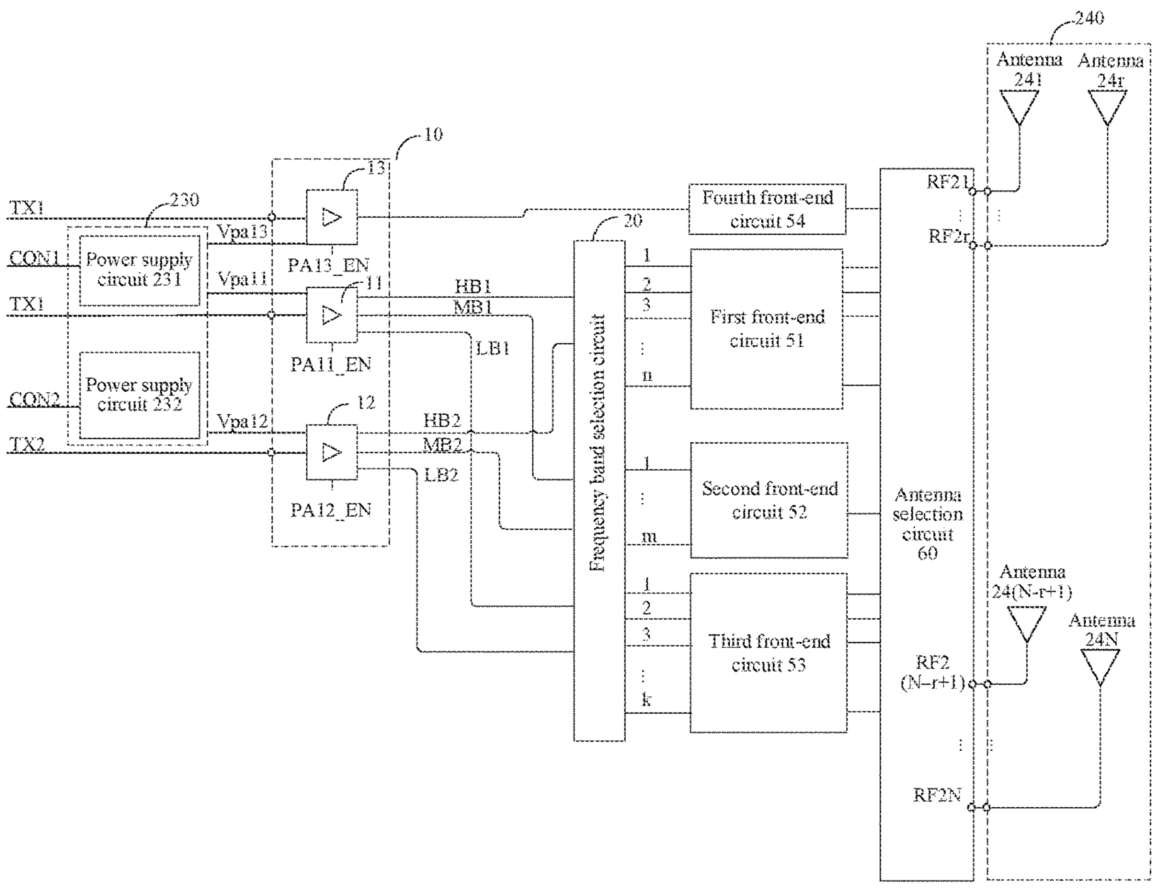
FIG. 5 is a schematic diagram of a radio frequency front-end module according to an embodiment of this application.

FIG. 5 is a schematic structural diagram of a radio frequency front-end module 220 according to an embodiment of this application. Based on the embodiment shown in FIG. 4, in this embodiment, the radio frequency front-end module 220 may further include an antenna selection circuit 60.

The antenna module 240 in this embodiment may include r first antennas and N−r+1 second antennas. The r first antennas may include an antenna 241, . . . , and an antenna 24*r*. The N−r+1 second antennas may include an antenna 24(N−r+1), . . . , and 24N.

An input end of the antenna selection circuit 60 is separately coupled with an output end of the first front-end circuit 51, an output end of the second front-end circuit 52, and an output end of the third front-end circuit 53. An output end of the antenna selection circuit 60 is coupled with the antenna module 240. The antenna selection circuit 60 is configured to output the first transmission signal to the r first antennas, output the second transmission signal to one or more of the N−r+1 second antennas, and output the third transmission signal to one or more of the N−r+1 second antennas. In other words, the antenna selection circuit 60 is configured to: route at least one of the first transmission signal, the second transmission signal, or the third transmission signal to a corresponding antenna, and transmit the signal through the antenna.

The radio frequency front-end module 220 may further include a first radio frequency signal end RF21, . . . , an $r^{th}$ radio frequency signal end RF2r, an $(N-r+1)^{th}$ radio frequency signal end RF2(N−r+1), . . . , and an $N^{th}$ radio frequency signal end RF2N. r may be a positive integer greater than 1. The first radio frequency signal end RF21 of the radio frequency front-end module 220 is connected to the antenna 241; the $r^{th}$ radio frequency signal end RF2r of the radio frequency front-end module 220 is connected to the antenna 24*r*; the $(N-r+1)^{th}$ radio frequency signal end RF2(N−r+1) of the radio frequency front-end module 220 is connected to the antenna 24(N−r+1); . . . ; the $N^{th}$ radio frequency signal end RF2N of the radio frequency front-end module 220 is connected to the antenna 24N.

For example, r may be 2, and N may be 4. In other words, the antenna module 240 may include four antennas. The antenna module 240 may include two high-frequency antennas and two middle-low-frequency antennas. The high-frequency antenna is configured to support transmission of a radio frequency signal of a 5G high frequency band or the HB. The middle-low-frequency antenna is configured to support transmission of a radio frequency signal of an LMB. The two high-frequency antennas are the antenna 241 and the antenna 242. The two middle-low-frequency antennas are the antenna 243 and the antenna 244.

For example, r may be 4, and N may be 7. The antenna module 240 may include four high-frequency antennas, two middle-high-frequency antennas, and one low-frequency antenna. The high-frequency antenna is configured to support transmission of a radio frequency signal of a 5G high frequency band or the HB. The middle-high-frequency antenna is configured to support transmission of a radio frequency signal of an MHB. The low-frequency antenna is configured to support transmission of a radio frequency signal of the LB. The four high-frequency antennas are the antenna 241, the antenna 242, the antenna 243, and the antenna 244. The two middle-high-frequency antennas are the antenna 245 and the antenna 246. The low-frequency antenna is the antenna 247.

For example, in a case that the first frequency range is the frequency range of the HB, the second frequency range is the frequency range of the MB, and the third frequency range is the frequency range of the LB, the antenna selection circuit 60 is configured to: route the first transmission signal output by the first front-end circuit to the high-frequency antenna, route the second transmission signal output by the second front-end circuit to the middle-frequency antenna, and route the third transmission signal output by the third front-end circuit to the low-frequency antenna.

In some embodiments, the foregoing radio frequency front-end module 220 may further include a third power amplifier 13 and a fourth front-end circuit 54. A power supply voltage end of the third power amplifier 13 is Vpa13 shown in FIG. 5.

The third power amplifier 13 is configured to perform power amplification on the first radio frequency signal when a frequency of the first radio frequency signal belongs to a fourth frequency range, and output an amplified first radio frequency signal to the frequency band selection circuit 20. The first power amplifier 11 is configured to perform power amplification on the first radio frequency signal when the frequency of the first radio frequency signal belongs to the first frequency range, the second frequency range, or the third frequency range, and output an amplified first radio frequency signal to the frequency band selection circuit 20. The frequency band selection circuit 20 is further configured to route the amplified first radio frequency signal to the fourth front-end circuit 54 when the frequency of the first radio frequency signal belongs to the fourth frequency range. The fourth front-end circuit 54 is configured to perform filtering on the amplified first radio frequency signal to obtain a fourth transmission signal, or use the amplified first radio frequency signal as a fourth transmission signal. The antenna module 240 is further configured to transmit the fourth transmission signal. The fourth frequency range may be a frequency range of the 5G high frequency band.

Optionally, the antenna selection circuit 60 is further configured to output the fourth transmission signal to one or more of the r first antennas and output the first transmission signal to one or more of the N−r+1 second antennas when the frequency of the first radio frequency signal belongs to the 5G high frequency band and the frequency of the second radio frequency signal belongs to the frequency range of the HB. The first antenna supports the frequency range of the 5G high frequency band or the HB, and the second antenna supports the frequency range of the MHB.

The terminal device of the radio frequency front-end module in this embodiment of this application can support simultaneous transmission of a first radio frequency signal of any frequency band and a second radio frequency signal of any frequency band. The first radio frequency signal and the second radio frequency signal may be of different standards. The terminal device may support LTE-NR dual connectivity, for example, DC_LB_MHB, DC_LB_5G high frequency band, DC_MHB_LB, DC_MB_MB, DC_HB_MB, DC_MB_HB, DC_LB_MB, DC_MB_LB, DC_MB_5G high frequency band, DC_HB_HB, DC_LB_HB, DC_HB_LB, DC_HB_5G high frequency band, and DC_LB_LB. When an NSA combination of DC_LB_LB is supported, a low-frequency antenna can be reduced, thereby lowering antenna implementation difficulty.

In this embodiment, a frequency band selection circuit is disposed. The frequency band selection circuit may separately route a first radio frequency signal and a second radio frequency signal to a first front-end circuit, a second front-end circuit, or a third front-end circuit, and the first front-end circuit, the second front-end circuit, or the third front-end circuit may perform filtering and/or combination on the first radio frequency signal and the second radio frequency signal, where a first radio frequency front-end channel configured to send the first radio frequency signal and a second radio frequency front-end channel configured to send the second radio frequency signal may share a filtering circuit, so that devices such as a filter and a duplexer at a radio frequency front end can be reduced, thereby reducing space occupied by a radio frequency front-end module.

In addition, the first radio frequency front-end channel and the second radio frequency front-end channel may share an antenna, thereby reducing a quantity of antennas. Different antennas may support transmission of radio frequency signals of different frequency bands, thereby reducing frequency ranges that the antenna needs to support.

The antenna selection circuit may route transmission signals of different frequencies to corresponding antennas for transmission.

When the second power amplifier supports an NR frequency band in performing an uplink service, the radio frequency front-end module in this embodiment may support simultaneous reception and transmission in an NR frequency band and a 5G high frequency band in a dual-card scenario, thereby improving a dual-card communication specification of a terminal device provided with the radio frequency front-end module.

Figure 6:
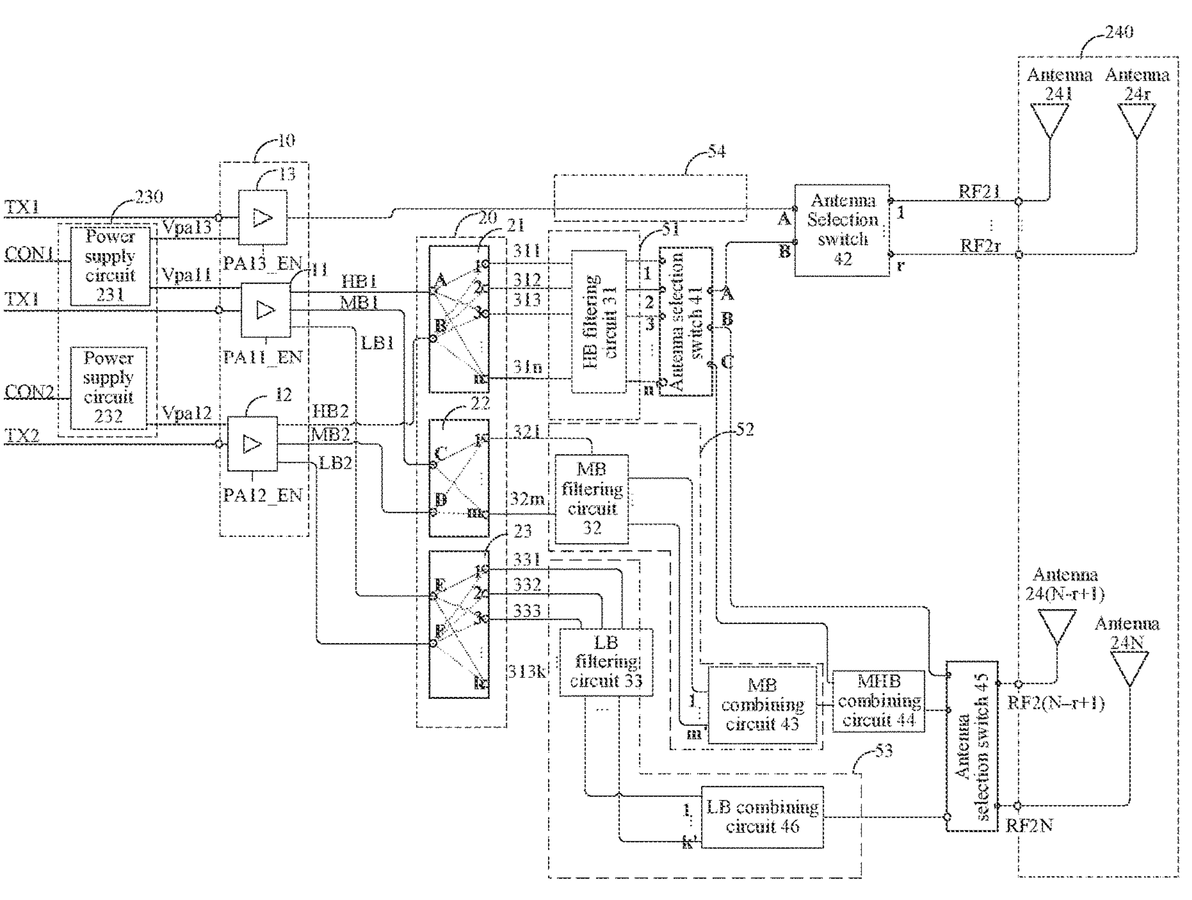
FIG. 6 is a schematic diagram of another radio frequency front-end module according to an embodiment of this application.

FIG. 6 is a schematic structural diagram of another radio frequency front-end module according to an embodiment of this application. As shown in FIG. 6, based on the embodiment shown in FIG. 5, in this embodiment, a specific structure of the radio frequency front-end module is described by using an example in which the first front-end circuit 51 supports the frequency range of the HB, the second front-end circuit 52 supports the frequency range of the MB, the third front-end circuit 53 supports the frequency range of the LB, and the fourth front-end circuit 54 supports the frequency range of the 5G high frequency band.

The signal ends of the n first sub-frequency bands are n HB signal ends (311, . . . , 31*n*); the signal ends of the m second sub-frequency bands are m MB signal ends (321, . . . , 32*m*); and the signal ends of the k third sub-frequency bands are k LB signal ends (331, . . . , 33*k*).

An output end of the frequency band selection circuit 20 may include n HB signal ends (311, . . . , 31*n*), m MB signal ends (321, . . . , 32*m*), and k LB signal ends (331, . . . , 33*k*). Each signal end corresponds to frequency bands of a same frequency. For example, the HB signal end 311 corresponds to N41 and B41.

A value of n is related to a quantity of frequency bands of an HB supported by the terminal device; a value of m is related to a quantity of frequency bands of an MB supported by the terminal device; and a value of k is related to a quantity of frequency bands of an LB supported by the terminal device. For example, in a case that the terminal device supports N41 and N7, n is equal to 2.

The frequency band selection circuit 20 is configured to route the amplified first radio frequency signal and the amplified second radio frequency signal to any one or two ports of then HB signal ends (311, . . . , 31*n*), m MB signal ends (321, . . . , 32*m*), or k LB signal ends (331, . . . , 33*k*) for outputting. For example, when the frequency band of the first radio frequency signal is N41, the frequency band selection circuit 20 routes the amplified first radio frequency signal to a signal end, corresponding to N41, of the n HB signal ends (311, . . . , 31*n*) for outputting; and when the frequency band of the second radio frequency signal is N3, the frequency band selection circuit 20 routes the amplified second radio frequency signal to a signal end, corresponding to N3, of the m MB signal ends (321, . . . , 32*m*) for outputting.

Optionally, the frequency band selection circuit 20 may include a first frequency band selection switch 21, a second frequency band selection switch 22, and a third frequency band selection switch 23. An input end of the first frequency band selection switch 21 is connected to a first HB output end HB1 of the first power amplifier 11 and a second HB output end HB2 of the second power amplifier 12. An output end of the first frequency band selection switch 21 is separately connected to the n HB signal ends (311, . . . , 31$n$). An input end of the second frequency band selection switch 22 is connected to a first MB output end MB1 of the first power amplifier 11 and a second MB output end MB2 of the second power amplifier 12. An output end of the second frequency band selection switch 22 is separately connected to the m MB signal ends (321, . . . , 32$m$). An input end of the third frequency band selection switch 23 is connected to a first LB output end LB1 of the first power amplifier 11 and a second LB output end LB2 of the second power amplifier 12. An output end of the third frequency band selection switch 23 is separately connected to the k LB signal ends (331, . . . , 33$k$).

The first front-end circuit 51 may include input ends correspondingly connected to then HB signal ends (311, . . . , 31$n$) of the frequency band selection circuit 20. The second front-end circuit 52 may include input ends correspondingly connected to the m MB signal ends (321, . . . , 32$m$) of the frequency band selection circuit 20. The third front-end circuit 53 may include input ends correspondingly connected to the k LB signal ends (331, . . . , 33$k$) of the frequency band selection circuit 20.

The first front-end circuit 51 may include an HB filtering circuit 31; the second front-end circuit 52 may include an MB filtering circuit 32; and the third front-end circuit 53 may include an LB filtering circuit 33.

In some embodiments, an input end of the HB filtering circuit 31 is connected to the n HB signal ends (311, . . . , 31$n$); An input end of the MB filtering circuit 32 is connected to the m MB signal ends (321, . . . , 32$m$). An input end of the LB filtering circuit 33 is connected to k LB signal ends (331, . . . , 33$k$). The HB filtering circuit 31 is configured to perform filtering on the first radio frequency signal of the HB and/or the second radio frequency signal of the HB. The MB filtering circuit 32 is configured to perform filtering on the first radio frequency signal of the MB and/or the second radio frequency signal of the MB. The LB filtering circuit 33 is configured to perform filtering on the first radio frequency signal of the LB and/or the second radio frequency signal of the LB.

It should be noted that, the HB filtering circuit 31, the MB filtering circuit 32, and the LB filtering circuit 33 may respectively perform filtering on frequency bands, or may perform filtering on a plurality of frequency bands that belong to a larger frequency band. Therefore, a quantity of output ends of each of the HB filtering circuit 31, the MB filtering circuit 32, and the LB filtering circuit 33 may be less than or equal to a quantity of input ends thereof. For example, an output end of the HB filtering circuit 31 may include n' HB signal ends (1, . . . , n'), an output end of the MB filtering circuit 32 may include m' MB signal ends (1, . . . , m'), and an output end of the LB filtering circuit 33 may include k' LB signal ends (1, . . . , k'), where $1 \le n' \le n$, $1 \le m' \le m$, and $1 \le k' \le k$.

In some embodiments, the second front-end circuit 52 may further include an MB combining circuit 43. An input end of the MB combining circuit 43 is connected to the m' MB signal ends (1, . . . , m'). The MB combining circuit 43 is configured to combine a filtered first radio frequency signal and/or a filtered second radio frequency signal output by the MB filtering circuit 32, and output a combined radio frequency signal to the antenna selection circuit 60. The antenna selection circuit 60 is configured to select a corresponding radio frequency signal end to be output to an antenna in the antenna module.

In some embodiments, the third front-end circuit 63 may further include an LB combining circuit 46. An input end of the LB combining circuit 46 is connected to the k' LB signal ends (1, . . . , k'). The LB combining circuit 46 is configured to combine a filtered first radio frequency signal and/or a filtered second radio frequency signal output by the LB filtering circuit 33, and output a combined radio frequency signal to the antenna selection circuit 60. The antenna selection circuit 60 is configured to select a corresponding radio frequency signal end to be output to an antenna in the antenna module.

The fourth front-end circuit 54 may include a wire used for connecting an output end of the third power amplifier 13 to the input end of the antenna selection circuit 60. Certainly, it may be understood that the fourth front-end circuit 54 may further include a filter of a 5G high frequency band.

In some embodiments, the antenna selection circuit 60 may include an antenna selection switch 41, an antenna selection switch 42, an MHB combining circuit 44, and an antenna selection module 45. An input end of the antenna selection switch 41 is separately connected to the output end of the HB filtering circuit 31. An input end of the antenna selection switch 42 is separately connected to the output end of the third power amplifier 13 and an output end of the antenna selection switch 41. An output end of the antenna selection switch 42 is separately connected to the first radio frequency signal end RF21, . . . , and the $r^{th}$ radio frequency signal end RF2r. The input end of the MB combining circuit 43 is connected to the output end of the MB filtering circuit 32. An input end of the MHB combining circuit 44 is separately connected to an output end of the MB combining circuit 43 and an output end of the antenna selection switch 41. The input end of the LB combining circuit 46 is separately connected to the output end of the LB filtering circuit 33. An input end of the antenna selection module 45 is separately connected to an output end of the MHB combining circuit 44, an output end of the antenna selection switch 41, and an output end of the LB combining circuit 46. The output end of the antenna selection module 45 is separately connected to the $(N-r+1)^{th}$ radio frequency signal end RF2(N−r+1), . . . , and the $N^{th}$ radio frequency signal end RF2N.

The first front-end circuit, the second front-end circuit, the third front-end circuit, and modules included by the antenna selection circuit may alternatively be implemented in another manner. For example, the first front-end circuit may further include an HB combining circuit; or the MB combining circuit 43, the MHB combining circuit 44, and the LB combining circuit 46 may be disposed in a combined manner. Certainly, it may be understood that, there may be other implementations that are not enumerated in this embodiment of this application by using examples.

In this embodiment, a frequency band selection circuit is disposed. The frequency band selection circuit may separately route a first radio frequency signal and a second radio frequency signal to an HB signal end, an MB signal end, or an LB signal end, where the HB filtering circuit may perform filtering on a radio frequency signal of the HB signal end, the MB filtering circuit may perform filtering on a radio frequency signal of the MB signal end, and the LB filtering circuit may perform filtering on a radio frequency signal of the LB signal end, where a first radio frequency front-end channel configured to send the first radio frequency signal and a second radio frequency front-end channel configured to send the second radio frequency signal may share a filtering circuit, so that devices such as a filter and a duplexer at a radio frequency front end can be reduced, thereby reducing space occupied by a radio frequency front-end module.

In addition, the first radio frequency front-end channel and the second radio frequency front-end channel may share an antenna, thereby reducing a quantity of antennas. Different antennas may support transmission of radio frequency signals of different frequency bands, thereby reducing frequency ranges that the antenna needs to support.

Figure 7:
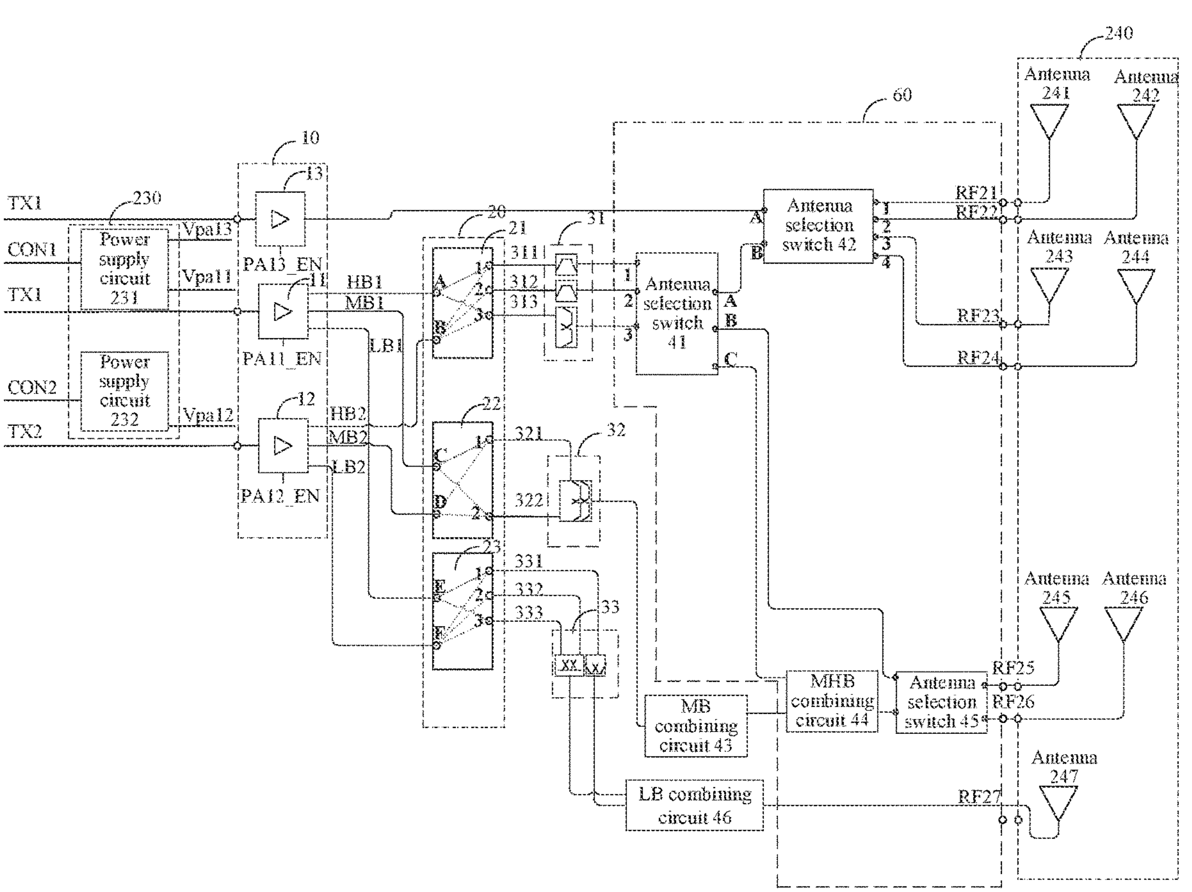
FIG. 7 is a schematic diagram of another radio frequency front-end module according to an embodiment of this application.

The following embodiment shown in FIG. 7 of this application is described by using an example in which the antenna module 240 includes seven antennas, that is, N=7. The antenna module 240 includes four high-frequency antennas, two middle-high-frequency antennas, and one low-frequency antenna. The high-frequency antenna is configured to support transmission of a radio frequency signal of a 5G high frequency band or the HB. The middle-high-frequency antenna is configured to support transmission of a radio frequency signal of an MHB. The low-frequency antenna is configured to support transmission of a radio frequency signal of the LB. The four high-frequency antennas are the antenna 241, the antenna 242, the antenna 243, and the antenna 244. The two middle-high-frequency antennas are the antenna 245 and the antenna 246. The low-frequency antenna is the antenna 247.

FIG. 7 is a schematic structural diagram of a radio frequency front-end module 220 according to an embodiment of this application. Based on the embodiment shown in FIG. 6, in this embodiment, description is provided by using an example in which n=3, m=2, and k=3, that is, the terminal device supports three HB frequency band numbers, two MB frequency band numbers, and three LB frequency band numbers. As shown in FIG. 7, each of the HB filtering circuit, the MB filtering circuit, and the LB filtering circuit of the radio frequency front-end module includes a plurality of filters and/or multiplexers. For example, the HB filtering circuit 31 may include two filters and one duplexer. n'=3. An input end of one filter is connected to the HB signal end 311; and an output end thereof is connected to a port 1 of the antenna selection switch 41. An input end of the other filter is connected to the HB signal end 312; and an output end thereof is connected to a port 2 of the antenna selection switch 41. An input end of the duplexer is connected to the HB signal end 313; and an output end thereof is connected to a port 3 of the antenna selection switch 41. Because a link between the duplexer and the antenna selection switch 41 may be used as a reception link, synchronous reception and transmission can be implemented by disposing the duplexer herein. The MB filtering circuit 32 may include one quadruplexer. m'=1. Two input ends of the quadruplexer are connected to the MB signal end 321 and the MB signal end 322; and an output end of the quadruplexer is connected to the input end of the MB combining circuit 43. Because a link between the quadruplexer and the MB combining circuit 43 may be used as a reception link, synchronous reception and transmission can be implemented by disposing the quadruplexer herein. For example, the LB filtering circuit 33 may include one triplexer and one duplexer. k'=2. Two input ends of the triplexer are connected to the LB signal end 332 and the LB signal end 333; and an output end of the triplexer is connected to an input end of the LB combining circuit 46. An input end of the duplexer is connected to the LB signal end 331. An output end of the duplexer is connected to another input end of the LB combining circuit 46. Because a link between the LB filtering circuit 33 and the LB combining circuit 46 may be used as a reception link, synchronous reception and transmission can be implemented by disposing a quadruplexer and the duplexer herein.

For example, one filter of the HB filtering circuit 31 may be configured to perform filtering on radio frequency signals of N41 and B41; and another filter of the HB filtering circuit 31 may be configured to perform filtering on radio frequency signals of N40 and B40. The duplexer of the HB filtering circuit 31 may be configured to perform filtering on radio frequency signals of N7 and B7. The radio frequency front-end module 220 may route the first radio frequency signal of the HB and the second radio frequency signal of the HB to the HB filtering circuit 31 through the frequency band selection circuit 20, so that two radio frequency front-end channels can share an HB filtering circuit.

A quadruplexer of the MB filtering circuit 32 may be configured to perform filtering on radio frequency signals of N1, B1, N3, and B3. The radio frequency front-end module 220 may route the first radio frequency signal of the MB and the second radio frequency signal of the MB to the MB filtering circuit 32 through the frequency band selection circuit 20, so that two radio frequency front-end channels can share an MB filtering circuit.

A triplexer of the LB filtering circuit 33 may be configured to perform filtering on radio frequency signals of N28A, B28A, N20, and B20. The duplexer of the LB filtering circuit 31 may be configured to perform filtering on radio frequency signals of N28B and B28B. The radio frequency front-end module 220 may route the first radio frequency signal of the LB and the second radio frequency signal of the LB to the LB filtering circuit 33 through the frequency band selection circuit 20, so that two radio frequency front-end channels can share an LB filtering circuit.

In this embodiment, a frequency band selection circuit is disposed, and a filter and/or a multiplexer of different frequency bands are/is supported, so that a first radio frequency front-end channel configured to send a first radio frequency signal and a second radio frequency front-end channel configured to send a second radio frequency signal share the filter and/or the multiplexer of different frequency bands. Therefore, on the premise that the terminal device supports transmission of radio frequency signals of different standards in a dual connectivity application scenario, or transmission of a radio frequency signal in a carrier aggregation application scenario, or transmission of a radio frequency signal in a dual SIM dual standby or dual SIM dual active application scenario, devices such as a filter and a duplexer at a radio frequency front end can be reduced, thereby reducing space occupied by the radio frequency front-end module.

Figure 8:
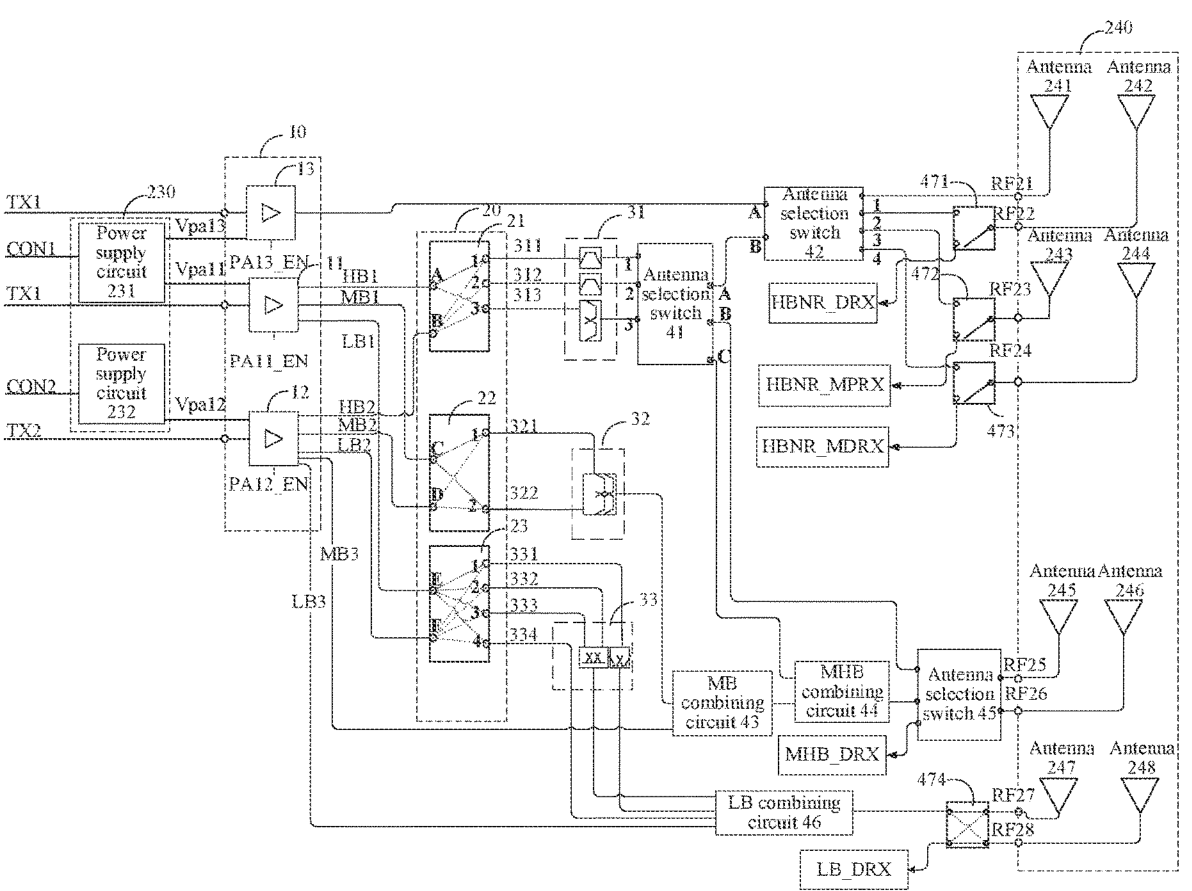
FIG. 8 is a schematic diagram of another radio frequency front-end module according to an embodiment of this application.

The following embodiment shown in FIG. 8 of this application is described by using an example in which the antenna module 240 includes eight antennas, that is, N=8. The antenna module 240 includes four high-frequency antennas, two middle-high-frequency antennas, and two low-frequency antennas. The high-frequency antenna is configured to support transmission of a radio frequency signal of a 5G high frequency band or the HB. The middle-high-frequency antenna is configured to support transmission of a radio frequency signal of an MHB. The low-frequency antenna is configured to support transmission of a radio frequency signal of the LB. The four high-frequency antennas are the antenna 241, the antenna 242, the antenna 243, and the antenna 244. The two middle-high-frequency antennas are the antenna 245 and the antenna 246. The two low-frequency antennas are the antenna 247 and the antenna 248.

FIG. 8 is another schematic structural diagram of a radio frequency front-end module 220 and an antenna module 240 according to an embodiment of this application. Based on the embodiment shown in FIG. 6 or FIG. 7, in this embodiment, the output end of the second power amplifier 12 may include a third MB output end MB3 and a third LB output end LB3. The MB combining circuit 43 may further include another input end; and the input end is connected to the third MB output end MB3. The LB combining circuit 46 may further include another input end; and the input end is connected to the third LB output end LB3. In some embodiments, some frequency ranges of frequency bands of second radio frequency signals supported by the terminal device are not overlapped with a frequency range of the first radio frequency signal. The second radio frequency signal having the un-overlapped frequency band may be output to the MB combining circuit 43 through the third MB output end MB3 or to the LB combining circuit 46 through the third LB output end LB3. The second power amplifier 12 is configured to: perform power amplification on the second radio frequency signal, and output the amplified second radio frequency signal to the MB combining circuit 43 through the third MB output end MB3; or, perform power amplification on the second radio frequency signal, and output the amplified second radio frequency signal to the LB combining circuit 46 through the third LB output end LB3.

In this embodiment, the third frequency band selection switch 23 may further include an LB signal end 334, that is, k=4. The LB signal end 334 may be connected to an input end of the LB combining circuit 46 through the LB filtering circuit. The LB filtering circuit 33 may further include a connection line. Correspondingly, k'=3. The connection line is configured to connect the LB signal end 334 to an input end of the LB combining circuit 46.

The radio frequency front-end module may further include a primary receiver circuit and a plurality of diversity receiver circuits. For example, the primary receiver circuit may be HBNR_MPRX shown in FIG. 8; and the plurality of diversity receiver circuits may include a first diversity receiver circuit HBNR_DRX, a second diversity receiver circuit HBNR_MDRX, a third diversity receiver circuit MB_DRX, and a fourth diversity receiver circuit LB_DRX. The antenna selection circuit may further include a switch 471, a switch 472, a switch 473, and a switch 474. The switch 471 is configured to selectively connect the antenna 242 to an output end of the antenna selection switch 42; or, connect the antenna 242 to an input end of the first diversity receiver circuit HBNR_DRX. The switch 472 is configured to selectively connect the antenna 243 to an output end of the antenna selection switch 42; or, connect the antenna 243 to an input end of the primary receiver circuit HBNR_MPRX. The switch 473 is configured to selectively connect the antenna 244 to an output end of the antenna selection switch 42; or, connect the antenna 244 to an input end of the second diversity receiver circuit HBNR_MDRX. The antenna selection switch 45 may further include a port. The port is connected to an input end of the third diversity receiver circuit MB_DRX. The antenna selection switch 45 is further configured to connect the antenna 245 or the antenna 246 to the input end of the third diversity receiver circuit MB_DRX. The switch 474 is configured to: selectively connect the antenna 247 to an output end of the LB combining circuit 46, and connect the antenna 248 to an input end of the fourth diversity receiver circuit LB_DRX.

The radio frequency front-end module and the antenna module in this embodiment may support transmission and reception of the first radio frequency signal and the second radio frequency signal.

The terminal device in the foregoing embodiment of this application can support simultaneous transmission of a first radio frequency signal of any frequency band and a second radio frequency signal of any frequency band. The first radio frequency signal and the second radio frequency signal may be of different standards. The terminal device may support LTE-NR dual connectivity, for example, DC_LB_MHB, DC_LB_5G high frequency band, DC_MHB_LB, DC_MB_MB, DC_HB_MB, DC_MB_HB, DC_LB_MB, DC_MB_LB, DC_MB_5G high frequency band, DC_HB_HB, DC_LB_HB, DC_HB_LB, DC_HB_5G high frequency band, and DC_LB_LB. A radio frequency front-end module of a terminal device supporting different LTE-NR dual connectivity application scenarios is described below by using several specific application scenarios.

Scenario 1: DC_LB_LB

Figure 9:
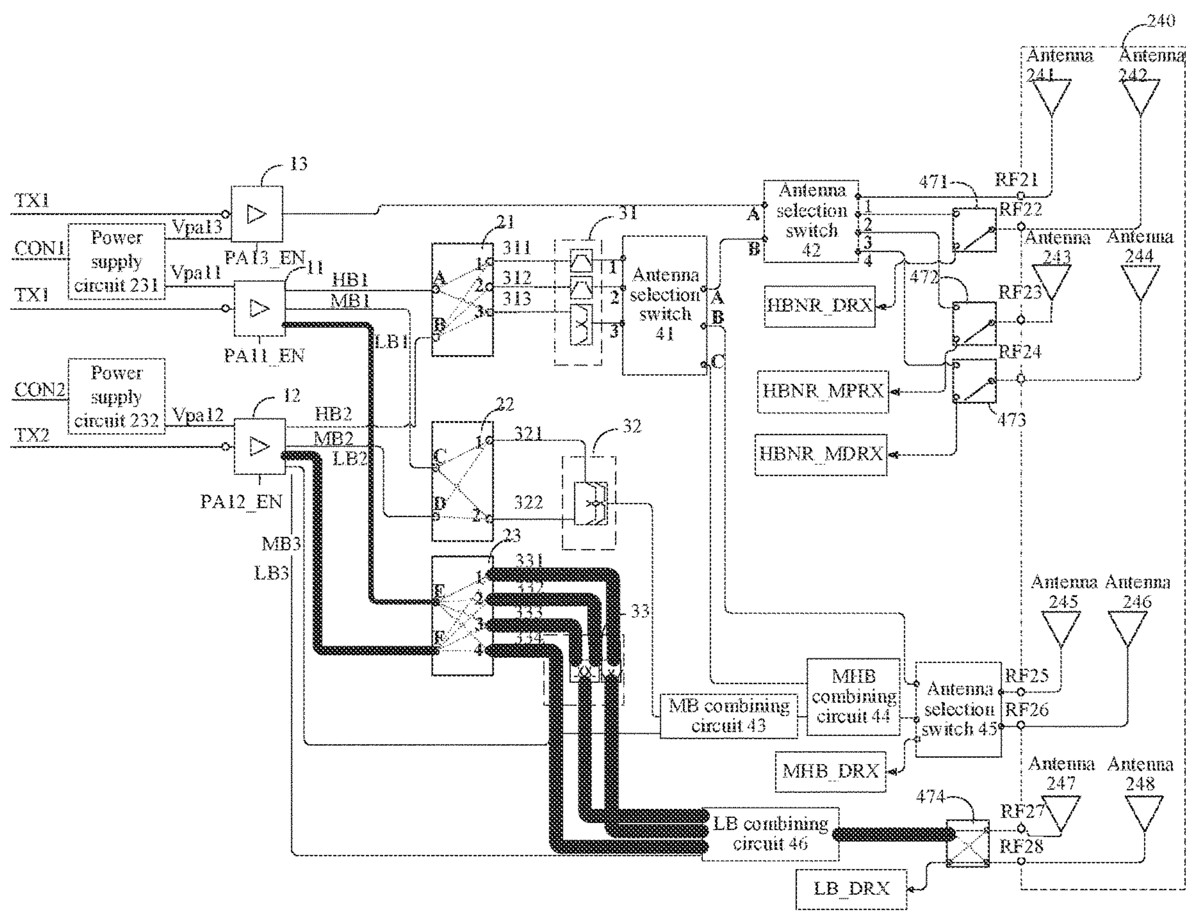
FIG. 9 is a schematic diagram of a radio frequency front-end module and an antenna module in a scenario according to an embodiment of this application.
Figure 9:
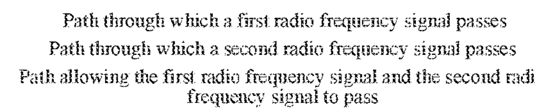

FIG. 9 is a schematic structural diagram of another radio frequency front-end module 220 and an antenna module 240 according to an embodiment of this application. As shown in FIG. 9, paths in Scenario 1 are marked with bold and dotted lines. The terminal device may include devices and ports in the paths marked in FIG. 9, and may exclude devices and ports in unmarked paths. The terminal device in this embodiment may support DC_LB_LB. In other words, the terminal device may support simultaneous transmission of a 5G radio frequency signal of the LB and a 4G radio frequency signal of the LB. Specifically, the 5G radio frequency signal of the LB may be used as a first radio frequency signal TX1. When the first radio frequency signal meets the frequency range of the LB, the first radio frequency signal is output by the processor to the first power amplifier 11, subjected to power amplification performed by the first power amplifier 11, and then output to the third frequency band selection switch 23. Because the first radio frequency signal meets the frequency range of the LB, the first radio frequency signal is routed by the third frequency band selection switch 23 to the LB filtering circuit 33, and then output to the antenna 247 through the switch 474. The third frequency band selection switch 23 may output the first radio frequency signal to the LB filtering circuit 33 through the LB signal end 331, the LB signal end 332, the LB signal end 333, or the LB signal end 333. The LB signal end 331, the LB signal end 332, the LB signal end 333, and the LB signal end 334 correspond to four sub-frequency bands of the frequency range of the LB, respectively. An LB signal end of the third frequency band selection switch 23, through which the first radio frequency signal is output, can be determined based on a sub-frequency band to which the first radio frequency signal belongs. The 4G radio frequency signal of the LB may be used as a second radio frequency signal TX2. When the second radio frequency signal meets the frequency range of the LB, the second radio frequency signal is output by the processor to the second power amplifier 12, subjected to power amplification performed by the second power amplifier 12, and then output to the third frequency band selection switch 23. Because the second radio frequency signal meets the frequency range of the LB, the second radio frequency signal is routed by the third frequency band selection switch 23 to the LB filtering circuit 33, and then output to the antenna 247 through the switch 474. The third frequency band selection switch 23 may output the second radio frequency signal to the LB filtering circuit 33 through the LB signal end 331, the LB signal end 332, the LB signal end 333, or the LB signal end 333. An LB signal end of the third frequency band selection switch 23, through which the second radio frequency signal is output, can be determined based on a sub-frequency band to which the second radio frequency signal belongs.

In Scenario 1, the radio frequency front-end module in this embodiment of this application may support an NSA combination of an LB and another LB, and the first radio frequency front-end channel configured to send the first radio frequency signal and the second radio frequency front-end channel configured to send the second radio frequency signal may share a low-frequency antenna, thereby lowering antenna implementation difficulty.

The radio frequency front-end module 220 and the antenna module 240 may further support carrier aggregation of the frequency bands in Scenario 1, namely, carrier aggregation of the LB and the another LB. An implementation principle is similar to the above.

DC_LB_LB may include DC_20A_N28A, DC_28A_N20, DC_8A_N20A, DC_20A_N8A, DC_8A_N28A, C_28A_N8A, DC_8A_N28B, DC_28B_N8A, or the like.

DC_LB_LB in Scenario 1 is schematically illustrated by using an example in which the LB signal end 331 corresponds to N28B and B28B, the LB signal end 332 corresponds to N28A and B28A, the LB signal end 333 corresponds to N20 and B20, and LB signal end 334 corresponds to N8 and B8.

To implement DC_20A_N28A or C_28A_N20, each module of the terminal device may use a state shown in Table 1.

TABLE 1

Schematic Table Showing Output Signals and Working States of Modules

| Device | DC_20A_N28A | DC_28A_N20 | CA_20_28A | CA_28A_20 |
|---|---|---|---|---|
| TX2 | B20 | B28A | B20 | B28A |
| TX1 | N28A | N20 | Not used | Not used |
| Amplifier 11 | N28A | N20 | Not used | Not used |
| Amplifier 12 | B20 | B28A | B20 | B28A |
| Third frequency band selection switch 23 | E TO 2<br>F TO 3 | E TO 3<br>F TO 2 | E TO 2<br>F TO 3 | ETO 3<br>F TO 2 |

Figure 10A:
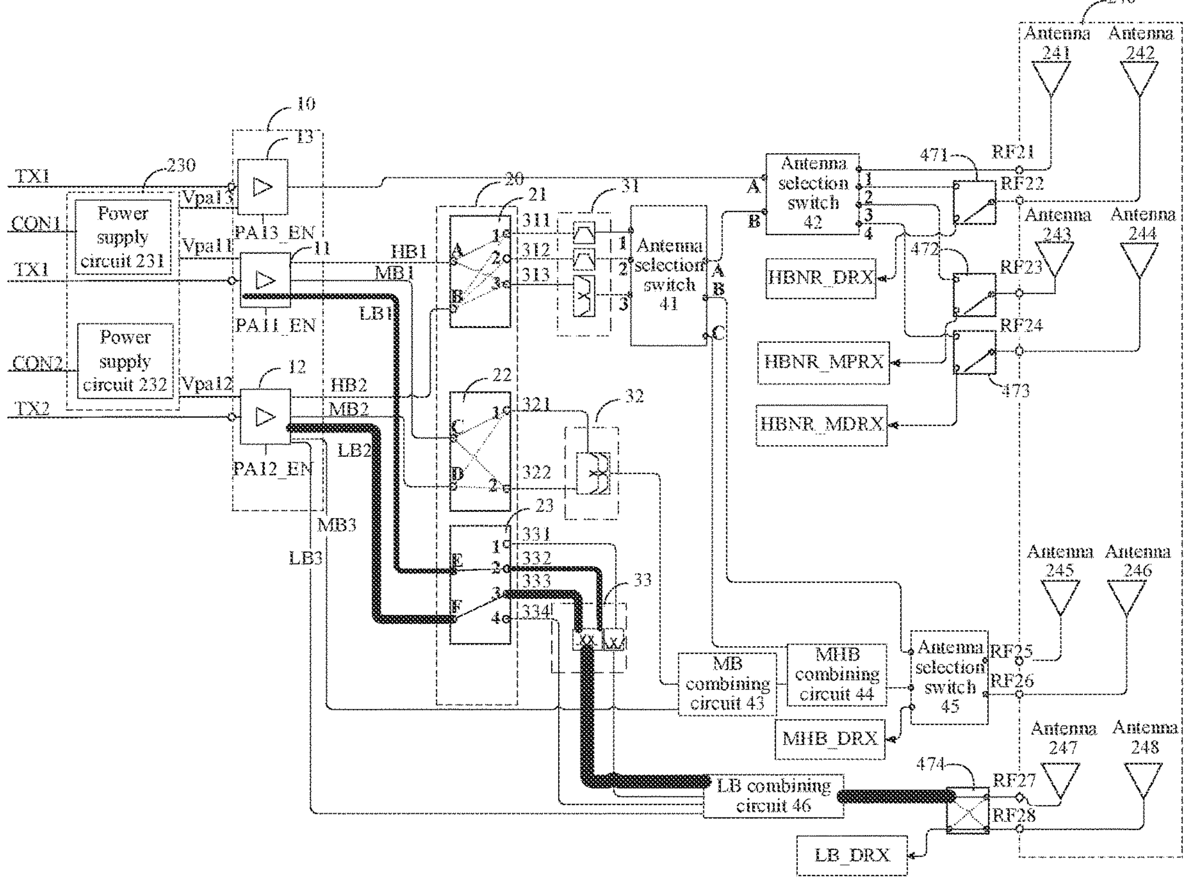
FIG. 10A is a schematic diagram of a radio frequency front-end module and an antenna module in another scenario according to an embodiment of this application.

As shown in Table 1, during implementation of DC_20A_N28A, the frequency band of the first radio frequency signal is N28A, and the frequency band of the second radio frequency signal is B20. FIG. 10A is a schematic structural diagram of implementing DC_20A_N28A by a radio frequency front-end module according to an embodiment of this application. As shown in FIG. 10A, after being amplified by the first power amplifier 11, the first radio frequency signal is output to the third frequency band selection switch 23 through the first LB output end LB1. Because the first radio frequency signal meets the frequency range of the LB and meets N28A, the processor 210 controls an input port E of the third frequency band selection switch 23 to connect to an output port 2; and the third frequency band selection switch 23 outputs the amplified first radio frequency signal to the LB filtering circuit 33 through the output port 2 (namely, the LB signal end 332). After being amplified by the second power amplifier 12, the second radio frequency signal is output to the third frequency band selection switch 23 through the second LB output end LB2. Because the second radio frequency signal meets the frequency range of the LB and meets B20, the processor 210 controls an input port F of the third frequency band selection switch 23 to connect to an output port 3 (namely, the LB signal end 333); and the third frequency band selection switch 23 outputs the amplified second radio frequency signal to the LB filtering circuit 33 through the output port 3 (namely, the LB signal end 333). After being processed by a duplexer of the LB filtering circuit 33, the first radio frequency signal and the second radio frequency signal are output to the LB combining circuit 46, processed by the LB combining circuit 46, and output to the switch 474.

Figure 10B:
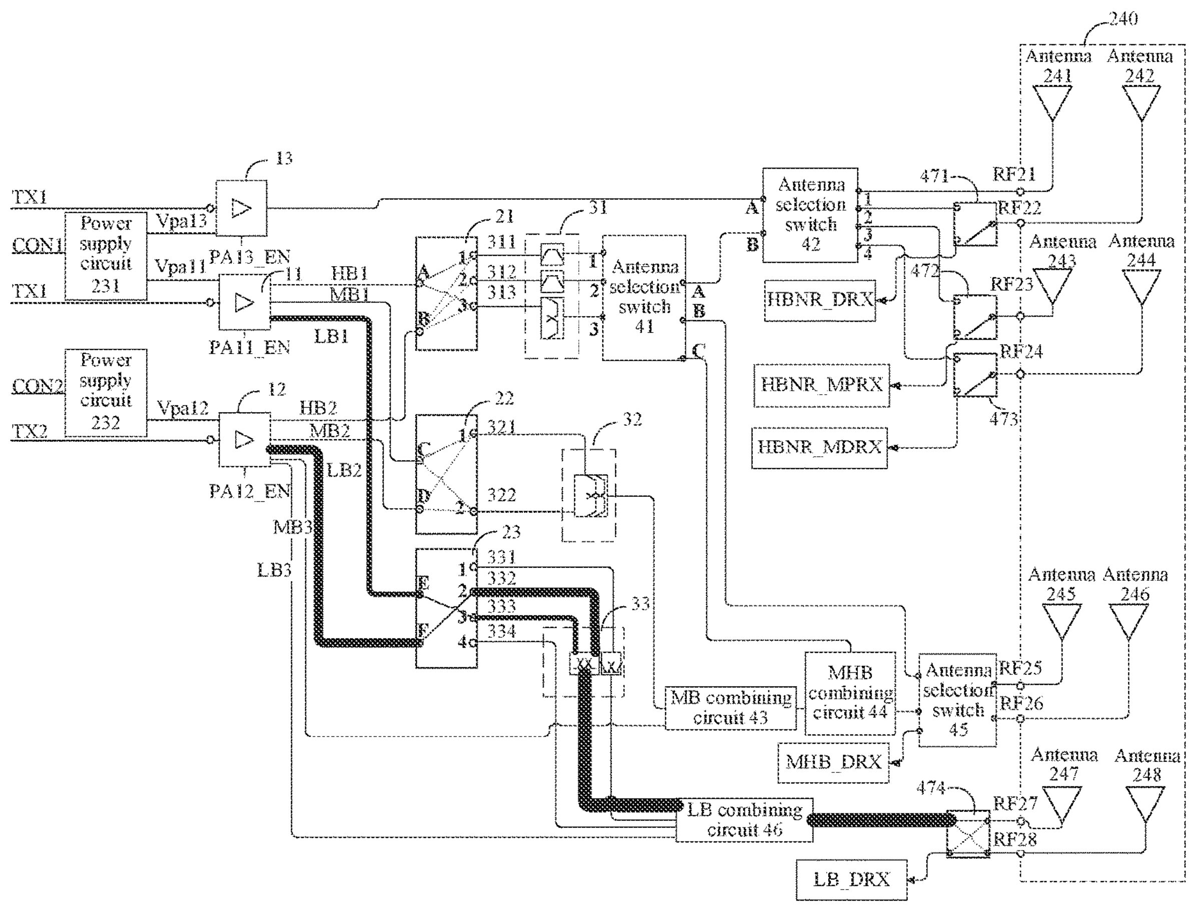
FIG. 10B is a schematic diagram of a radio frequency front-end module and an antenna module in another scenario according to an embodiment of this application.
Figure 10B:

During implementation of C_28A_N20, the frequency band of the first radio frequency signal is N20, and the frequency band of the second radio frequency signal is B28A. FIG. 10B is a schematic structural diagram of implementing C_28A_N20 by a radio frequency front-end module according to an embodiment of this application. As shown in FIG. 10B, after being amplified by the first power amplifier 11, the first radio frequency signal is output to the third frequency band selection switch 23 through the first LB output end LB1. Because the first radio frequency signal meets the frequency range of the LB and meets N20, the processor 210 controls an input port E of the third frequency band selection switch 23 to connect to an output port 3; and the third frequency band selection switch 23 outputs the amplified first radio frequency signal to the LB filtering circuit 33 through the output port 3 (namely, the LB signal end 333). After being amplified by the second power amplifier 12, the second radio frequency signal is output to the third frequency band selection switch 23 through the second LB output end LB2. Because the second radio frequency signal meets the frequency range of the LB and meets B28A, the processor 210 controls an input port F of the third frequency band selection switch 23 to connect to an output port 2 (namely, the LB signal end 332); and the third frequency band selection switch 23 outputs the amplified second radio frequency signal to the LB filtering circuit 33 through the output port 2 (namely, the LB signal end 332). After being processed by a duplexer of the LB filtering circuit 33, the first radio frequency signal and the second radio frequency signal are output to the LB combining circuit 46, processed by the LB combining circuit 46, and output to the switch 474.

An implementation of CA_20_28A is similar to that of DC_20A_N28A, with a difference lying in that TX2 is not used in an unlink process. An implementation of CA_28A_20 is similar to that of C_28A_N20, with a difference lying in that TX2 is not used in an unlink process.

To implement DC_8A_N20A or DC_20A_N8A, each module of the terminal device may use a state shown in Table 2.

TABLE 2

Schematic Table Showing Output Signals and Working States of Modules

| Device | DC_8A_N20A | DC_B20_N8A |
|---|---|---|
| TX2 | B8 | B20 |
| TX1 | N20 | N8 |
| Amplifier 11 | N20 | N8 |
| Amplifier 12 | B8 | B20 |
| Third frequency band selection switch 23 | E_TO_3<br>F_TO_4 | E_TO_4<br>F_TO_3 |

Figure 10C:
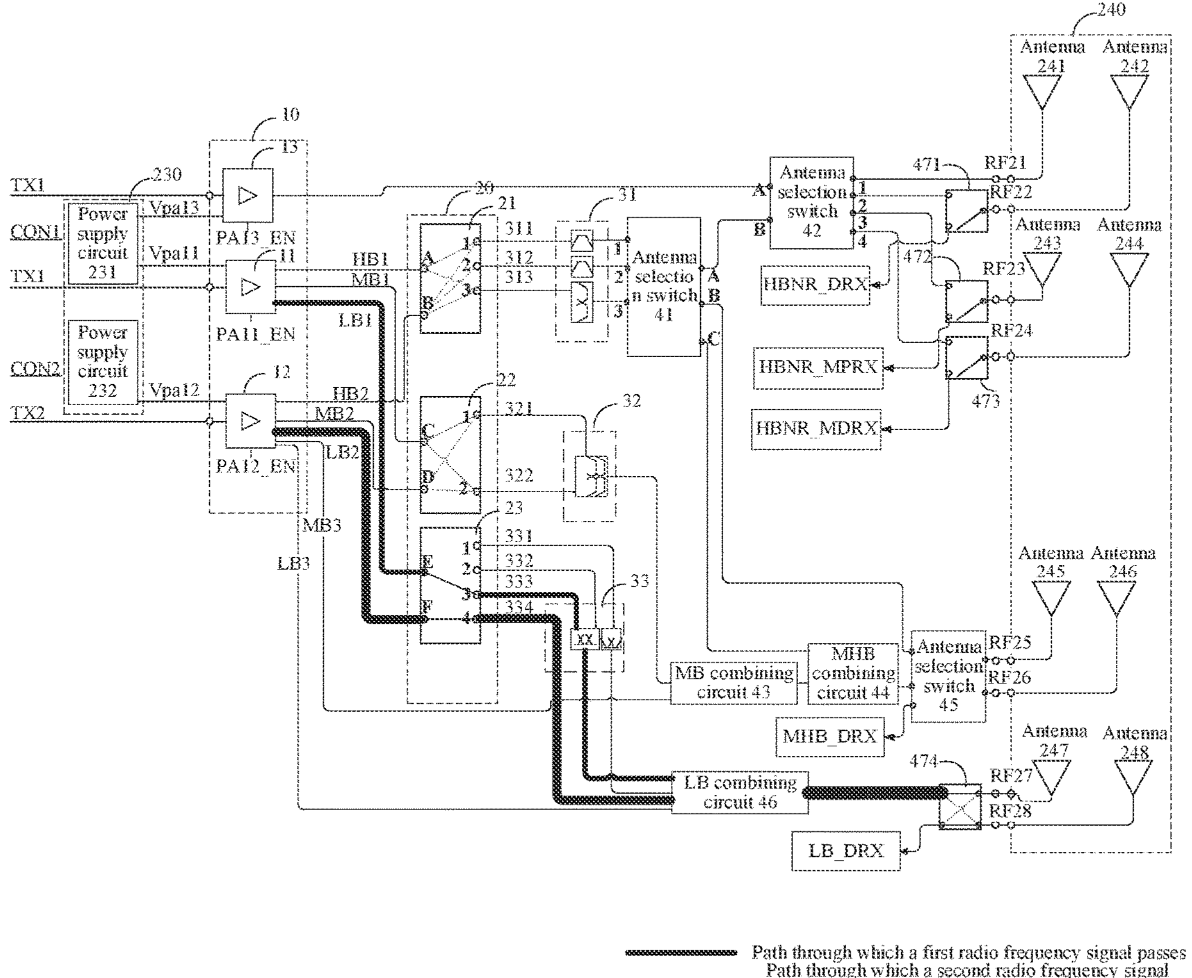
FIG. 10C is a schematic diagram of a radio frequency front-end module and an antenna module in another scenario according to an embodiment of this application.

As shown in Table 2, during implementation of DC_8A_N20A, the frequency band of the first radio frequency signal is N20, and the frequency band of the second radio frequency signal is B8. FIG. 10C is a schematic structural diagram of implementing DC_8A_N20A by a radio frequency front-end module according to an embodiment of this application. As shown in FIG. 10C, after being amplified by the first power amplifier 11, the first radio frequency signal is output to the third frequency band selection switch 23 through the first LB output end LB1. Because the first radio frequency signal meets the frequency range of the LB and meets N20, the processor 210 controls an input port E of the third frequency band selection switch 23 to connect to an output port 3; and the third frequency band selection switch 23 outputs the amplified first radio frequency signal to the LB filtering circuit 33 through the output port 3 (namely, the LB signal end 333). After being processed by a duplexer of the LB filtering circuit 33, the first radio frequency signal is output to the LB combining circuit 46. After being amplified by the second power amplifier 12, the second radio frequency signal is output to the third frequency band selection switch 23 through the second LB output end LB2. Because the second radio frequency signal meets the frequency range of the LB and meets B8, the processor 210 controls an input port F of the third frequency band selection switch 23 to connect to an output port 4 (namely, the LB signal end 334); and the third frequency band selection switch 23 outputs the amplified second radio frequency signal to the LB filtering circuit 33 through the output port 4 (namely, the LB signal end 334). The second radio frequency signal is output to the LB combining circuit 46 through a wire of the LB filtering circuit 33. After being processed by the LB combining circuit 46, the first radio frequency signal and the second radio frequency signal are output to the switch 474.

Figure 10D:
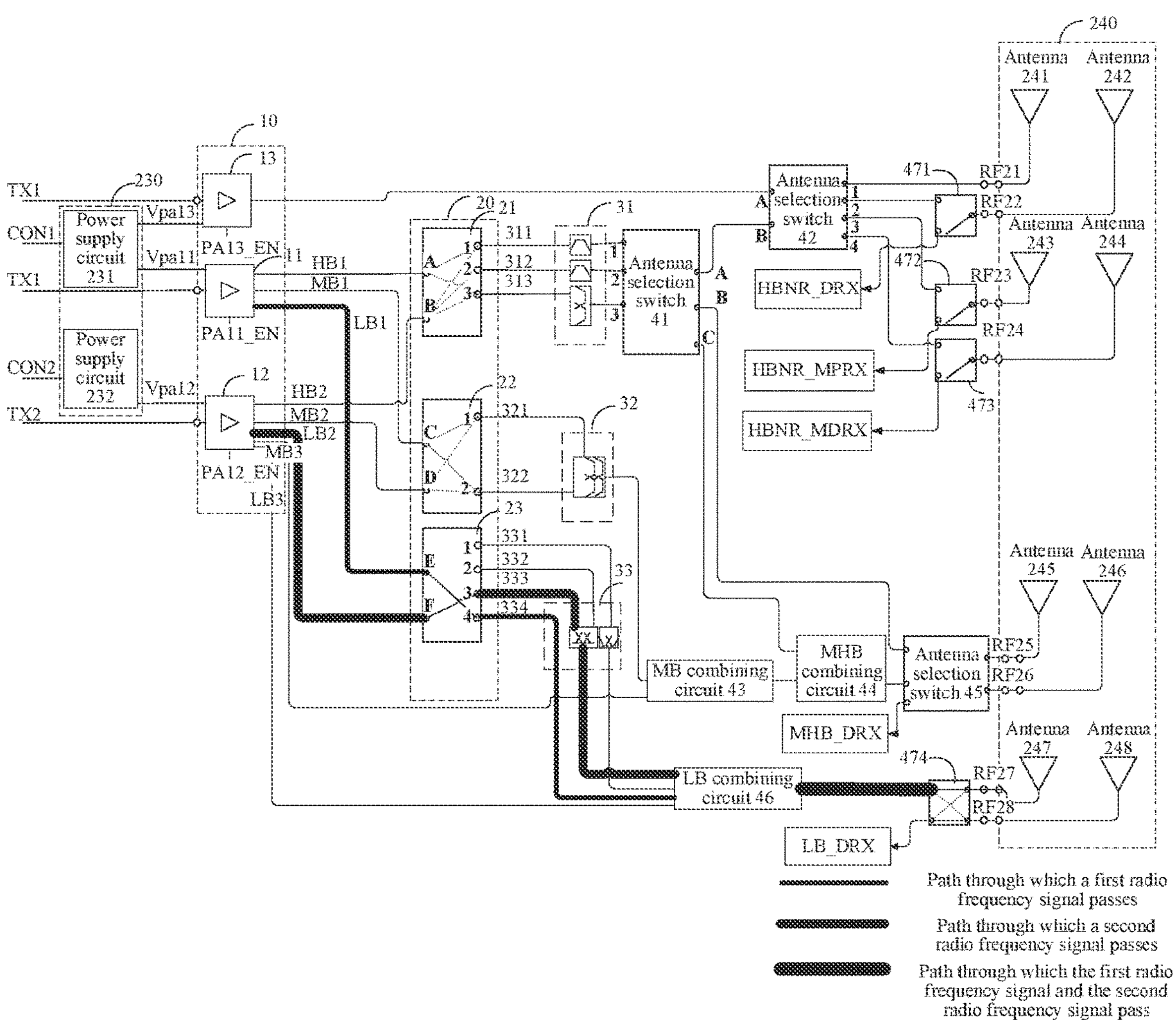
FIG. 10D is a schematic diagram of a radio frequency front-end module and an antenna module in another scenario according to an embodiment of this application.

During implementation of DC_20A_N8A, the frequency band of the first radio frequency signal is N8, and the frequency band of the second radio frequency signal is B20. FIG. 10D is a schematic structural diagram of implementing DC_20A_N8A by a radio frequency front-end module according to an embodiment of this application. As shown in FIG. 10D, after being amplified by the first power amplifier 11, the first radio frequency signal is output to the third frequency band selection switch 23 through the first LB output end LB1. Because the first radio frequency signal meets the frequency range of the LB and meets N8, the processor 210 controls an input port E of the third frequency band selection switch 23 to connect to an output port 4; and the third frequency band selection switch 23 outputs the amplified first radio frequency signal to the LB filtering circuit 33 through the output port 4 (namely, the LB signal end 334). The second radio frequency signal is output to the LB combining circuit 46 through a wire of the LB filtering circuit 33. After being amplified by the second power amplifier 12, the second radio frequency signal is output to the third frequency band selection switch 23 through the second LB output end LB2. Because the second radio frequency signal meets the frequency range of the LB and meets B20, the processor 210 controls an input port F of the third frequency band selection switch 23 to connect to an output port 3; and the third frequency band selection switch 23 outputs the amplified first radio frequency signal to the LB filtering circuit 33 through the output port 3 (namely, the LB signal end 333). After being processed by a duplexer of the LB filtering circuit 33, the second radio frequency signal is output to the LB combining circuit 46. After being processed by the LB combining circuit 46, the first radio frequency signal and the second radio frequency signal are output to the switch 474.

To implement DC_8A_N28A or C_28A_N8A, each module of the terminal device may use a state shown in Table 3.

TABLE 3

Schematic Table Showing Output Signals and Working States of Modules

| Device | DC_8A_N28A | DC_B28A_N8A |
|---|---|---|
| TX2 | B8 | B28A |
| TX1 | N28A | N8 |
| Amplifier 11 | B28A | N8 |
| Amplifier 12 | N8 | B28A |
| Third frequency band selection switch 23 | E_TO_2<br>F_TO_4 | E_TO_4<br>F_TO_2 |

Figure 10E:
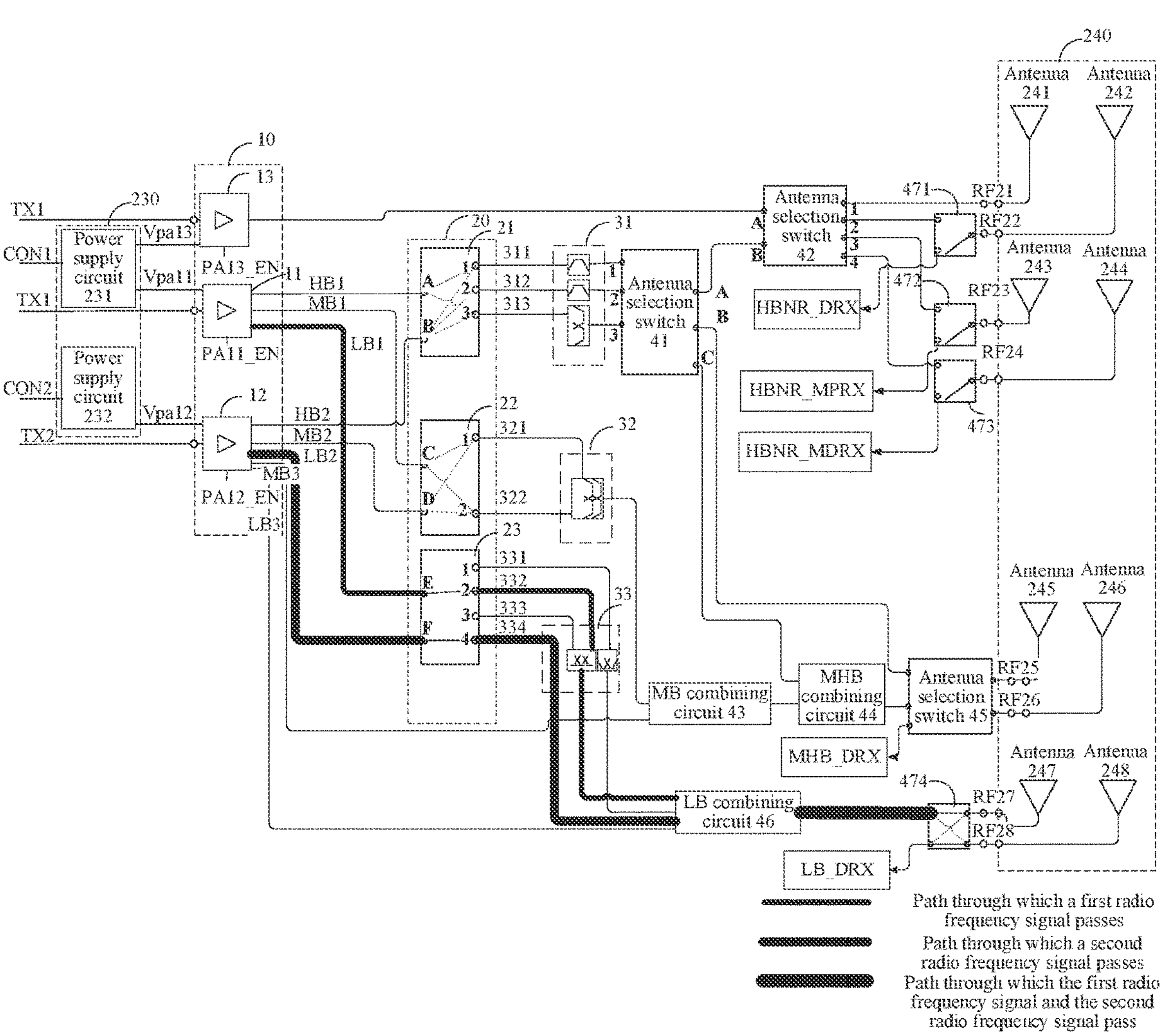
FIG. 10E is a schematic diagram of a radio frequency front-end module and an antenna module in another scenario according to an embodiment of this application.

As shown in Table 3, during implementation of DC_8A_N28A, the frequency band of the first radio frequency signal is N28A, and the frequency band of the second radio frequency signal is B8. FIG. 10E is a schematic structural diagram of implementing DC_8A_N28A by a radio frequency front-end module according to an embodiment of this application. As shown in FIG. 10E, after being amplified by the first power amplifier 11, the first radio frequency signal is output to the third frequency band selection switch 23 through the first LB output end LB1. Because the first radio frequency signal meets the frequency range of the LB and meets N28A, the processor 210 controls an input port E of the third frequency band selection switch 23 to connect to an output port 2; and the third frequency band selection switch 23 outputs the amplified first radio frequency signal to the LB filtering circuit 33 through the output port 2 (namely, the LB signal end 332). After being processed by a duplexer of the LB filtering circuit 33, the first radio frequency signal is output to the LB combining circuit 46. After being amplified by the second power amplifier 12, the second radio frequency signal is output to the third frequency band selection switch 23 through the second LB output end LB2. Because the second radio frequency signal meets the frequency range of the LB and meets B8, the processor 210 controls an input port F of the third frequency band selection switch 23 to connect to an output port 4 (namely, the LB signal end 334); and the third frequency band selection switch 23 outputs the amplified second radio frequency signal to the LB filtering circuit 33 through the output port 4 (namely, the LB signal end 334). The second radio frequency signal is output to the LB combining circuit 46 through a wire of the LB filtering circuit 33. After being processed by the LB combining circuit 46, the first radio frequency signal and the second radio frequency signal are output to the switch 474.

Figure 10F:
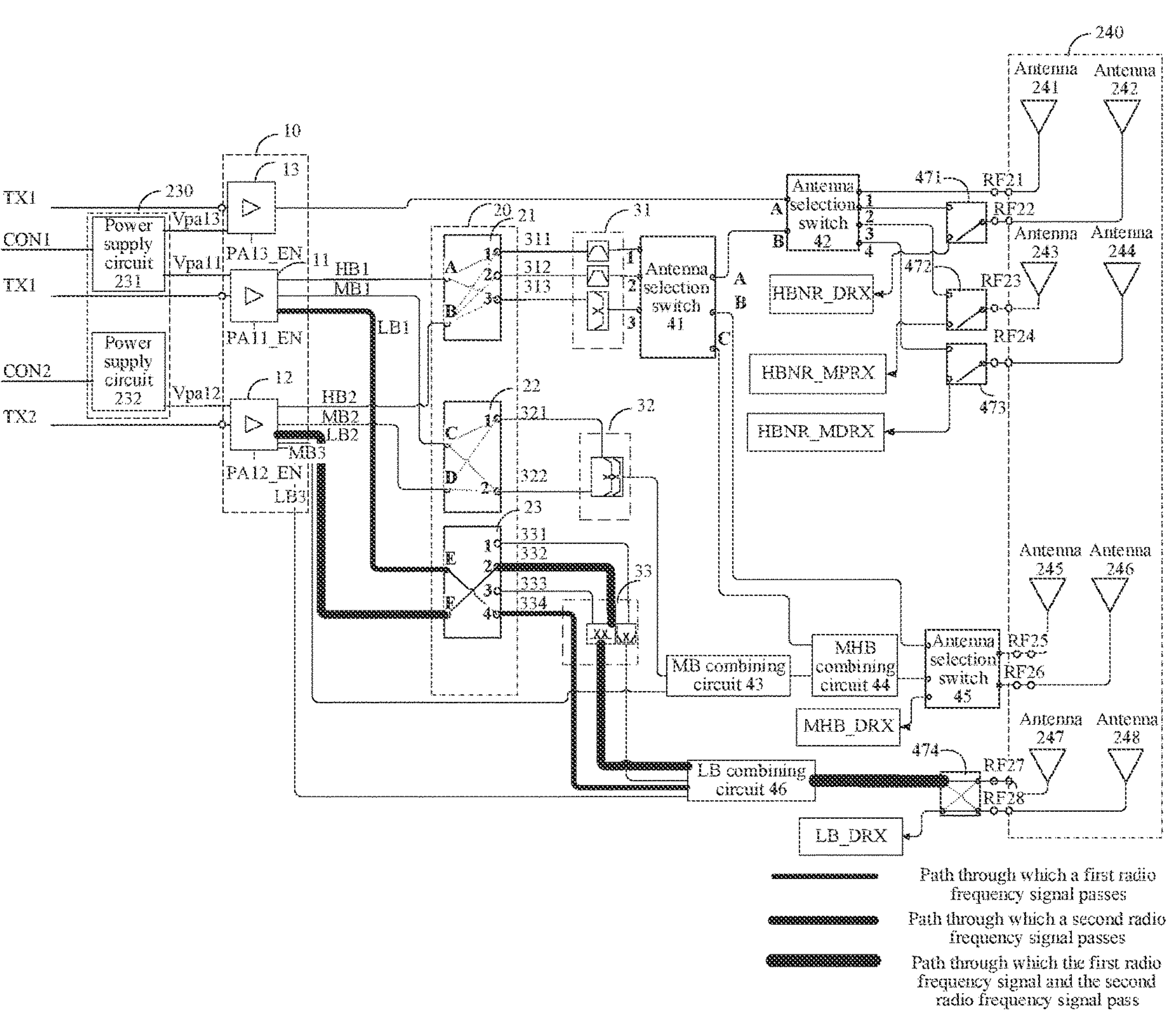
FIG. 10F is a schematic diagram of a radio frequency front-end module and an antenna module in another scenario according to an embodiment of this application.

During implementation of C_28A_N8A, the frequency band of the first radio frequency signal is N8, and the frequency band of the second radio frequency signal is B28A. FIG. 10F is a schematic structural diagram of implementing C_28A_N8A by a radio frequency front-end module according to an embodiment of this application. As shown in FIG. 10F, after being amplified by the first power amplifier 11, the first radio frequency signal is output to the third frequency band selection switch 23 through the first LB output end LB1. Because the first radio frequency signal meets the frequency range of the LB and meets N8, the processor 210 controls an input port E of the third frequency band selection switch 23 to connect to an output port 4 (namely, the LB signal end 334); and the third frequency band selection switch 23 outputs the amplified first radio frequency signal to the LB filtering circuit 33 through the output port 4 (namely, the LB signal end 334). The first radio frequency signal is output to the LB combining circuit 46 through a wire of the LB filtering circuit 33. After being amplified by the second power amplifier 12, the second radio frequency signal is output to the third frequency band selection switch 23 through the second LB output end LB2. Because the second radio frequency signal meets the frequency range of the LB and meets B28A, the processor 210 controls an input port F of the third frequency band selection switch 23 to connect to an output port 2; and the third frequency band selection switch 23 outputs the amplified second radio frequency signal to the LB filtering circuit 33 through the output port 2 (namely, the LB signal end 332). After being processed by a duplexer of the LB filtering circuit 33, the second radio frequency signal is output to the LB combining circuit 46. After being processed by the LB combining circuit 46, the first radio frequency signal and the second radio frequency signal are output to the switch 474.

To implement DC_8A_N28B or DC_28B_N8A, each module of the terminal device may use a state shown in Table 4.

TABLE 4

Schematic Table Showing Output Signals and Working States of Modules

| Device | DC_8A_N28B | DC_B28B_N8A |
|---|---|---|
| TX2 | B8 | B28B |
| TX1 | N28B | N8 |
| Amplifier 11 | N28B | N8 |
| Amplifier 12 | B8 | B28B |
| Third frequency band selection switch 23 | E_TO_1<br>F_TO_4 | E_TO_4<br>F_TO_1 |

Figure 10G:
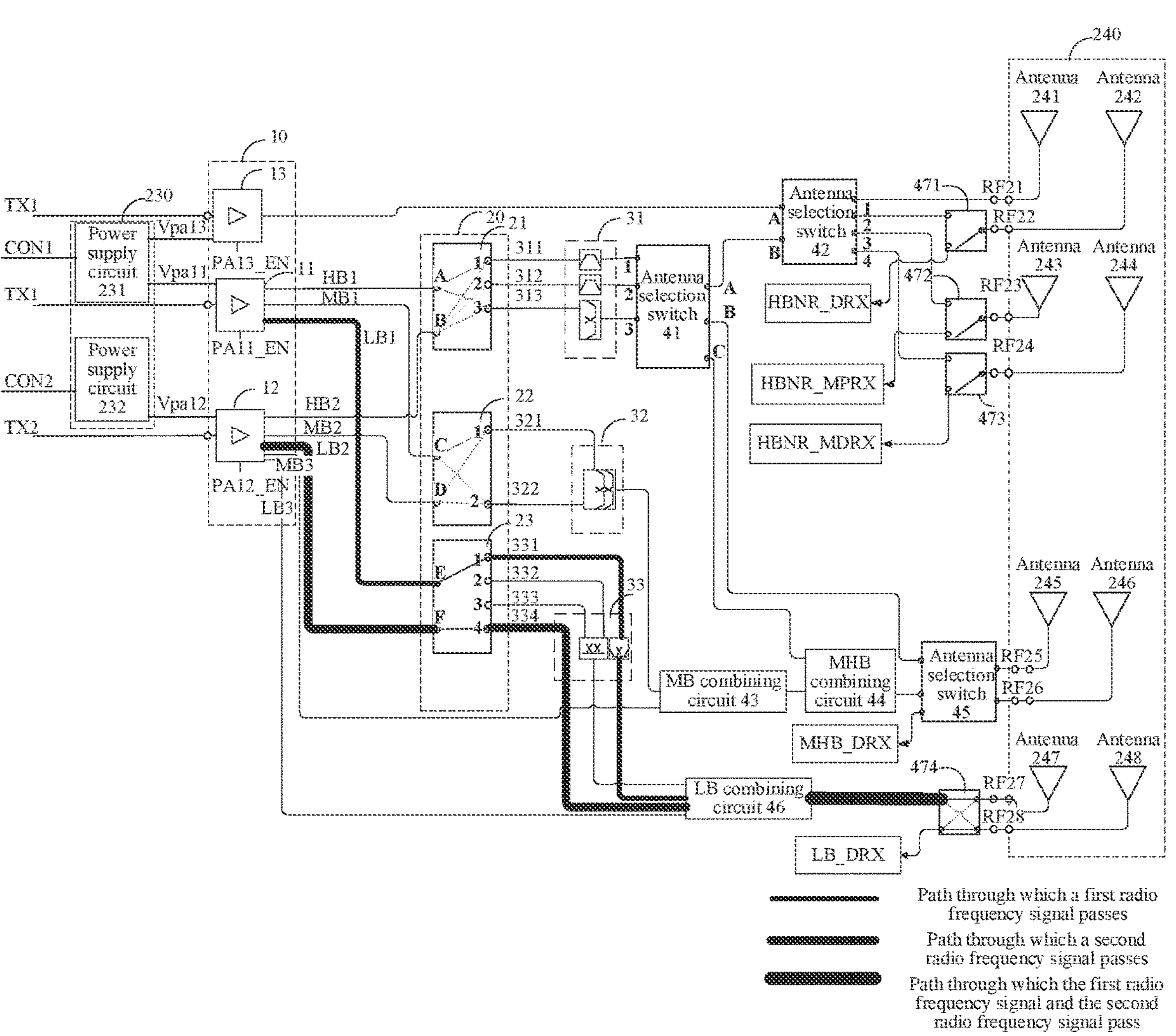
FIG. 10G is a schematic diagram of a radio frequency front-end module and an antenna module in another scenario according to an embodiment of this application.

As shown in Table 4, during implementation of DC_8A_N28B, the frequency band of the first radio frequency signal is N28B, and the frequency band of the second radio frequency signal is B8. FIG. 10G is a schematic structural diagram of implementing DC_8A_N28B by a radio frequency front-end module according to an embodiment of this application. As shown in FIG. 10G, after being amplified by the first power amplifier 11, the first radio frequency signal is output to the third frequency band selection switch 23 through the first LB output end LB1. Because the first radio frequency signal meets the frequency range of the LB and meets N28B, the processor 210 controls an input port E of the third frequency band selection switch 23 to connect to an output port 1; and the third frequency band selection switch 23 outputs the amplified first radio frequency signal to the LB filtering circuit 33 through the output port 1 (namely, the LB signal end 331). After being processed by a duplexer of the LB filtering circuit 33, the first radio frequency signal is output to the LB combining circuit 46. After being amplified by the second power amplifier 12, the second radio frequency signal is output to the third frequency band selection switch 23 through the second LB output end LB2. Because the second radio frequency signal meets the frequency range of the LB and meets B8, the processor 210 controls an input port F of the third frequency band selection switch 23 to connect to an output port 4 (namely, the LB signal end 334); and the third frequency band selection switch 23 outputs the amplified second radio frequency signal to the LB filtering circuit 33 through the output port 4 (namely, the LB signal end 334). The second radio frequency signal is output to the LB combining circuit 46 through a wire of the LB filtering circuit 33. After being processed by the LB combining circuit 46, the first radio frequency signal and the second radio frequency signal are output to the switch 474.

Figure 10H:
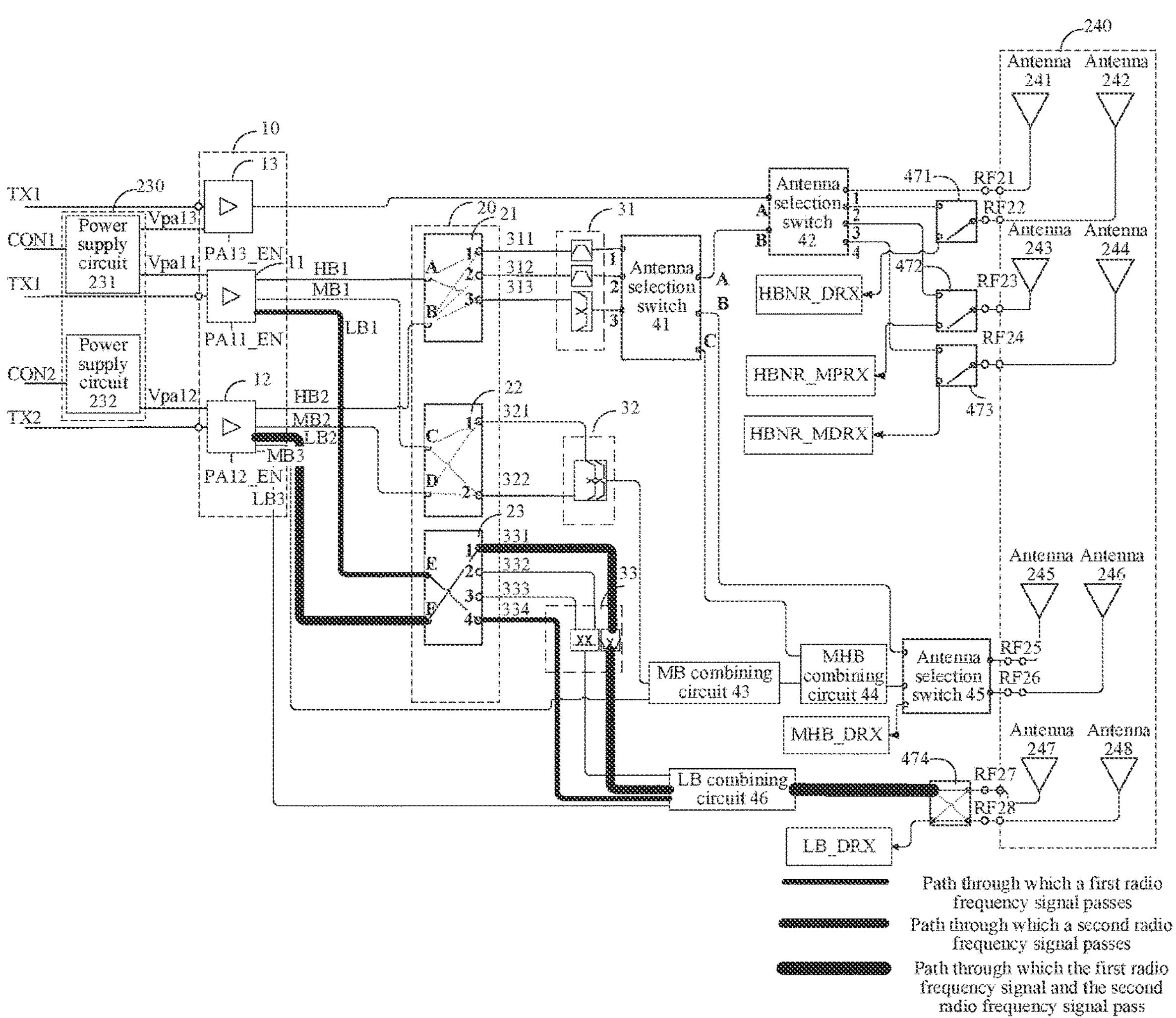
FIG. 10H is a schematic diagram of a radio frequency front-end module and an antenna module in another scenario according to an embodiment of this application.

During implementation of DC_28B_N8A, the frequency band of the first radio frequency signal is N8, and the frequency band of the second radio frequency signal is B28B. FIG. 10H is a schematic structural diagram of implementing DC_28B_N8A by a radio frequency front-end module according to an embodiment of this application. As shown in FIG. 10H, after being amplified by the first power amplifier 11, the first radio frequency signal is output to the third frequency band selection switch 23 through the first LB output end LB1. Because the first radio frequency signal meets the frequency range of the LB and meets N8, the processor 210 controls an input port E of the third frequency band selection switch 23 to connect to an output port 4; and the third frequency band selection switch 23 outputs the amplified first radio frequency signal to the LB filtering circuit 33 through the output port 4 (namely, the LB signal end 334). The second radio frequency signal is output to the LB combining circuit 46 through a wire of the LB filtering circuit 33. After being amplified by the second power amplifier 12, the second radio frequency signal is output to the third frequency band selection switch 23 through the second LB output end LB2. Because the second radio frequency signal meets the frequency range of the LB and meets B28B, the processor 210 controls an input port F of the third frequency band selection switch 23 to connect to an output port 1 (namely, the LB signal end 331); and the third frequency band selection switch 23 outputs the amplified second radio frequency signal to the LB filtering circuit 33 through the output port 1 (namely, the LB signal end 331). After being processed by a duplexer of the LB filtering circuit 33, the first radio frequency signal is output to the LB combining circuit 46. After being processed by the LB combining circuit 46, the first radio frequency signal and the second radio frequency signal are output to the switch 474.

Scenario 2: DC_LB_MHB and DC_LB_5G High Frequency Band

Figure 11:
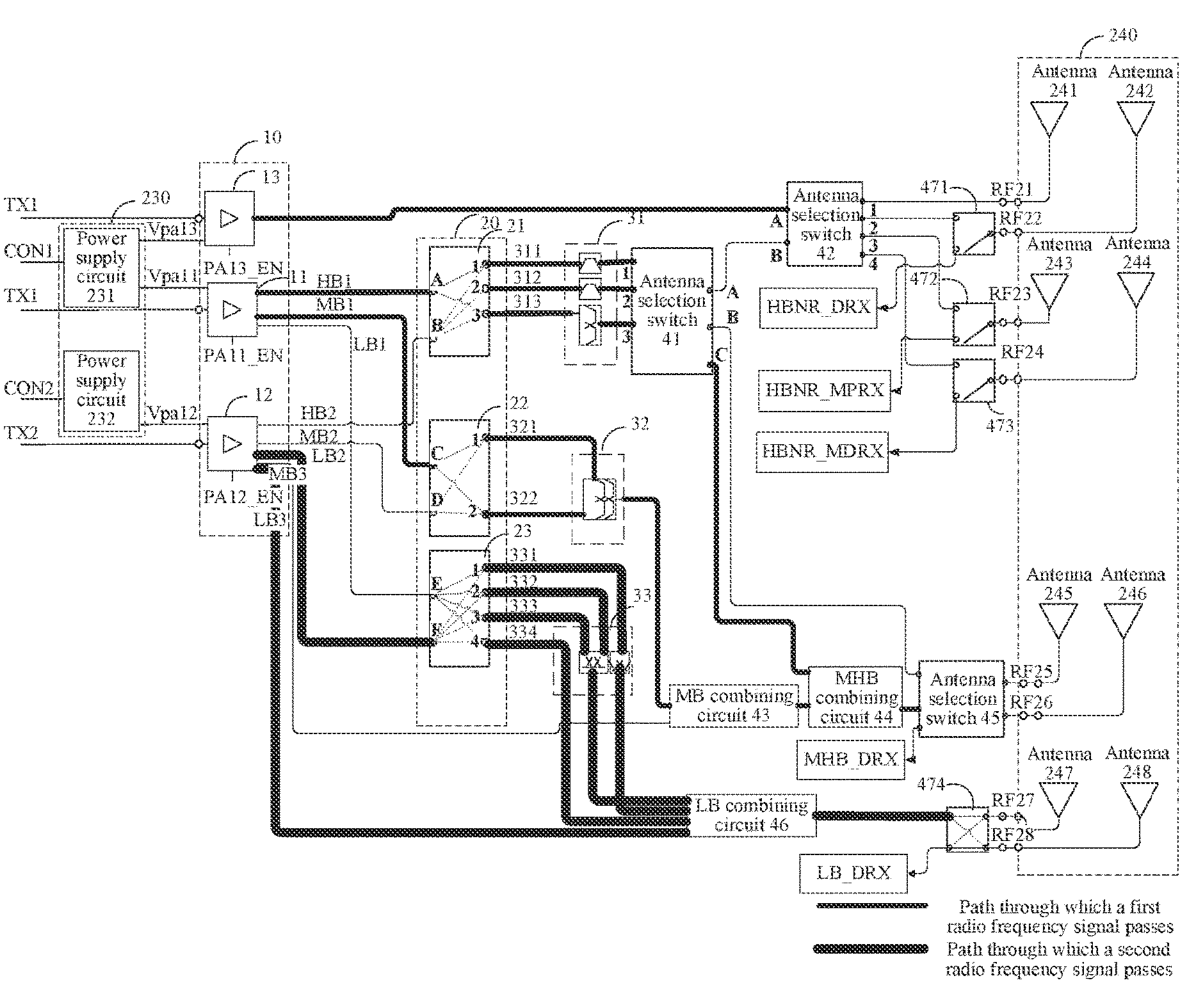
FIG. 11 is a schematic diagram of a radio frequency front-end module and an antenna module in another scenario according to an embodiment of this application.

FIG. 11 is another schematic structural diagram of a radio frequency front-end module 220 and an antenna module 240 according to an embodiment of this application. As shown in FIG. 11, paths in Scenario 2 are marked with bold lines. The terminal device may include devices and ports in the paths marked in FIG. 11, and may exclude devices and ports in unmarked paths. The terminal device in this embodiment may support DC_LB_MHB and DC_LB_5G high frequency band. In other words, the terminal device may support simultaneous transmission of a 5G radio frequency signal of the MHB or the 5G high frequency band and a 4G radio frequency signal of the LB. Specifically, the 5G radio frequency signal of the MHB or the 5G radio frequency signal of the G high frequency band may be used as a first radio frequency signal TX1. When the first radio frequency signal meets the frequency range of the MB or the frequency range of the HB, the first radio frequency signal is output by the processor to the first power amplifier 11, subjected to power amplification performed by the first power amplifier 11, and then output to the first frequency band selection switch 21 or the second frequency band selection switch 22. For example, when the first radio frequency signal meets the frequency range of the HB, the first radio frequency signal is output by the processor to the first power amplifier 11, subjected to power amplification performed by the first power amplifier 11, and then output to the first frequency band selection switch 21. Because the first radio frequency signal meets the frequency range of the HB, the first radio frequency signal is routed by the first frequency band selection switch 21 to the HB filtering circuit 31, and then output to the antenna 245 through the antenna selection switch 41. The first frequency band selection switch 21 may output the first radio frequency signal to the HB filtering circuit 31 through the HB signal end 311, the HB signal end 312, or the HB signal end 313. The HB signal end 311, the HB signal end 312, and the HB signal end 313 correspond to three sub-frequency bands of the frequency range of the HB, respectively. An HB signal end of the first frequency band selection switch 21, through which the first radio frequency signal is output, can be determined based on a sub-frequency band to which the first radio frequency signal belongs. When the first radio frequency signal meets the frequency range of the MB, the first radio frequency signal is output by the processor to the first power amplifier 11, subjected to power amplification performed by the first power amplifier 11, and then output to the second frequency band selection switch 22. Because the first radio frequency signal meets the frequency range of the MB, the first radio frequency signal is routed by the second frequency band selection switch 22 to the MB filtering circuit 32, and then output to the antenna 245 through the MB combining circuit 43, the MHB combining circuit 44, and the antenna selection switch 45. The second frequency band selection switch 22 may output the first radio frequency signal to the MB filtering circuit 32 through the MB signal end 321 or the MB signal end 322. The MB signal end 321 and the MB signal end 322 correspond to two sub-frequency bands of the frequency range of the MB, respectively. An MB signal end of the second frequency band selection switch 22, through which the first radio frequency signal is output, can be determined based on a sub-frequency band to which the first radio frequency signal belongs. When the first radio frequency signal meets the frequency range of the 5G high frequency band, the first radio frequency signal is output by the processor to the third power amplifier 13, subjected to power amplification performed by the third power amplifier 13, output to the antenna selection switch 42, and then output to the antenna 241 through the antenna selection switch 42. The 4G radio frequency signal of the LB may be used as a second radio frequency signal TX2. When the second radio frequency signal meets the frequency range of the LB, the second radio frequency signal is output by the processor to the second power amplifier 12, subjected to power amplification performed by the second power amplifier 12, output to the third frequency band selection switch 23 or the LB combining circuit 46, routed to the LB combining circuit 46 through the third frequency band selection switch 23, and then output to the antenna 247 through the LB combining circuit 46. The third frequency band selection switch 23 may output the second radio frequency signal to the LB filtering circuit 33 through the LB signal end 331, the LB signal end 332, the LB signal end 333, or the LB signal end 334. The LB signal end 331, the LB signal end 332, the LB signal end 333, and the LB signal end 334 correspond to four sub-frequency bands of the frequency range of the LB, respectively. An LB signal end of the third frequency band selection switch 31, through which the second radio frequency signal is output, can be determined based on a sub-frequency band to which the second radio frequency signal belongs.

Scenario 3: DC_MHB_LB

Figure 12:
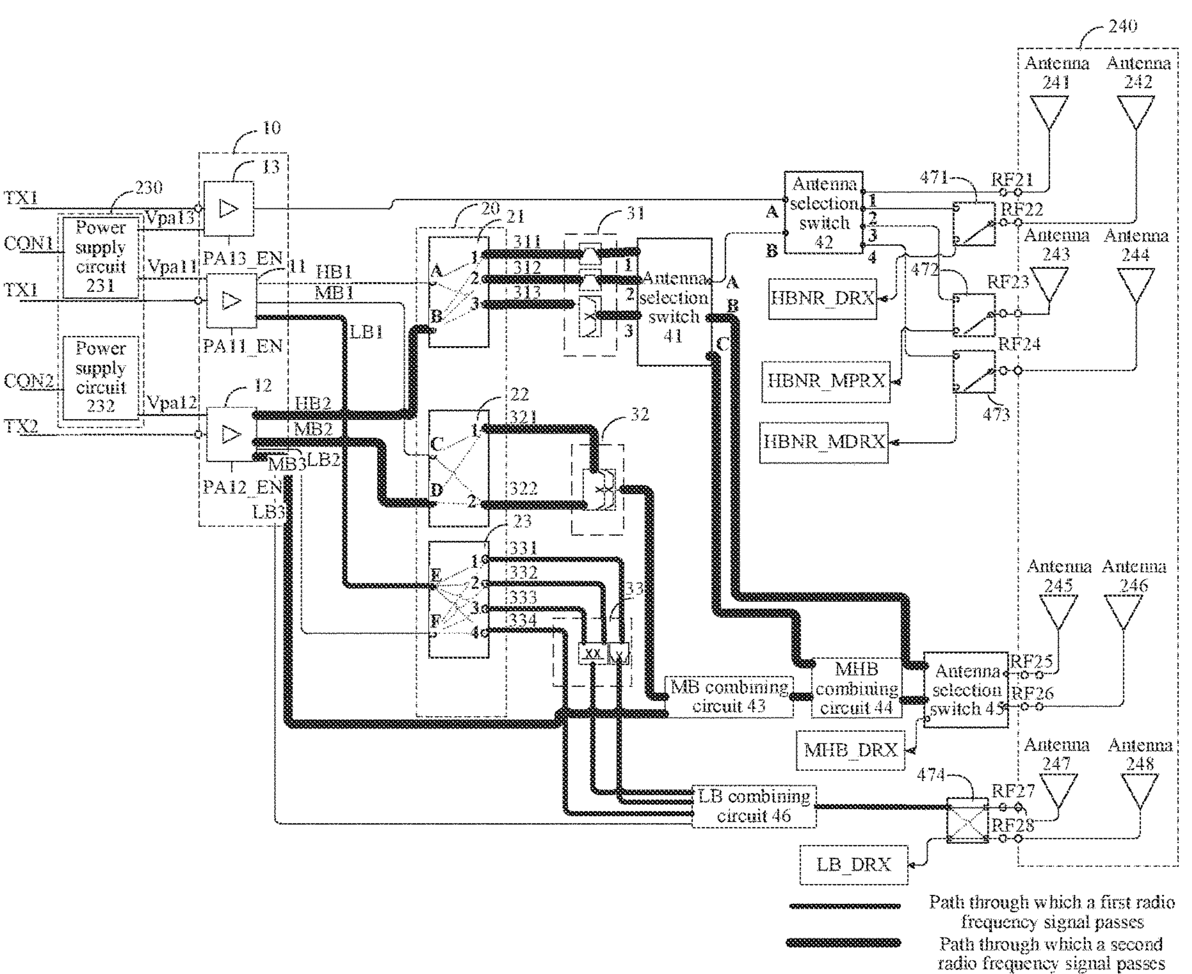
FIG. 12 is a schematic diagram of a radio frequency front-end module and an antenna module in another scenario according to an embodiment of this application.

FIG. 12 is another schematic structural diagram of a radio frequency front-end module 220 and an antenna module 240 according to an embodiment of this application. As shown in FIG. 12, paths in Scenario 3 are marked with bold lines. The terminal device may include devices and ports in the paths marked in FIG. 11, and may exclude devices and ports in unmarked paths. The terminal device in this embodiment may support DC_MHB_LB. In other words, the terminal device may support simultaneous transmission of a 4G radio frequency signal of the MHB and a 5G radio frequency signal of the LB. Specifically, the 5G radio frequency signal of the LB may be used as a first radio frequency signal TX1, output to the first power amplifier 11, subjected to power amplification performed by the first power amplifier 11, output to the third frequency band selection switch 23, routed to the LB filtering circuit 33 through the third frequency band selection switch 23, filtered by the LB filtering circuit, output to the LB combining circuit 46, and then output to the antenna 247. The 4G radio frequency signal of the MHB may be used as a second radio frequency signal TX2, output to the second power amplifier 12, subjected to power amplification performed by the second power amplifier 12, output to the first frequency band selection switch 21 or the second frequency band selection switch 22; routed to the HB filtering circuit 31 through the first frequency band selection switch 21, then routed to the MHB combining circuit 44 or the antenna selection switch 45 through the antenna selection switch 41, and finally output to the antenna 245 through the antenna selection switch 45; or routed to the MB filtering circuit 32 through the second frequency band selection switch 22, and then output to the antenna 245 through the MB combining circuit 43, the MHB combining circuit 44, and the antenna selection switch 45.

Scenario 4: DC_MB_MB

Figure 13:
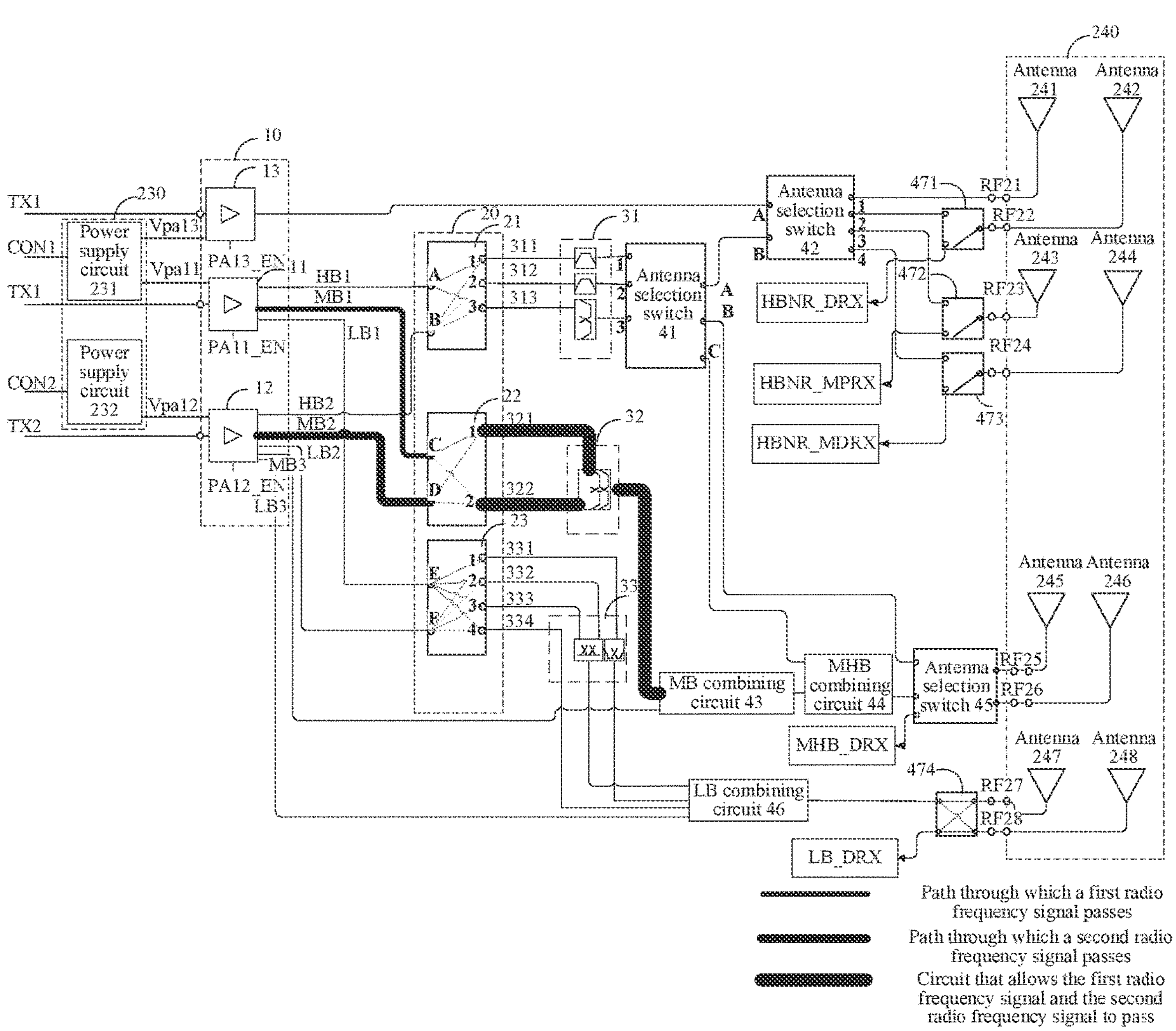
FIG. 13 is a schematic diagram of a radio frequency front-end module and an antenna module in another scenario according to an embodiment of this application.

FIG. 13 is another schematic structural diagram of a radio frequency front-end module 220 and an antenna module 240 according to an embodiment of this application. As shown in FIG. 13, paths in Scenario 4 are marked with bold lines. The terminal device may include devices and ports in the paths marked in FIG. 13, and may exclude devices and ports in unmarked paths. The terminal device in this embodiment may support DC_MB_MB. In other words, the terminal device may support simultaneous transmission of a 5G radio frequency signal of the MB and a 4G radio frequency signal of the MB. Specifically, the 5G radio frequency signal of the MB may be used as a first radio frequency signal TX1, output to the first power amplifier 11, subjected to power amplification performed by the first power amplifier 11, output to the second frequency band selection switch 22, routed to the MB filtering circuit 32 through the second frequency band selection switch 22, and then output to the antenna 245 through the MB combining circuit 43. The 4G radio frequency signal of the MB may be used as a second radio frequency signal TX2, output to the second power amplifier 12, subjected to power amplification performed by the second power amplifier 12, output to the second frequency band selection switch 22, routed to the MB filtering circuit 32 through the second frequency band selection switch 22, and then output to the antenna 245 through the MB combining circuit 43.

In Scenario 4, the radio frequency front-end module in this embodiment of this application may support an NSA combination of an MB and another MB, and may share the antenna 245 in a simultaneous transmission of the 5G radio frequency signal of the MB and the 4G radio frequency signal of the MB, thereby lowering antenna implementation difficulty.

Scenario 5: DC_HB_MB

Figure 14:
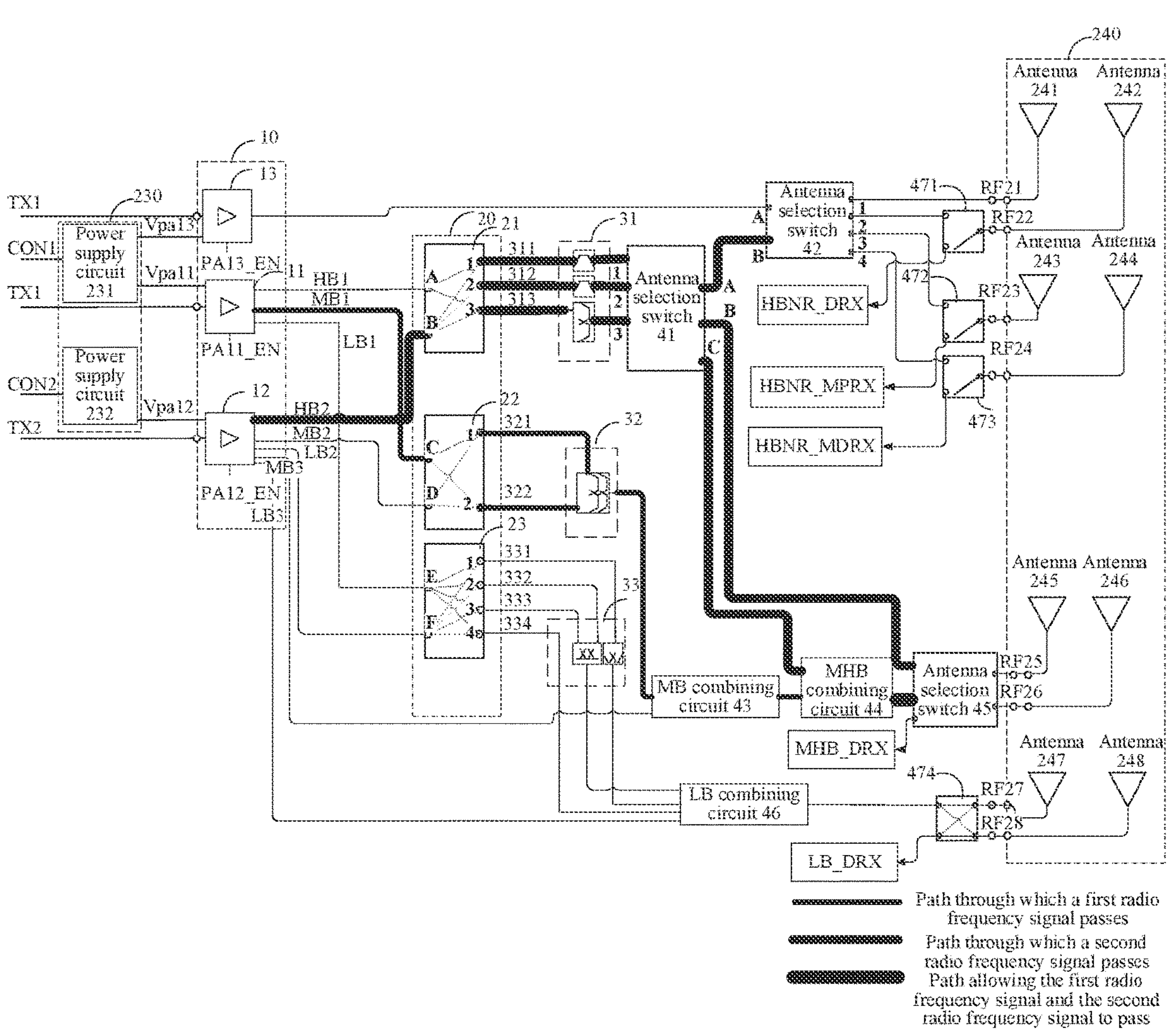
FIG. 14 is a schematic diagram of a radio frequency front-end module and an antenna module in another scenario according to an embodiment of this application.

FIG. 14 is another schematic structural diagram of a radio frequency front-end module 220 and an antenna module 240 according to an embodiment of this application. As shown in FIG. 14, paths in Scenario 5 are marked with bold lines. The terminal device may include devices and ports in the paths marked in FIG. 14, and may exclude devices and ports in unmarked paths. The terminal device in this embodiment may support DC_HB_MB. In other words, the terminal device may support simultaneous transmission of a 5G radio frequency signal of the MB and a 4G radio frequency signal of the HB. Specifically, the 5G radio frequency signal of the MB may be used as a first radio frequency end TX1, output to the first power amplifier 11, subjected to power amplification performed by the first power amplifier 11, output to the second frequency band selection switch 22, routed to the MB filtering circuit 32 through the second frequency band selection switch 22, and then output to the antenna 245 through the MB combining circuit 43, the MHB combining circuit 44, and the antenna selection switch 45. The 4G radio frequency signal of the HB may be used as a second radio frequency signal TX2, output to the second power amplifier 12, subjected to power amplification performed by the second power amplifier 12, output to the first frequency band selection switch 21, routed to the HB filtering circuit 31 through the first frequency band selection switch 21, then output to the antenna 241 through the antenna selection switch 41 and the antenna selection switch 42, or output to the antenna 245 through the antenna selection switch 41, the MHB combining circuit 44, and the antenna selection switch 45.

Scenario 6: DC_MB_HB

Figure 15:
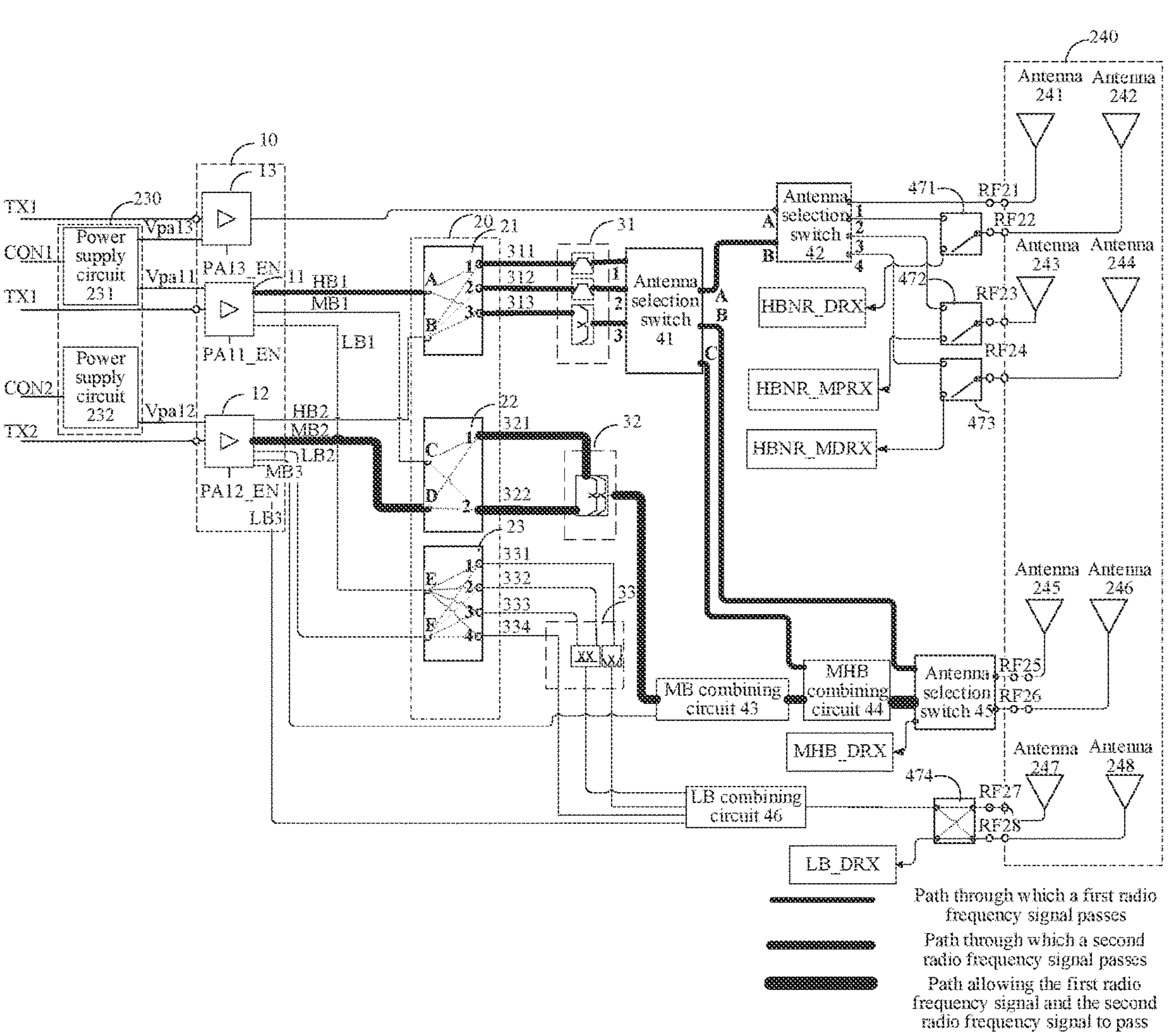
FIG. 15 is a schematic diagram of a radio frequency front-end module and an antenna module in another scenario according to an embodiment of this application.

FIG. 15 is another schematic structural diagram of a radio frequency front-end module 220 and an antenna module 240 according to an embodiment of this application. As shown in FIG. 15, paths in Scenario 6 are marked with bold lines. The terminal device may include devices and ports in the paths marked in FIG. 15, and may exclude devices and ports in unmarked paths. The terminal device in this embodiment may support DC_MB_HB. In other words, the terminal device may support simultaneous transmission of a 5G radio frequency signal of the HB and a 4G radio frequency signal of the MB. Specifically, the 5G radio frequency signal of the HB may be used as a first radio frequency signal TX1, output to the first power amplifier 11, subjected to power amplification performed by the first power amplifier 11, output to the first frequency band selection switch 21, routed to the HB filtering circuit 31 through the first frequency band selection switch 21, and then output to the antenna 241 through the antenna selection switch 41, or output to the antenna 245 through the antenna selection switch 41 and the MHB combining circuit 44. The 4G radio frequency signal of the MB may be used as a second radio frequency signal TX2, output to the second power amplifier 12, subjected to power amplification performed by the second power amplifier 12, output to the second frequency band selection switch 22, routed to the MB filtering circuit 32 through the second frequency band selection switch 22, and then output to the antenna 245 through the MB combining circuit 43 and the MHB combining circuit 44.

Scenario 7: DC_LB_MB

Figure 16:
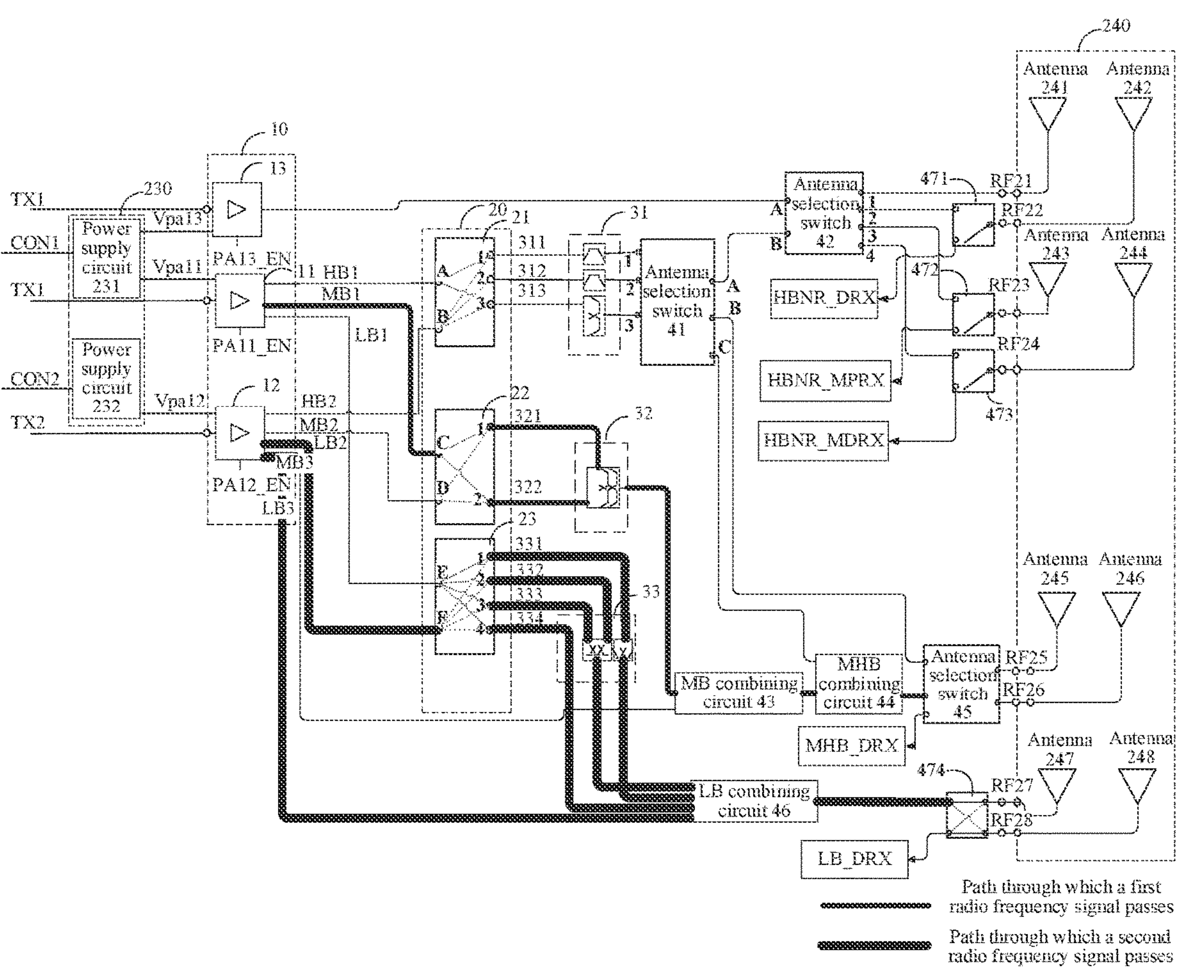
FIG. 16 is a schematic diagram of a radio frequency front-end module and an antenna module in another scenario according to an embodiment of this application.

FIG. 16 is another schematic structural diagram of a radio frequency front-end module 220 and an antenna module 240 according to an embodiment of this application. As shown in FIG. 16, paths in Scenario 7 are marked with bold lines. The terminal device may include devices and ports in the paths marked in FIG. 16, and may exclude devices and ports in unmarked paths. The terminal device in this embodiment may support DC_LB_MB. In other words, the terminal device may support simultaneous transmission of a 5G radio frequency signal of the MB and a 4G radio frequency signal of the LB. Specifically, the 5G radio frequency signal of the MB may be used as a first radio frequency signal TX1, output to the first power amplifier 11, subjected to power amplification performed by the first power amplifier 11, output to the second frequency band selection switch 22, routed to the MB filtering circuit 32 through the second frequency band selection switch 22, and then output to the antenna 245 through the MB combining circuit 43. The 4G radio frequency signal of the LB may be used as a second radio frequency signal TX2, output to the second power amplifier 12, subjected to power amplification performed by the second power amplifier 12, output to the third frequency band selection switch 23 or directly output to the LB combining circuit 46, routed to the LB filtering circuit 33 through the third frequency band selection switch 23, and then output to the antenna 247 through the LB combining circuit 46.

Scenario 8: DC_MB_LB

Figure 17:
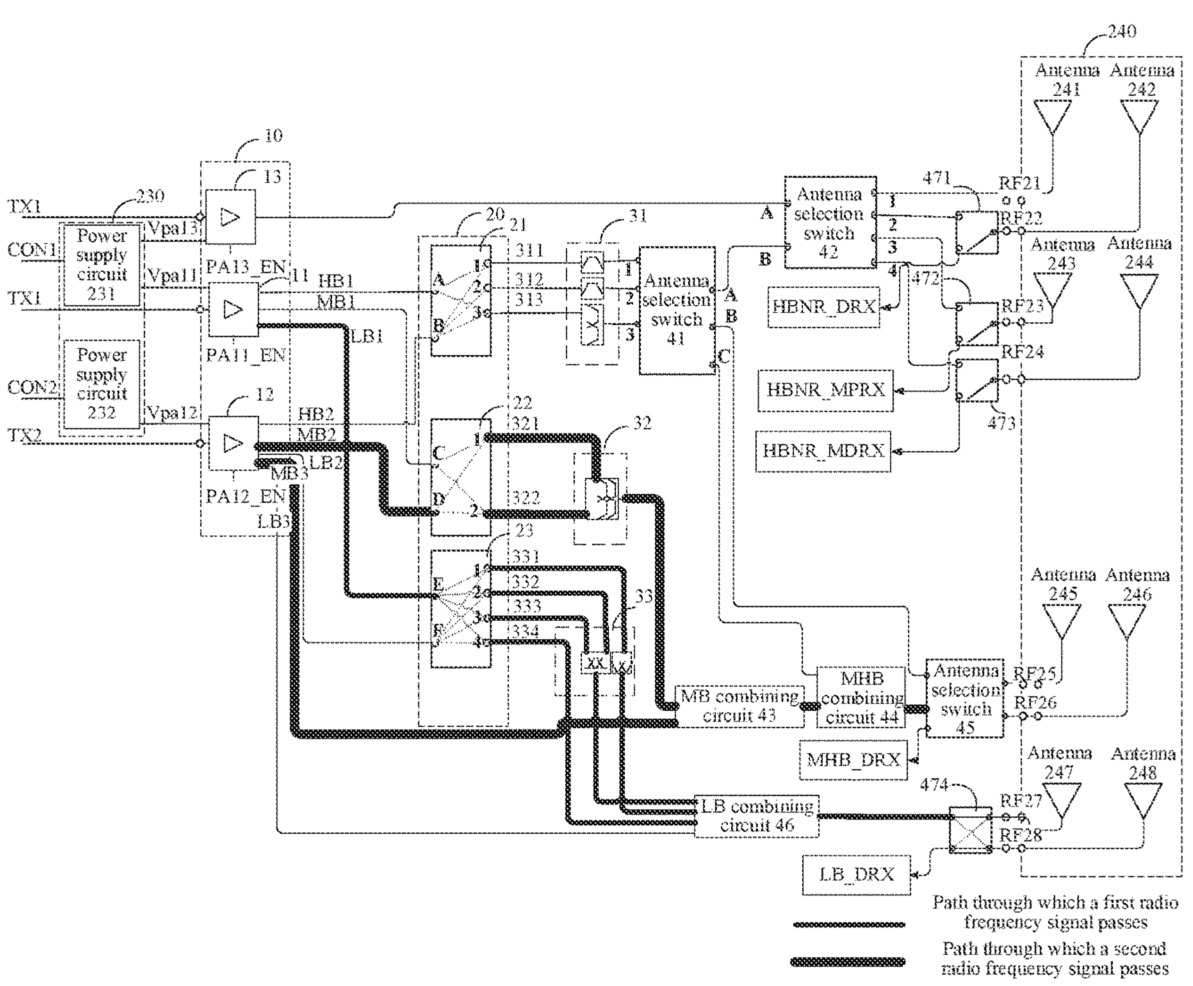
FIG. 17 is a schematic diagram of a radio frequency front-end module and an antenna module in another scenario according to an embodiment of this application.

FIG. 17 is another schematic structural diagram of a radio frequency front-end module 220 and an antenna module 240 according to an embodiment of this application. As shown in FIG. 17, paths in Scenario 8 are marked with bold lines. The terminal device may include devices and ports in the paths marked in FIG. 17, and may exclude devices and ports in unmarked paths. The terminal device in this embodiment may support DC_MB_LB. In other words, the terminal device may support simultaneous transmission of a 5G radio frequency signal of the LB and a 4G radio frequency signal of the MB. Specifically, the 5G radio frequency signal of the LB may be used as a first radio frequency signal TX1, output to the first power amplifier 11, subjected to power amplification performed by the first power amplifier 11, output to the third frequency band selection switch 23, routed to the LB filtering circuit 33 through the third frequency band selection switch 23, and then output to the antenna 247 through the LB combining circuit 46. The 4G radio frequency signal of the MB may be used as a second radio frequency signal TX2, output to the second power amplifier 12, subjected to power amplification performed by the second power amplifier 12, output to the second frequency band selection switch 22 or the MB combining circuit 43, routed to the MB filtering circuit 32 through the second frequency band selection switch 22, and then output to the antenna 245 through the MB combining circuit 43.

Scenario 9: DC_MB_5G High Frequency Band

Figure 18:
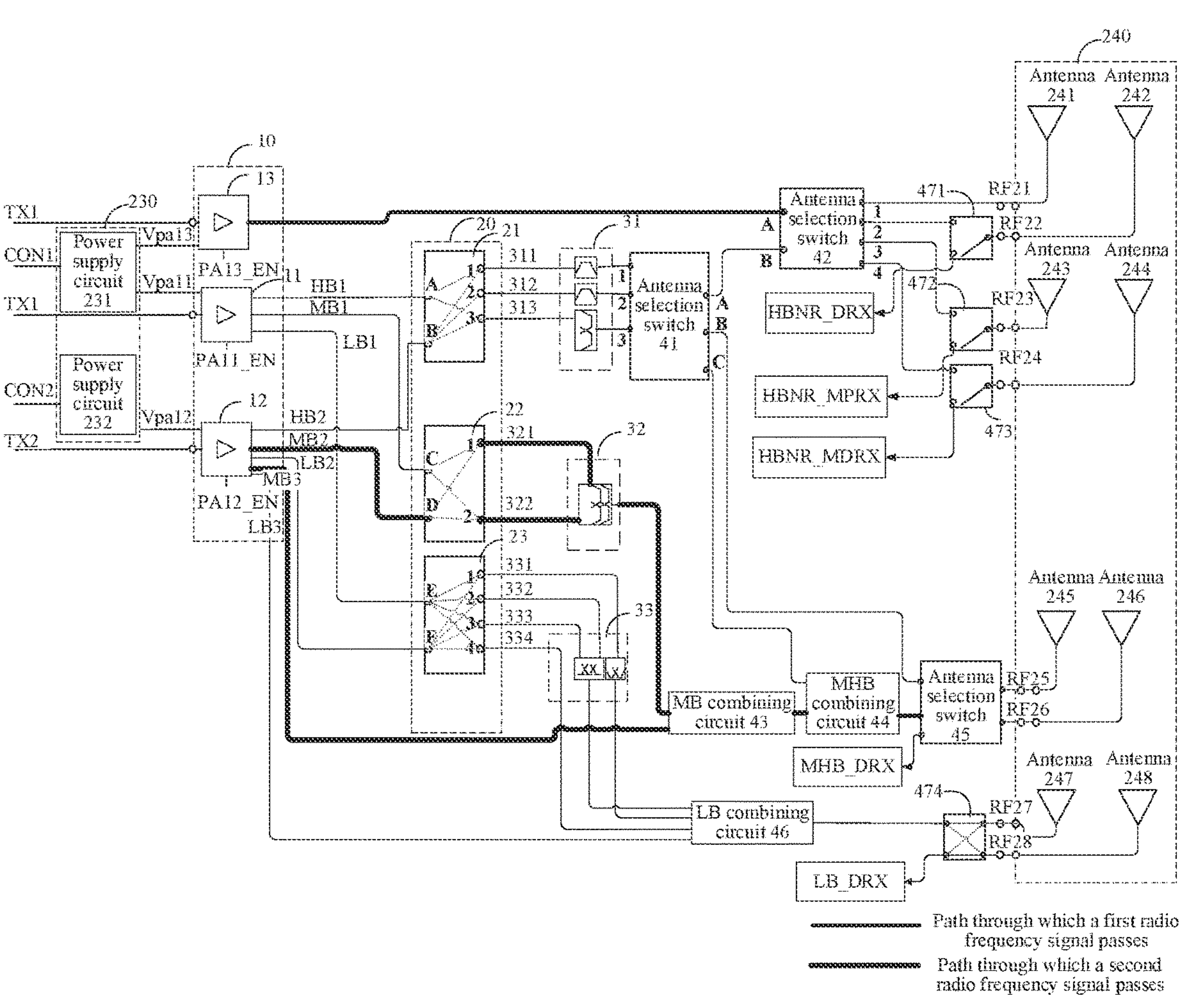
FIG. 18 is a schematic diagram of a radio frequency front-end module and an antenna module in another scenario according to an embodiment of this application.

FIG. 18 is another schematic structural diagram of a radio frequency front-end module 220 and an antenna module 240 according to an embodiment of this application. As shown in FIG. 18, paths in Scenario 9 are marked with bold lines. The terminal device may include devices and ports in the paths marked in FIG. 18, and may exclude devices and ports in unmarked paths. The terminal device in this embodiment may support DC_MB_5G high frequency band. In other words, the terminal device may support simultaneous transmission of a 5G radio frequency signal of the 5G high frequency band and a 4G radio frequency signal of the MB. Specifically, the 5G radio frequency signal of the 5G high frequency band may be used as a first radio frequency signal TX1, output to the third power amplifier 13, subjected to power amplification performed by the third power amplifier 13, output to the antenna selection switch 42, and then output to the antenna 241 through the antenna selection switch 42. The 4G radio frequency signal of the MB may be used as a second radio frequency signal TX2, output to the second power amplifier 12, subjected to power amplification performed by the second power amplifier 12, output to the second frequency band selection switch 22 or the MB combining circuit 43, routed to the MB filtering circuit 32 through the second frequency band selection switch 22, and then output to the antenna 245 through the MB combining circuit 43.

Scenario 10: DC_HB_HB

Figure 19:
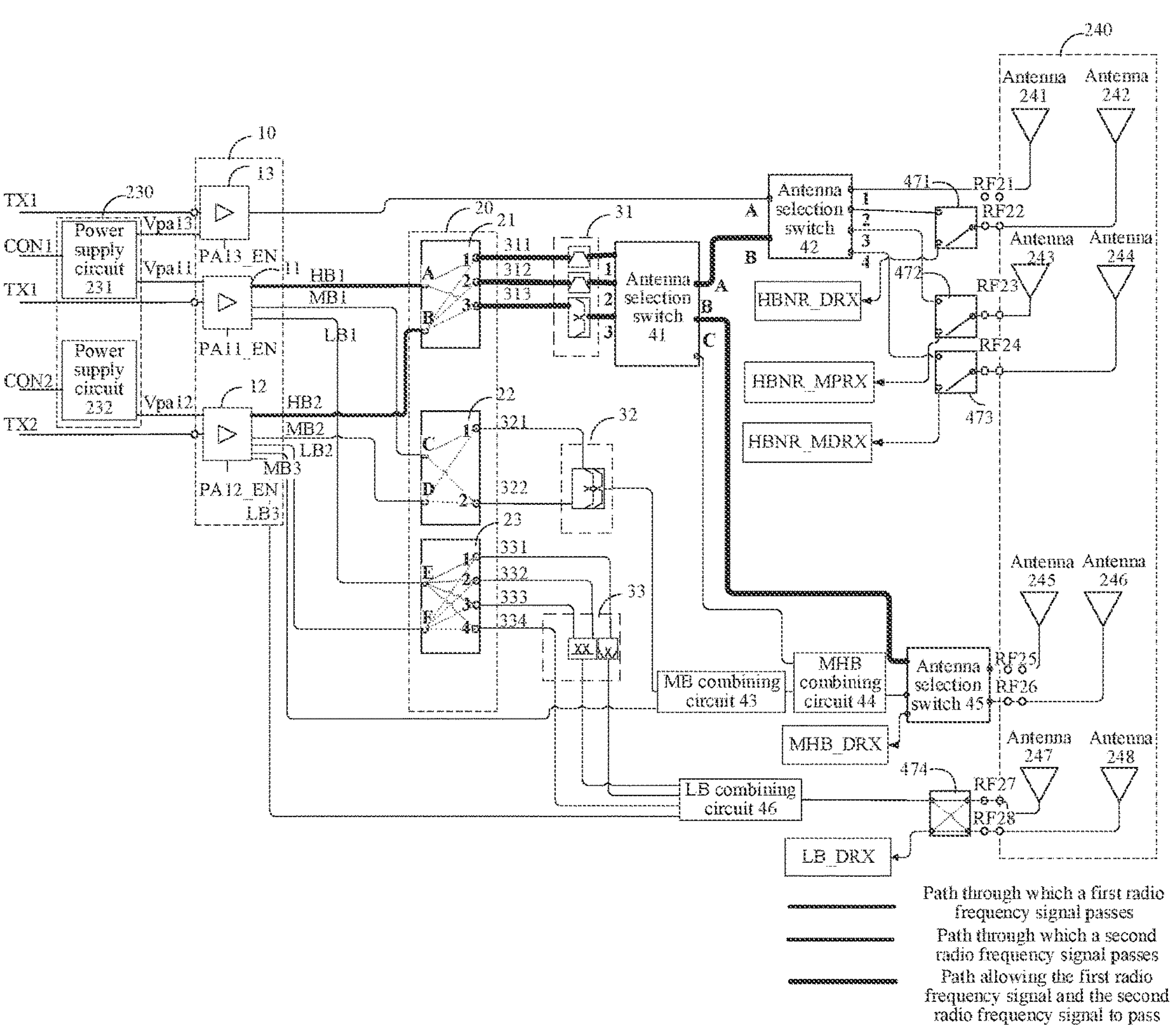
FIG. 19 is a schematic diagram of a radio frequency front-end module and an antenna module in another scenario according to an embodiment of this application.

FIG. 19 is another schematic structural diagram of a radio frequency front-end module 220 and an antenna module 240 according to an embodiment of this application. As shown in FIG. 19, paths in Scenario 10 are marked with bold lines. The terminal device may include devices and ports in the paths marked in FIG. 19, and may exclude devices and ports in unmarked paths. The terminal device in this embodiment may support DC_HB_HB. In other words, the terminal device may support simultaneous transmission of a 5G radio frequency signal of the HB and a 4G radio frequency signal of the HB. Specifically, the 5G radio frequency signal of the HB may be used as a first radio frequency signal TX1, output to the first power amplifier 11, subjected to power amplification performed by the first power amplifier 11, output to the first frequency band selection switch 21, routed to the HB filtering circuit 31 through the first frequency band selection switch 21, and then output to the antenna 241 or the antenna 245 through the antenna selection switch 41. The 4G radio frequency signal of the HB may be used as a second radio frequency signal TX2, output to the second power amplifier 12, subjected to power amplification performed by the second power amplifier 12, output to the first frequency band selection switch 21, routed to the HB filtering circuit 31 through the first frequency band selection switch 21, and then output to the antenna 241 or the antenna 245 through the antenna selection switch 41.

Scenario 11: DC_LB_HB

Figure 20:
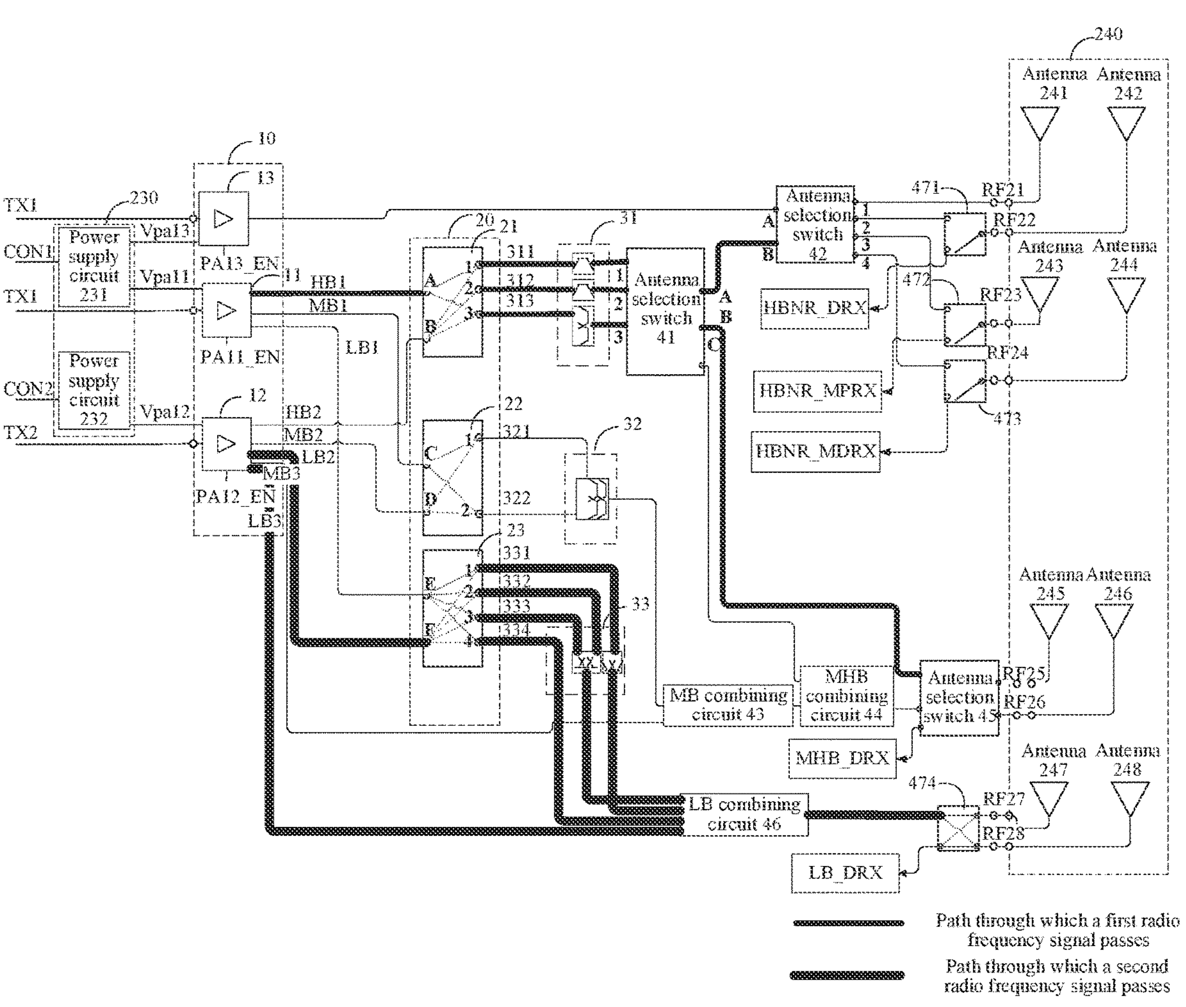
FIG. 20 is a schematic diagram of a radio frequency front-end module and an antenna module in another scenario according to an embodiment of this application.

FIG. 20 is another schematic structural diagram of a radio frequency front-end module 220 and an antenna module 240 according to an embodiment of this application. As shown in FIG. 20, paths in Scenario 11 are marked with bold lines. The terminal device may include devices and ports in the paths marked in FIG. 20, and may exclude devices and ports in unmarked paths. The terminal device in this embodiment may support DC_LB_HB. In other words, the terminal device may support simultaneous transmission of a 5G radio frequency signal of the HB and a 4G radio frequency signal of the LB. Specifically, the 5G radio frequency signal of the HB may be used as a first radio frequency signal TX1, output to the first power amplifier 11, subjected to power amplification performed by the first power amplifier 11, output to the first frequency band selection switch 21, routed to the HB filtering circuit 31 through the first frequency band selection switch 21, and then output to the antenna 241 or the antenna 245 through the antenna selection switch 41. The 4G radio frequency signal of the LB may be used as a second radio frequency signal TX2, output to the second power amplifier 12, subjected to power amplification performed by the second power amplifier 12, output to the third frequency band selection switch 23 or the LB combining circuit 46, routed to the LB filtering circuit 33 through the third frequency band selection switch 23, and then output to the antenna 247 through the LB combining circuit 46.

Scenario 12: DC_HB_LB

Figure 21:
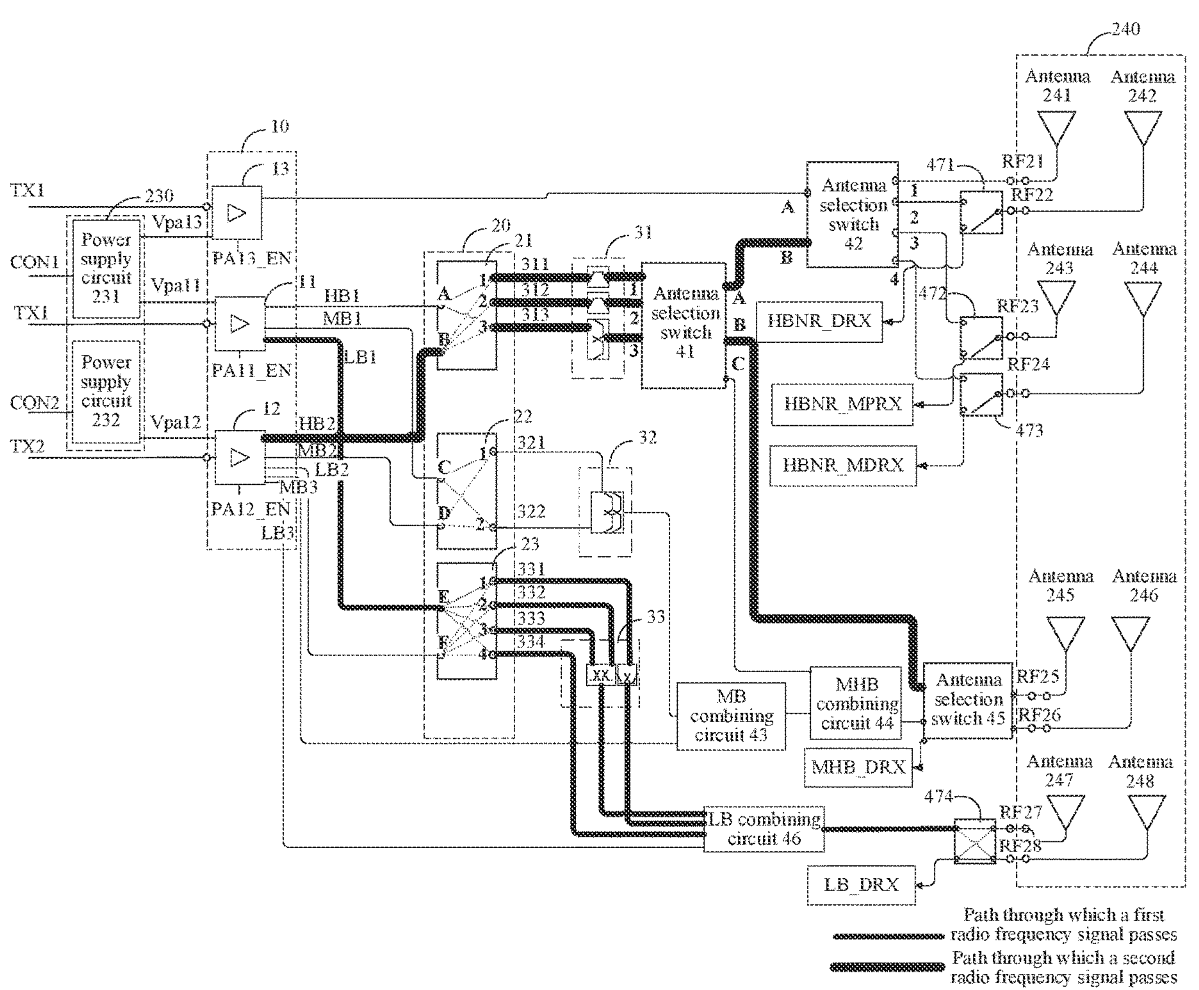
FIG. 21 is a schematic diagram of a radio frequency front-end module and an antenna module in another scenario according to an embodiment of this application.

FIG. 21 is another schematic structural diagram of a radio frequency front-end module 220 and an antenna module 240 according to an embodiment of this application. As shown in FIG. 21, paths in Scenario 12 are marked with bold lines. The terminal device may include devices and ports in the paths marked in FIG. 21, and may exclude devices and ports in unmarked paths. The terminal device in this embodiment may support DC_HB_LB. In other words, the terminal device may support simultaneous transmission of a 5G radio frequency signal of the LB and a 4G radio frequency signal of the HB. Specifically, the 5G radio frequency signal of the LB may be used as a first radio frequency signal TX1, output to the first power amplifier 11, subjected to power amplification performed by the first power amplifier 11, output to the third frequency band selection switch 23, routed to the LB filtering circuit 33 through the third frequency band selection switch 23, and then output to the antenna 247 through the LB combining circuit 46. The 4G radio frequency signal of the HB may be used as a second radio frequency signal TX2, output to the second power amplifier 12, subjected to power amplification performed by the second power amplifier 12, output to the first frequency band selection switch 21, routed to the HB filtering circuit 31 through the first frequency band selection switch 21, and then output to the antenna 245 or the antenna 241 through the antenna selection switch 41.

Scenario 13: DC_HB_5G High Frequency Band

Figure 22:
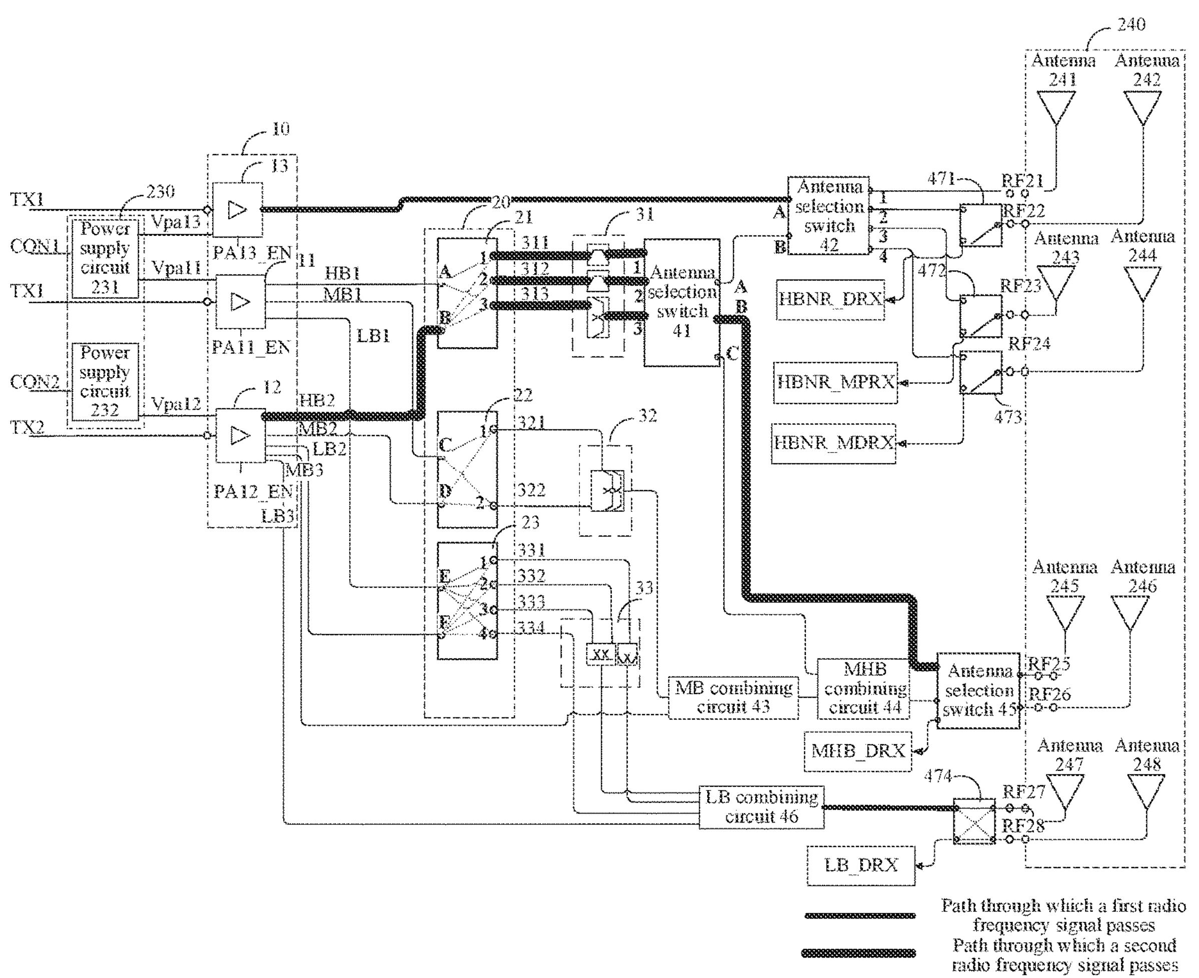
FIG. 22 is a schematic diagram of a radio frequency front-end module and an antenna module in another scenario according to an embodiment of this application.

FIG. 22 is another schematic structural diagram of a radio frequency front-end module 220 and an antenna module 240 according to an embodiment of this application. As shown in FIG. 22, paths in Scenario 12 are marked with bold lines. The terminal device may include devices and ports in the paths marked in FIG. 22, and may exclude devices and ports in unmarked paths. The terminal device in this embodiment may support DC_HB_5G high frequency band. In other words, the terminal device may support simultaneous transmission of a 5G radio frequency signal of the 5G high frequency band and a 4G radio frequency signal of the HB. Specifically, the 5G radio frequency signal of the 5G high frequency band may be used as a first radio frequency signal TX1, output to the third power amplifier 13, subjected to power amplification performed by the third power amplifier 13, output to the antenna selection switch 42, and then output to the antenna 241. The 4G radio frequency signal of the HB may be used as a second radio frequency signal TX2, output to the second power amplifier 12, subjected to power amplification performed by the second power amplifier 12, output to the first frequency band selection switch 21, routed to the HB filtering circuit 31 through the first frequency band selection switch 21, and then output to the antenna 245 through the antenna selection switch 41.

The radio frequency front-end module 220 and the antenna module 240 in any one of the foregoing scenarios may further support carrier aggregation of the frequency bands therein. An implementation principle is similar to the above. Steps are not described herein again.

The radio frequency front-end module in the embodiments of this application may enable the terminal device to support DC or CA in the foregoing application scenarios, thereby improving user performance of the terminal device.

The radio frequency front-end module in the embodiments of this application may alternatively be applied to a multi-SIM terminal device. The multi-SIM terminal device can support DSDA, so that a user can perform services simultaneously by using two SIM cards. An implementation principle is similar to that of the foregoing DC, with a difference lying in that the first radio frequency signal and the second radio frequency signal are radio frequency signals of different SIM cards. For example, the first radio frequency signal is a radio frequency signal of a first SIM card, and the second radio frequency signal is a radio frequency signal of a second SIM card; or the first radio frequency signal is a radio frequency signal of the second SIM card, and the second radio frequency signal is a radio frequency signal of the first SIM card.

For example, in a case that the first SIM card supports an LB frequency band of LTE, and the second SIM card supports an MHB frequency band of 5G, a radio frequency signal of the first SIM card may be sent as the second radio frequency signal, and a radio frequency signal of the second SIM card may be sent as the first radio frequency signal, thereby implementing DSDA. For a specific implementation principle, refer to a specific implementation of Scenario 1. Details are not described herein again.

Similarly, two SIM cards of different standards and different frequency bands are enabled to implement DSDA through the radio frequency front-end module in the embodiments of this application. For an implementation principle, refer to specific implementations of the foregoing scenarios. Details are not described herein again.

It should be noted that, the radio frequency front-end module in the embodiments of this application may further enable two SIM cards of a same standard but of different frequency bands to implement DSDA. It is required that both the power supply circuit 231 and the power supply circuit 232 can support power supplying of two different standards; and the first amplifier 11 and the second amplifier 12 can support two different standards. For example, LTE and 5G are supported. For an implementation principle, refer to specific implementations of the foregoing scenarios. Details are not described herein again.

An embodiment of this application further provides a wireless communication method. The method may be performed by the above terminal device or a processor or chip in the terminal device. The wireless communication method includes the following steps:

Step 101: A first power amplifier performs power amplification on a first radio frequency signal, and a second power amplifier performs power amplification on a second radio frequency signal.

Step 102: The frequency band selection circuit routes the amplified first radio frequency signal to the first front-end circuit when the first radio frequency signal meets a first frequency band, and routes the amplified second radio frequency signal to the first front-end circuit when the second radio frequency signal meets a second frequency band, where the first front-end circuit supports both the first frequency band and the second frequency band.

Step 103: The first front-end circuit performs filtering and/or combination on at least one of the amplified first radio frequency signal or the amplified second radio frequency signal, to obtain a first transmission signal.

Step 104: The antenna module transmits the first transmission signal.

In some embodiments, the method may further include: routing, by the frequency band selection circuit, the amplified first radio frequency signal to the second front-end circuit when the first radio frequency signal meets a third frequency band, and routing the amplified second radio frequency signal to the second front-end circuit when the second radio frequency signal meets a fourth frequency band, where the second front-end circuit supports both the third frequency band and the fourth frequency band; performing, by the second front-end circuit, filtering and/or combination on at least one of the amplified first radio frequency signal or the amplified second radio frequency signal, to obtain a second transmission signal; and transmitting, by the antenna module, the second transmission signal.

In some embodiments, the method may further include: routing, by the frequency band selection circuit, the amplified first radio frequency signal to the third front-end circuit when the first radio frequency signal meets a fifth frequency band, and routing the amplified second radio frequency signal to the third front-end circuit when the second radio frequency signal meets a sixth frequency band, where the third front-end circuit supports both the fifth frequency band and the sixth frequency band; performing, by the third front-end circuit, filtering and/or combination on at least one of the amplified first radio frequency signal or the amplified second radio frequency signal, to obtain a third transmission signal; and transmitting, by the antenna module, the third transmission signal.

In some embodiments, that a first power amplifier performs power amplification on a first radio frequency signal may specifically include: performing, by a third power amplifier, power amplification on the first radio frequency signal when a frequency of the first radio frequency signal belongs to a fourth frequency range, and outputting an amplified first radio frequency signal to the frequency band selection circuit, and performing, by the first power amplifier, power amplification on the first radio frequency signal when the frequency of the first radio frequency signal belongs to the first frequency range, the second frequency range, or a third frequency range, and outputting an amplified first radio frequency signal to the frequency band selection circuit; routing, by the frequency band selection circuit, the amplified first radio frequency signal to a fourth front-end circuit when the frequency of the first radio frequency signal belongs to the fourth frequency range; performing, by the fourth front-end circuit, filtering on the amplified first radio frequency signal to obtain a fourth transmission signal, or using the amplified first radio frequency signal as a fourth transmission signal; and transmitting, by the antenna module, the fourth transmission signal.

In some embodiments, the transmitting, by the antenna module, the fourth transmission signal may specifically include: outputting, by an antenna selection circuit, the fourth transmission signal to one or more of the r first antennas and outputting the first transmission signal to one or more of the N−r+1 second antennas when the frequency of the first radio frequency signal belongs to the 5G high frequency band and the frequency of the second radio frequency signal belongs to the frequency range of the HB, where the first antenna supports the 5G high frequency band, and the second antenna supports the frequency range of the HB.

For an implementation principle and an implementation effect of this embodiment, refer to description of the foregoing structure embodiment. Details are not described herein again.

An embodiment of this application further provides a terminal device. The terminal device may include a processor, a plurality of antennas, and the radio frequency front-end module according to any of the foregoing embodiments. The radio frequency front-end module is separately coupled with the processor and the plurality of antennas. The radio frequency front-end module receives a first radio frequency signal and a second radio frequency signal from the processor.

An embodiment of this application further provides a processor. The processor is configured to control a radio frequency front-end module to execute the wireless communication method described above.

An embodiment of this application further provides a chip, including a processor and a memory, where the memory is configured to store a computer instruction, and the processor is configured to invoke and run the computer instruction stored in the memory, thereby controlling a radio frequency front-end module to execute the wireless communication method described above.

The processor mentioned in the foregoing embodiments may be an integrated circuit chip, and has a signal processing capability. During implementation, the steps of the foregoing method embodiment may be implemented by using a hardware integrated logic circuit in the processor or implemented by using an instruction in a software form. The processor may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The general-purpose processor may be a microprocessor, or the processor may be any conventional processor or the like. The steps of the methods disclosed in the embodiments of this application may be directly performed and completed by using a hardware encoding processor, or may be performed and completed by using a combination of hardware and software modules in the encoding processor. The software module may be stored in a storage medium that is mature in the art, such as a RAM, a flash memory, a read-only memory (ROM), a programmable ROM, an electrically erasable programmable memory, or a register. The storage medium is located in the memory. The processor reads information in the memory and completes the steps of the foregoing methods in combination with hardware thereof.

The memory mentioned in the foregoing embodiments may be a volatile memory or a nonvolatile memory, or may include a volatile memory and a nonvolatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. Through illustrative rather than restrictive description, RAMs of many forms are available, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DRRAM). It should be noted that the memory involved in the systems and methods described in this specification is intended to include, but is not limited to, these memories and a memory of any other suitable type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the related art, or some of the technical solutions may be implemented in a form of a software product. The computer software product is stored in a storage medium and includes several instructions for instructing a computer device (a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be used as protection scope of the claims.

Embodiment 1: A wireless communications system, including:

a first power amplifier, a second power amplifier, a frequency band selection circuit, a first front-end circuit, and an antenna module.

The first power amplifier and the second power amplifier are separately coupled with the frequency band selection circuit. The first front-end circuit is separately coupled with the frequency band selection circuit and the antenna module.

The first power amplifier is configured to perform power amplification on a first radio frequency signal and output an amplified first radio frequency signal to the frequency band selection circuit. The second power amplifier is configured to perform power amplification on a second radio frequency signal, and output an amplified second radio frequency signal to the frequency band selection circuit.

The frequency band selection circuit is configured to: route the amplified first radio frequency signal to the first front-end circuit when the first radio frequency signal meets a first frequency band, and route the amplified second radio frequency signal to the first front-end circuit when the second radio frequency signal meets a second frequency band, wherein the first front-end circuit supports both the first frequency band and the second frequency band.

The first front-end circuit is configured to perform filtering and/or combination on at least one of the amplified first radio frequency signal or the amplified second radio frequency signal, to obtain a first transmission signal.

The antenna module is configured to transmit the first transmission signal.

Embodiment 2: According to the system in Embodiment 1, the first frequency band and the second frequency band belong to a first frequency range.

Embodiment 3: According to the system in Embodiment 2, the first frequency range includes a frequency range of a high frequency band HB, a frequency range of a middle frequency band MB, or a frequency range of a low frequency band LB.

Embodiment 4: According to the system in any one of Embodiments 1 to 3, the frequency band selection circuit includes signal ends of n first sub-frequency bands, the signal ends of the n first sub-frequency bands are separately coupled with the first front-end circuit, and n is a positive integer.

The frequency band selection circuit is configured to: when the first radio frequency signal meets the first frequency band and one first sub-frequency band of the n first sub-frequency bands, output the amplified first radio frequency signal to the first front-end circuit through a signal end of the first sub-frequency band; and when the second radio frequency signal meets the second frequency band and one first sub-frequency band of the n first sub-frequency bands, output the amplified second radio frequency signal to the first front-end circuit through the signal end of the first sub-frequency band, wherein the n first sub-frequency bands belong to the first frequency range.

Embodiment 5: According to the system in any one of Embodiments 1 to 4, the antenna module includes r first antennas, and r is an integer greater than 1.

The r first antennas are configured to transmit the first transmission signal output by the first front-end circuit.

Embodiment 6: According to the system in any one of Embodiments 2 to 5, the system further includes a second front-end circuit.

The frequency band selection circuit is further configured to: route the amplified first radio frequency signal to the second front-end circuit when the first radio frequency signal meets a third frequency band, and route the amplified second radio frequency signal to the second front-end circuit when the second radio frequency signal meets a fourth frequency band, wherein the second front-end circuit supports both the third frequency band and the fourth frequency band.

The second front-end circuit is configured to perform filtering and/or combination on at least one of the amplified first radio frequency signal or the amplified second radio frequency signal, to obtain a second transmission signal.

The antenna module is further configured to transmit the second transmission signal.

Embodiment 7: According to the system in Embodiment 6, the third frequency band and the fourth frequency band belong to a second frequency range.

Embodiment 8: According to the system in Embodiment 7, each of the first frequency range and the second frequency range includes any two of the frequency range of the high frequency band HB, the frequency range of the middle frequency band MB, or the frequency range of the low frequency band LB.

Embodiment 9: According to the system in any one of Embodiments 6 to 8, the frequency band selection circuit further includes signal ends of m second sub-frequency bands, the signal ends of the m second sub-frequency bands are separately coupled with the second front-end circuit, and m is a positive integer.

The frequency band selection circuit is further configured to: when the first radio frequency signal meets the third frequency band and one second sub-frequency band of the m second sub-frequency bands, output the amplified first radio frequency signal to the second front-end circuit through a signal end of the second sub-frequency band; and when the second radio frequency signal meets the fourth frequency band and one second sub-frequency band of the m second sub-frequency bands, output the amplified second radio frequency signal to the second front-end circuit through the signal end of the second sub-frequency band, wherein the m second sub-frequency bands belong to the second frequency range.

Embodiment 10: According to the system in any one of Embodiments 6 to 9, the antenna module includes N−r+1 second antennas, and N is an integer greater than 2.

The N−r+1 second antennas are configured to transmit the second transmission signal output by the second front-end circuit.

Embodiment 11: According to the system in Embodiment 10, the system further includes an antenna selection circuit, wherein an input end of the antenna selection circuit is separately coupled with an output end of the first front-end circuit and an output end of the second front-end circuit, an output end of the antenna selection circuit is coupled with the antenna module, and the antenna selection circuit is configured to output the first transmission signal to one or more of the r first antennas or the N−r+1 second antennas, and output the second transmission signal to one or more of the N−r+1 second antennas.

Embodiment 12: According to the system in any one of Embodiments 7 to 11, the system further includes a third front-end circuit.

The frequency band selection circuit is further configured to: route the amplified first radio frequency signal to the third front-end circuit when the first radio frequency signal meets a fifth frequency band, and route the amplified second radio frequency signal to the third front-end circuit when the second radio frequency signal meets a sixth frequency band, wherein the third front-end circuit supports both the fifth frequency band and the sixth frequency band.

The third front-end circuit is configured to perform processing on at least one of the amplified first radio frequency signal or the amplified second radio frequency signal, to obtain a third transmission signal. In some embodiments, the processing includes filtering and/or combination.

The antenna module is further configured to transmit the third transmission signal.

Embodiment 13: According to the system in Embodiment 12, the fifth frequency band and the sixth frequency band belong to a third frequency range.

Embodiment 14: According to the system in Embodiment 13, each of the first frequency range, the second frequency range, and the third frequency range is one of the frequency range of the high frequency band HB, the frequency range of the middle frequency band MB, or the frequency range of the low frequency band LB, respectively. Any two of the first frequency range, the second frequency range, and the third frequency range are different.

Embodiment 15: According to the system in any one of Embodiments 12 to 14, the frequency band selection circuit further includes signal ends of k third sub-frequency bands, the signal ends of the k third sub-frequency bands are separately coupled with the third front-end circuit, and k is a positive integer.

The frequency band selection circuit is further configured to: when the first radio frequency signal meets the fifth frequency band and one third sub-frequency band of the k third sub-frequency bands, output the amplified first radio frequency signal to the third front-end circuit through a signal end of the third sub-frequency band; and when the second radio frequency signal meets the sixth frequency band and one third sub-frequency band of the k third sub-frequency bands, output the amplified second radio frequency signal to the third front-end circuit through the signal end of the third sub-frequency band, wherein the k third sub-frequency bands belong to the third frequency range.

Embodiment 16: According to the system in any one of Embodiments 12 to 15, the system further includes an antenna selection circuit, wherein an input end of the antenna selection circuit is separately coupled with an output end of the first front-end circuit, an output end of the second front-end circuit, and an output end of the third front-end circuit, an output end of the antenna selection circuit is coupled with the antenna module, and the antenna selection circuit is configured to output the first transmission signal to the r first antennas, output the second transmission signal to one or more of the N−r+1 second antennas, and output the third transmission signal to one or more of the N−r+1 second antennas.

Embodiment 17: According to the system in Embodiment 3, 8, or 14, the frequency range of the high frequency band HB includes frequencies from 2.3 GHz to 2.7 GHz; the frequency range of the middle frequency band MB includes frequencies from 1.7 GHz to 2.3 GHz; and the frequency range of the low frequency band LB includes frequencies below 1000 MHz.

Embodiment 18: According to the system in any one of Embodiments 1 to 17, the first radio frequency signal and the second radio frequency signal are of different standards.

Embodiment 19: According to the system in any one of Embodiments 1 to 17, the first radio frequency signal is a 5G radio frequency signal, and the second radio frequency signal is a 4G radio frequency signal.

Embodiment 20: According to the system in any one of Embodiments 1 to 17, the first radio frequency signal and the second radio frequency signal are of a same standard but of different carriers.

Embodiment 21: According to the system in any one of Embodiments 1 to 20, the first radio frequency signal and the second radio frequency signal correspond to different SIM cards.

Embodiment 22: According to the system in Embodiment 21, the first radio frequency signal and the second radio frequency signal are of a same carrier.

Embodiment 23: According to the system in any one of Embodiments 1 to 22, the first radio frequency signal and the second radio frequency signal correspond to different services.

Embodiment 24: According to the system in Embodiment 23, the service includes a voice call service or a data service.

Embodiment 25: According to the system in any one of Embodiments 1 to 24, the system further includes a third power amplifier and a fourth front-end circuit.

The third power amplifier is configured to perform power amplification on the first radio frequency signal when a frequency of the first radio frequency signal belongs to a fourth frequency range, and output an amplified first radio frequency signal to the frequency band selection circuit. The first power amplifier is configured to perform power amplification on the first radio frequency signal when the frequency of the first radio frequency signal belongs to the first frequency range, the second frequency range, or the third frequency range, and output an amplified first radio frequency signal to the frequency band selection circuit.

The frequency band selection circuit is further configured to route the amplified first radio frequency signal to the fourth front-end circuit when the frequency of the first radio frequency signal belongs to the fourth frequency range.

The fourth front-end circuit is configured to perform filtering on the amplified first radio frequency signal to obtain a fourth transmission signal, or use the amplified first radio frequency signal as a fourth transmission signal.

The antenna module is further configured to transmit the fourth transmission signal.

Embodiment 26: According to the system in Embodiment 25, the fourth frequency range includes a 5G high frequency band.

Embodiment 27: According to the system in Embodiment 26, the frequency range of the 5G high frequency band includes frequencies from 2.7 GHz to 7.2 GHz.

Embodiment 28: According to the system in any one of Embodiments 25 to 27, the system further includes an antenna selection circuit. The antenna selection circuit is configured to output the fourth transmission signal to one or more of the r first antennas and output the first transmission signal to one or more of the N−r+1 second antennas when the frequency of the first radio frequency signal belongs to the 5G high frequency band and the frequency of the second radio frequency signal belongs to the frequency range of the HB.

The first antenna supports the 5G high frequency band, and the second antenna supports the frequency range of the HB.

Embodiment 29: A wireless communication method, including:

performing, by a first power amplifier, power amplification on a first radio frequency signal;

performing, by a second power amplifier, power amplification on a second radio frequency signal;

routing, by a frequency band selection circuit, an amplified first radio frequency signal to a first front-end circuit when the first radio frequency signal meets a first frequency band;

routing, by the frequency band selection circuit, an amplified second radio frequency signal to the first front-end circuit when the second radio frequency signal meets a second frequency band, wherein the first front-end circuit supports both the first frequency band and the second frequency band;

performing, by the first front-end circuit, filtering and/or combination on at least one of the amplified first radio frequency signal or the amplified second radio frequency signal, to obtain a first transmission signal; and transmitting, by the antenna module, the first transmission signal.

Embodiment 30: According to the method in Embodiment 29, the first frequency band and the second frequency band belong to a first frequency range.

Embodiment 31: According to the method in Embodiment 31, the first frequency range includes a frequency range of a high frequency band HB, a frequency range of a middle frequency band MB, or a frequency range of a low frequency band LB.

Embodiment 32: According to the method in Embodiment 30 or 31, the method further includes:

routing, by the frequency band selection circuit, the amplified first radio frequency signal to a second front-end circuit when the first radio frequency signal meets a third frequency band;

routing, by the frequency band selection circuit, the amplified second radio frequency signal to the second front-end circuit when the second radio frequency signal meets a fourth frequency band, wherein the second front-end circuit supports both the third frequency band and the fourth frequency band;

performing, by the second front-end circuit, filtering and/or combination on at least one of the amplified first radio frequency signal or the amplified second radio frequency signal, to obtain a second transmission signal; and transmitting, by the antenna module, the second transmission signal.

Embodiment 33: According to the method in Embodiment 32, the third frequency band and the fourth frequency band belong to a second frequency range.

Embodiment 34: According to the method in Embodiment 33, each of the first frequency range and the second frequency range includes any two of the frequency range of the high frequency band HB, the frequency range of the middle frequency band MB, or the frequency range of the low frequency band LB.

Embodiment 35: According to the method in any one of Embodiments 30 to 34, the method further includes:

using the frequency band selection circuit, routing the amplified first radio frequency signal to a third front-end circuit when the first radio frequency signal meets a fifth frequency band, and routing the amplified second radio frequency signal to the third front-end circuit when the second radio frequency signal meets a sixth frequency band, wherein the third front-end circuit supports both the fifth frequency band and the sixth frequency band;

performing, by the third front-end circuit, filtering and/or combination on at least one of the amplified first radio frequency signal or the amplified second radio frequency signal, to obtain a third transmission signal; and transmitting, by the antenna module, the third transmission signal.

Embodiment 36: According to the method in Embodiment 35, the fifth frequency band and the sixth frequency band belong to a third frequency range.

Embodiment 37: According to the method in Embodiment 36, each of the first frequency range, the second frequency range, and the third frequency range is one of the frequency range of the high frequency band HB, the frequency range of the middle frequency band MB, or the frequency range of the low frequency band LB, respectively. Any two of the first frequency range, the second frequency range, and the third frequency range are different.

Embodiment 38: According to the method in Embodiment 31, 32, or 37, the frequency range of the high frequency band HB includes frequencies from 2.3 GHz to 2.7 GHz; the frequency range of the middle frequency band MB includes frequencies from 1.7 GHz to 2.3 GHz; and the frequency range of the low frequency band LB includes frequencies below 1000 MHz.

Embodiment 39: According to the method in any one of Embodiments 29 to 38, the first radio frequency signal and the second radio frequency signal are of different standards.

Embodiment 40: According to the method in any one of Embodiments 29 to 38, the first radio frequency signal is a 5G radio frequency signal, and the second radio frequency signal is a 4G radio frequency signal.

Embodiment 41: According to the method in any one of Embodiments 29 to 38, the first radio frequency signal and the second radio frequency signal are of a same standard but of different carriers.

Embodiment 42: According to the method in any one of Embodiments 29 to 41, the first radio frequency signal and the second radio frequency signal correspond to different SIM cards.

Embodiment 43: According to the method in Embodiment 42, the first radio frequency signal and the second radio frequency signal are of a same carrier.

Embodiment 44: According to the method in any one of Embodiments 29 to 43, the first radio frequency signal and the second radio frequency signal correspond to different services.

Embodiment 45: According to the method in Embodiment 44, the service includes a voice call service or a data service.

Embodiment 46: According to the method in any one of Embodiments 29 to 45, the performing, by a first power amplifier, power amplification on a first radio frequency signal includes:

performing, by a third power amplifier, power amplification on the first radio frequency signal when a frequency of the first radio frequency signal belongs to a fourth frequency range, and outputting an amplified first radio frequency signal to the frequency band selection circuit, and performing, by the first power amplifier, power amplification on the first radio frequency signal when the frequency of the first radio frequency signal belongs to the first frequency range, the second frequency range, or a third frequency range, and outputting an amplified first radio frequency signal to the frequency band selection circuit;

routing, by the frequency band selection circuit, the amplified first radio frequency signal to a fourth front-end circuit when the frequency of the first radio frequency signal belongs to the fourth frequency range;

performing, by the fourth front-end circuit, filtering on the amplified first radio frequency signal to obtain a fourth transmission signal, or using the amplified first radio frequency signal as a fourth transmission signal; and transmitting, by the antenna module, the fourth transmission signal.

Embodiment 47: According to the method in Embodiment 46, the fourth frequency range includes a 5G high frequency band.

Embodiment 48: According to the method in Embodiment 47, the frequency range of the 5G high frequency band includes frequencies from 2.7 GHz to 7.2 GHz.

Embodiment 49: According to the method in any one of Embodiments 29 to 48, the transmitting, by the antenna module, the fourth transmission signal includes:

outputting, by an antenna selection circuit, the fourth transmission signal to one or more of the r first antennas and outputting the first transmission signal to one or more of the N−r+1 second antennas when the frequency of the first radio frequency signal belongs to the 5G high frequency band and the frequency of the second radio frequency signal belongs to the frequency range of the HB.

The first antenna supports the 5G high frequency band, and the second antenna supports the frequency range of the HB.

Embodiment 50: A terminal device, including a processor, a plurality of antennas, and the wireless communications system according to any one of Embodiments 1 to 28.

The wireless communications system is separately coupled with the processor and the plurality of antennas, and the wireless communications system receives the first radio frequency signal and the second radio frequency signal from the processor.

Embodiment 51: A processor is provided. The processor is configured to control a wireless communications system to execute the method according to any one of Embodiments 29 to 49.

Embodiment 52: A chip is provided. The chip includes a processor and a memory. The memory is configured to store a computer instruction, and the processor is configured to invoke and run the computer instruction stored in the memory, thereby controlling a wireless communications system to execute the method according to any one of Embodiments 29 to 49.

Embodiment 53: A computer-readable storage medium is provided. The computer-readable storage medium stores a computer instruction. When the computer instruction is executed by a computer, the computer is enabled to execute the method according to any one of Embodiments 29 to 49.

Embodiment 54: A computer program product is provided, including a computer program or instruction. When the computer program or instruction is executed by a processor, the method according to any one of Embodiments 29 to 49 is implemented.

What is claimed is:

1. A wireless communications system, comprising:

a first power amplifier;

a second power amplifier;

a first switch;

a second switch;

a first filter circuit;

a second filter circuit; and an antenna group;

wherein the first power amplifier is configured to perform power amplification on a first sub-radio frequency signal of a first communication standard and output an amplified first sub-radio frequency signal to the first switch;

wherein the second power amplifier is configured to perform power amplification on a second sub-radio frequency signal of a second communication standard and output an amplified second sub-radio frequency signal to the first switch;

wherein the first switch is configured to output a first output signal by using the amplified first sub-radio frequency signal, the first output signal is transmitted to the first filter circuit, and the first sub-radio frequency signal is in the first frequency band;

wherein the first switch is configured to output a second output signal by using the amplified second sub-radio frequency signal, the second output signal is transmitted to the first filter circuit, and the second sub-radio frequency signal is in the second frequency band;

wherein the first filter circuit is configured to perform filtering at least one of the first output signal or the second output signal, to obtain a first transmission signal;

wherein the antenna group is configured to transmit the first transmission signal;

wherein the first power amplifier is configured to perform power amplification on a third sub-radio frequency signal and output an amplified third sub-radio frequency signal to the second switch;

wherein the second power amplifier is configured to perform power amplification on a fourth sub-radio frequency signal and output an amplified fourth sub-radio frequency signal to the second switch;

wherein the second switch is configured to output a third output signal by using the amplified third sub-radio frequency signal, the third output signal is transmitted to the second filter circuit, and the third sub-radio frequency signal is in the third frequency band;

wherein the second switch is configured to output a fourth output signal by using the amplified fourth sub-radio frequency signal, the fourth output signal is transmitted to the second filter circuit, and the fourth sub-radio frequency signal is in the fourth frequency band;

wherein the second filter circuit is configured to perform filtering at least one of the third output signal or the fourth output signal, to obtain a second transmission signal;

wherein the antenna group is configured to transmit the second transmission signal;

wherein the first communication standard is different from the second communication standard; and wherein the frequency of the first frequency band is different from the frequency of the third frequency band, the frequency of the second frequency band is different from the frequency of the fourth frequency band, and the wireless communications system is configured to support simultaneous transmission of dual-connection signals by using the first sub-radio frequency signal and the second sub-radio frequency signal.

2. The wireless communications system according to claim 1, further comprising:

a third power amplifier configured to perform power amplification on a fifth sub-radio frequency signal and output a third transmission signal, and the antenna group is configured to transmit the third transmission signal.

3. The wireless communications system according to claim 1, further comprising:

a third switch;

wherein the antenna group comprises a first sub-antenna and a second sub-antenna; and wherein the first transmission signal is transmitted by the first sub-antenna or the second sub-antenna after passing through the third switch, wherein two output ends of the third switch are respectively connected to the first sub-antenna and the second sub-antenna.

4. The wireless communications system according to claim 3, wherein the second transmission signal is transmitted by the first sub-antenna or the second sub-antenna after passing through the third switch.

5. The wireless communications system according to claim 2, further comprising:

a fourth switch;

wherein the antenna group comprises a third sub-antenna;

wherein the third sub-antenna is configured to transmit the third transmission signal after passing through the fourth switch, wherein at least one output end of the fourth switch is connected to the third sub-antenna.

6. The wireless communications system according to claim 1, wherein the first switch is a switch comprising at least two input ports and at least one output port, and the second switch is a switch comprising at least two input ports and at least one output port.

7. The wireless communications system according to claim 1, wherein the first frequency band is a fifth generation (5G) frequency band, and the second frequency band is a fourth generation (4G) frequency band; and wherein the third frequency band is the 5G frequency band, and the fourth frequency band is the 4G frequency band.

8. The wireless communications system according to claim 7, wherein the 5G frequency band and the 4G frequency band belong to a first frequency range; and wherein the first frequency range includes at least one of a frequency range of a high frequency band (HB), a frequency range of a middle frequency band (MB), or a frequency range of a low frequency band (LB).

9. The wireless communications system according to claim 7, wherein the 5G frequency band includes a frequency band below 7.2 GHZ, and the 4G frequency band includes a frequency band below 3 GHz.

10. The wireless communications system according to claim 7, wherein the 5G frequency band and the 4G frequency band belong to a first frequency range; and wherein the first frequency range includes at least one of a 2.3 GHz to 2.7 GHz frequency band, a 1.7 GHz to 2.3 GHz frequency band, or a frequency band below 1000 MHz.

11. The wireless communications system according to claim 2, wherein the first power amplifier, the second power amplifier, and the third power amplifier are independent devices or integrated devices integrated in one or more integrated circuits.

12. A terminal device, comprising:

a processor; and the wireless communications system according to claim 1, wherein the wireless communication system receives the first sub-radio frequency signal, the second sub-radio frequency signal, and the third sub-radio frequency signal from the processor, and transmits them after processing.

13. The wireless communications system according to claim 2, wherein the wireless communications system is configured to support simultaneous transmission of the dual-connection signals by using the first sub-radio frequency signal and the second sub-radio frequency signal based on the first sub-radio frequency signal being within a first frequency range; and wherein the wireless communications system is configured to support simultaneous transmission of the dual-connection signals by using the second sub-radio frequency signal and the fifth sub-radio frequency signal based on the fifth sub-radio frequency signal being within a second frequency range that is different from the first frequency range.

14. The wireless communications system according to claim 1, wherein:

the first switch has a number of k output ends, and the first filter circuit has a number of k input ends and a number of k' output ends;

the number of k output ends of the first switch are respectively connected to the number of k input ends of the first filter circuit in one-to-one correspondence;

the antenna group is configured to transmit signals outputted from the number of k' output ends of the first filter circuit; and k is a positive integer, k' is a positive integer, and $1 \leq k' \leq k$.

15. The wireless communications system according to claim 1, wherein:

the second switch has a number of m output ends, and the second filter circuit has a number of m input ends and a number of m' output ends;

the number of m output ends of the second switch are respectively connected to the number of m input ends of the second filter circuit in one-to-one correspondence;

the antenna group is configured to transmit signals outputted from the number of m' output ends of the second filter circuit; and m is a positive integer, m' is a positive integer, and $1 \leq m' \leq m$.

16. The wireless communications system according to claim 1, further comprising:

a sixth switch and a third filter circuit;

a third output end of the first power amplifier is connected to a first input end of the sixth switch, and a third output end of the second power amplifier is connected to a second input end of the sixth switch; and a first output end of the sixth switch is connected to a first input end of the third filter circuit, and the antenna group is configured to transmit a signal outputted from a first output end of the third filter circuit.

17. The wireless communications system according to claim 16, wherein:

the sixth switch has a number of n output ends, and the third filter circuit has a number of n input ends and a number of n' output ends;

the number of n output ends of the sixth switch are respectively connected to the number of n input ends of the third filter circuit in one-to-one correspondence;

the antenna group is configured to transmit signals outputted from the number of n' output ends of the third filter circuit; and n is a positive integer, n' is a positive integer, and $1 \leq n' \leq n$.

18. The wireless communications system according to claim 1, wherein the first power amplifier is further configured to amplify a sixth sub-radio frequency signal of the second communication standard, and the second power amplifier is configured to amplify a seventh sub-radio frequency signal of the first communication standard.

* * * * *